US012569852B2

(12) United States Patent (10) Patent No.: US 12,569,852 B2
Moro et al. (45) Date of Patent: Mar. 10, 2026

(54) CASSETTE HOLDER

(71) Applicant: JOKOH CO., LTD., Tokyo (JP)

(72) Inventors: Hiroshi Moro, Kanagawa (JP);
Hironori Chiba, Kanagawa (JP);
Takafumi Nikawa, Kanagawa (JP)

(73) Assignee: JOKOH CO., LTD., Tokyo (JP)

( * ) Notice: Subject to any disclaimer, the term of this
patent is extended or adjusted under 35
U.S.C. 154(b) by 491 days.

(21) Appl. No.: 18/191,186

(22) Filed: Mar. 28, 2023

(65) Prior Publication Data

US 2023/0234067 A1     Jul. 27, 2023

Related U.S. Application Data

(63) Continuation of application No.
PCT/JP2021/035880, filed on Sep. 29, 2021.

(30) Foreign Application Priority Data

Sep. 30, 2020    (JP) ................................. 2020-165304

(51) Int. Cl.
*B01L 9/00* (2006.01)
*G01N 1/36* (2006.01)
(52) U.S. Cl.
CPC .................. *B01L 9/52* (2013.01); *G01N 1/36*
(2013.01); *B01L 2200/04* (2013.01); *B01L*
*2200/18* (2013.01); *B01L 2300/04* (2013.01);
*B01L 2300/0609* (2013.01)
(58) Field of Classification Search
CPC .... B01L 9/52; B01L 2200/04; B01L 2200/18;
B01L 2300/04; B01L 2300/0609; G01N
1/36
See application file for complete search history.

(56) References Cited

U.S. PATENT DOCUMENTS

2008/0254504 A1* 10/2008 Vom .......................... G01N 1/44
435/40.52
2013/0196371 A1 8/2013 Freeland et al.
2015/0355059 A1 12/2015 Jung

FOREIGN PATENT DOCUMENTS

CN         110608934 A      12/2019
JP         200230568        * 10/2002
JP         2002303568 A     * 10/2002
(Continued)

OTHER PUBLICATIONS

Extended European Search Report issued in European Patent Application No. 21875700.3, mailed on Feb. 26, 2024 (6 pages).
(Continued)

*Primary Examiner* — Charles Capozzi
*Assistant Examiner* — Michael Stanley Gzybowski
(74) *Attorney, Agent, or Firm* — Nakanishi IP Associates,
LLC

(57) ABSTRACT

A cassette holder holds a cassette for medical use. It includes a cassette receiving portion that includes a bottom surface to which a lower surface of the cassette is brought into contact when the cassette is set, and a plate-shaped portion that is provided in the cassette receiving portion, has a substantially plate-like shape, and extends substantially parallel to the bottom surface, and a protrusion inside of which is hollow, the protrusion being provided to the bottom surface to protrude downward. The bottom surface and the protrusion are provided with a plurality of through holes.

12 Claims, 37 Drawing Sheets

(A)                    (B)

(56)  References Cited

FOREIGN PATENT DOCUMENTS

| JP | 2009-507231 | A |   | 2/2009 |
| JP | 2009-250782 | A |   | 10/2009 |
| JP | 2013-50324 | A |   | 3/2013 |
| JP | 2013050324 |   | * | 3/2013 |
| JP | 2013-246076 | A |   | 12/2013 |
| JP | 2016-194533 | A |   | 11/2016 |
| WO | 2007/028202 | A1 |   | 3/2007 |
| WO | 2013/192607 | A1 |   | 12/2013 |

OTHER PUBLICATIONS

International Search Report issued in PCT/JP2021/035880 mailed on Dec. 7, 2021 with English Translation (5 pages).
Written Opinion of the International Searching Authority issued in PCT/JP2021/035880 mailed on Dec. 7, 2021 with English Translation (7 pages).

* cited by examiner (A)                    (B)

(A)

(B)

(A)                    (B)

(A)                                        (B)

(A)                                        (B)

(A)                 (B)

(A)                    (B)                    (C)

(A)                    (B)

(A)                  (B)

CASSETTE HOLDER

CROSS-REFERENCE TO RELATED APPLICATIONS

This application is a continuation application of International Patent Application No. PCT/JP2021/035880 filed on Sep. 29, 2021, which claims priority to Japanese Patent Application No. 2020-165304 filed on Sep. 30, 2020, the entire contents of which are incorporated by reference.

TECHNICAL FIELD

The present invention relates to a cassette holder.

BACKGROUND ART

Patent Literature 1 discloses a medical test cassette including a cassette body, a lid body, and a shielding plate. The cassette body is a rectangular container opened upward and has a bottom portion provided with multiple through holes. The lid body has multiple through holes and is attached to an upper portion of the cassette body. The shielding plate is a plate-shaped member having an upper surface provided with multiple protrusions that can be fitted into the through holes formed in the bottom portion of the cassette body.

CITATION LIST

Patent Literature

Patent Literature 1: JP 2013-246076 A

According to the invention described in Patent Literature 1, the cassette is immersed in chemical liquid together with a specimen sealed in the cassette with the lid body attached to the cassette body. In this process, the cassette body and the lid body need to be reliably fixed so that the lid body does not detach from the cassette body. However, according to the invention described in Patent Literature 1, when taking out an embedded block, the lid body needs to be detached from the cassette body after paraffin solidification, meaning that an operation of taking out the embedded block is not easy and is cumbersome. Furthermore, the invention described in Patent Literature 1 is premised on the chemical liquid treatment in which a cassette (that is, a specimen in the cassette) is manually immersed in the chemical liquid, meaning that a person needs to touch and take out the cassette immersed in the chemical liquid from the chemical liquid, and this is an insufficient procedure. Thus, with the invention described in Patent Literature 1, an embedded block is prepared with a low workability.

SUMMARY OF INVENTION

One or more embodiments of the present invention provide a cassette holder with which an embedded block is prepared with high workability.

For example, a cassette holder according to one or more embodiments of the present invention to achieve the object described above is configured to hold a cassette for medical use, the cassette holder and includes: a cassette receiving portion to which the cassette is set, the cassette receiving portion including a bottom surface to which a lower surface of the cassette is brought into contact when the cassette is set; a plate-shaped portion that is provided in the cassette receiving portion, has a substantially plate-like shape, and extends substantially parallel to the bottom surface; and a protrusion inside of which is hollow, the protrusion being provided to the bottom surface to protrude downward, wherein the bottom surface and the protrusion are provided with a plurality of through holes.

According to the cassette holder of one or more embodiments of the present invention, the plate-shaped portion having a plate shape extends substantially parallel to the bottom surface of the cassette receiving portion. With this configuration, the plate-shaped portion may be gripped when immersing the cassette set to the cassette receiving portion in chemical liquid, meaning that the cassette immersed in the chemical liquid needs not to be touched. Thus, the work can be safely and efficiently can be performed. Thus, the embedded block is prepared with excellent workability.

The cassette receiving portion may be provided with a first slit and a second slit, and the first slit and the second slit may be collinearly arranged in plan view. Thus, the embedded block can be easily taken out from the inside of the cassette holder, with the cassette holder easily folded along the slits. Thus, the embedded block can be efficiently prepared.

The cassette receiving portion may have a rectangular shape in plan view, the plate-shaped portion may be provided to one of two short sides of the cassette receiving portions, and the first slit and the second slit may be substantially parallel to the short side. Thus, the cassette holder can be easily folded along the first slit and the second slit.

The first slit and the second slit may be provided in the cassette receiving portion and the protrusion, the cassette receiving portion may include a rib that protrudes upward from the bottom surface, and come into contact with a peripheral edge of the cassette when the cassette is set, and in side view, a height of the first slit and the second slit may be equal to or more than half of a distance between a distal end of the rib and a distal end of the protrusion. Thus, the cassette holder can be folded along the first slit and the second slit with a small amount of force.

The cassette receiving portion may have a rectangular shape in plan view, the plate-shaped portion may be provided to one of two short sides of the cassette receiving portion, the plate-shaped portion may include a first side and a second side along a first direction that is substantially parallel to the cassette receiving portion, and the first side and the second side may be respectively provided with a first projection and a second projection that are a pair of projections protruding outward in plan view. With this configuration, when the cassette set to the cassette receiving portion is immersed in the chemical liquid with the plate-shaped portion gripped, the first projection and the second projection are caught on an opening portion of a bottle body of a chemical liquid bottle or a paraffin-filled bottle, so that the cassette holder does not fall into the chemical liquid bottle. Thus, the cassette can be easily taken out from the chemical liquid with the plate-shaped portion gripped, whereby excellent workability is achieved.

The cassette receiving portion may have a rectangular shape in plan view, the plate-shaped portion may be provided to one of two short sides of the cassette receiving portion, the plate-shaped portion may include a first side and a second side along a first direction that is substantially parallel to a long side of the cassette receiving portion, the first side and the second side may be respectively provided with a first projection and a second projection that are a pair of projections protruding outward in plan view, and a distal end of each of the first projection and the second projection may be configured to be movable in a second direction substantially orthogonal to the first direction. With this configuration, when the cassette set to the cassette receiving portion is immersed in the chemical liquid with the plate-shaped portion gripped, the first projection and the second projection are caught on the opening portion of the bottle body of the chemical liquid bottle or the paraffin-filled bottle, so that the cassette holder does not fall into the chemical liquid bottle. Thus, the cassette can be easily taken out from the chemical liquid with the plate-shaped portion gripped, whereby excellent workability is achieved.

The first side and the second side may be respectively provided with a third projection and a fourth projection that are a pair of projections protruding outward in plan view, a distal end of each of the third projection and the fourth projection may be configured to be movable in a second direction substantially orthogonal to the first direction, and the third projection and the fourth projection may be provided between the cassette receiving portion and the first projection and the second projection. Thus, the third projection and the fourth projection come into contact with the inner circumference surface of the bottle body. Thus, the cassette holder can be prevented from rotating in the bottle body.

The third projection and the fourth projection may include a flat surface portion that is substantially parallel to the first side and the second side, and is substantially orthogonal to a plane including the plate-shaped portion. With this configuration, the flat surface portion presses the inner circumference surface of the bottle body. Thus, the cassette holder can be fixed to the bottle body with the cassette holder inserted in the bottle body prevented from rotating.

The third projection and the fourth projection may each include an arm portion that has an elongated plate shape and has a base end side provided in vicinity of the cassette receiving portion to be in a cantilever form, and the arm portion may be elastically deformable. With this configuration, the third projection and the fourth projection can have a simple shape.

The third projection and the fourth projection may each have a hook shape, and each include an arm portion of a cantilever form that protrudes toward the cassette receiving portion from a corresponding one of the first projection and the second projection and has an elongated plate shape extending substantially parallel to the first side and the second side, and a protruding portion that has an elongated plate shape, is provided at a distal end of the arm portion, and protrudes in a direction away from the plate-shaped portion, and the protruding portion may include a connection portion having one end provided to the arm portion, and an arc portion that has an arc shape and is provided on side of the connection portion opposite to the arm portion, and has center located closer to the plate-shaped portion than the protruding portion is. With this configuration, the arm portion extends substantially parallel to the first side and the second side, the direction of the force applied to the flat surface portion substantially coincides with the deformation direction of the arm portion, whereby the flat surface portion easily moves. Furthermore, the third projection and the fourth projection (the arm portion and the protruding portion) have long total lengths, and thus the third projection and the fourth projection can be elastically deformed by a small amount of force.

The third projection and the fourth projection may have distal end portions provided on ends not provided to the plate-shaped portion, and the distal end portions may be inclined to have portions closer to the first projection and the second projection being closer to the plate-shaped portion. With this configuration, even when a projection due to burr or the like is formed in the opening portion of the bottle body into which the cassette holder is inserted, the third projection and the fourth projection would not get caught, whereby cassette holder can be easily inserted in and taken out from the bottle.

The protruding portion may have a flat surface portion substantially orthogonal to a plane including the plate-shaped portion, and the flat surface portion may be provided to an end of the arc portion on side opposite to the connection portion, and is inclined with respect to the first side and the second side in plan view. When the flat surface portion is inclined to have a portion closer to the first projection and the second projection being farther from the first side and the second side, the flat surface portion can more strongly press the inner circumference surface of the tubular bottle body. When the flat surface portion is inclined to have a portion closer to the first projection and the second projection being closer to the first side and the second side, the flat surface portion moves to be substantially parallel to the first side and the second side with the third projection and the fourth projection deformed, whereby the inner circumference surface of the bottle body can be pressed by the entire flat surface portion.

The flat surface portion of the third projection may be inclined with respect to the first side to have a portion closer to the first projection being closer to the first side, and the flat surface portion of the fourth projection may be inclined with respect to the second side to have a portion closer to the second projection being closer to the second side. Thus, when the flat surface portion is inclined to have a portion closer to the first projection and the second projection being closer to the first side and the second side, the third projection and the fourth projection are deformed while pressing the inner circumference surface of the bottle body by the arc portion. Thus, the cassette holder is inserted in and taken out from the bottle body without imposing excessive force onto the third projection and the fourth projection, whereby the cassette holder is inserted and taken out smoothly, and the third projection and the fourth projection are prevented from being damaged.

One or more embodiments of the present invention can provide a cassette holder with which an embedded block can be prepared with high workability.

DESCRIPTION OF EMBODIMENTS

Hereinafter, embodiments of the present invention will be described in detail with reference to the drawings. The paraffin-embedded block preparation device of the present invention is, for example, a device for preparing a paraffin-fixed embedded block used for a genetic test such as an oncogene panel test. The cassette holder of the present invention is a member for holding a cassette for medical use, and is used for preparing a paraffin-fixed embedded block.

First Embodiment

Figure 1:
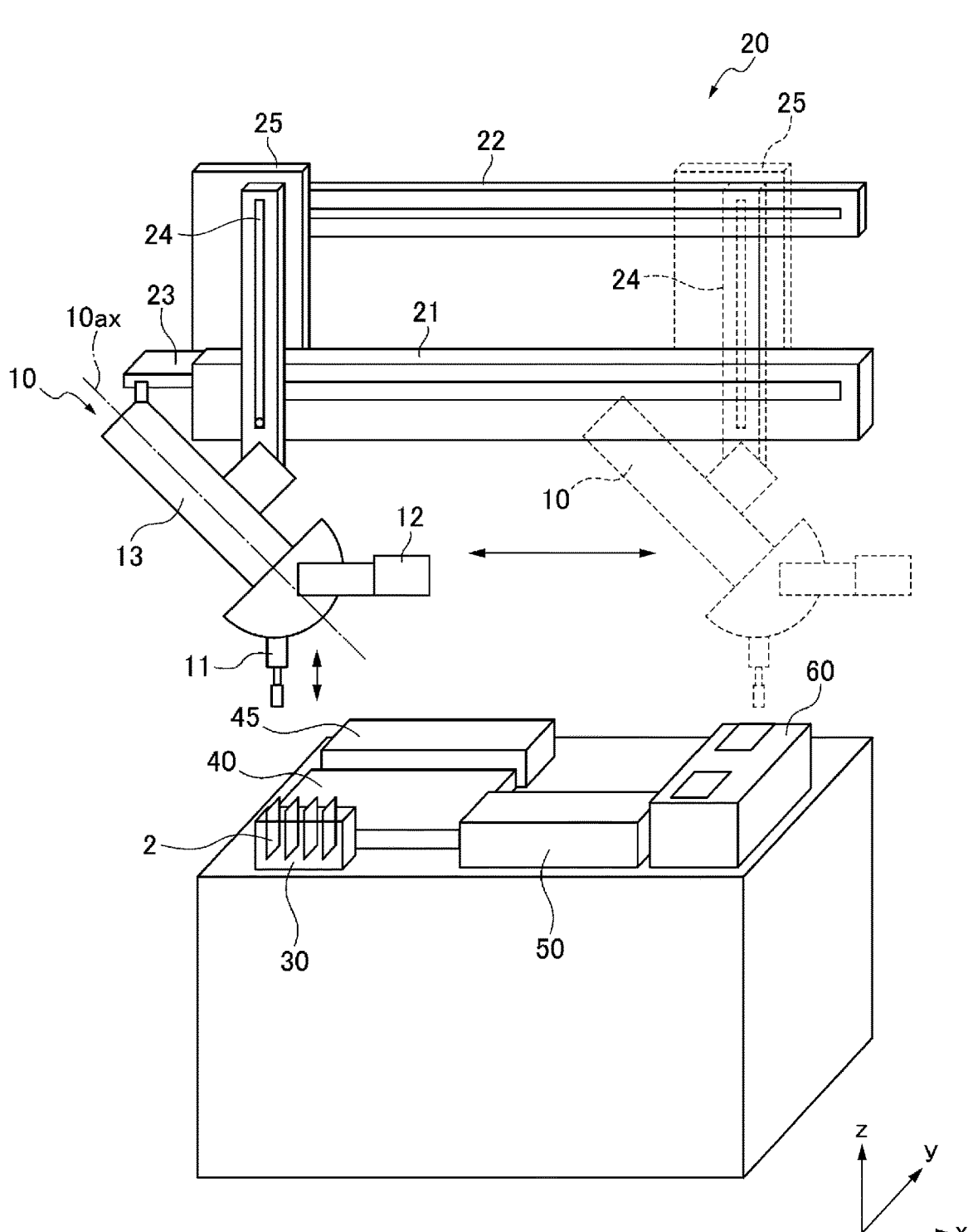
FIG. 1 is a perspective view illustrating a schematic configuration of a paraffin-embedded block preparation device 1 of an embodiment of the present invention.
Figure 2:
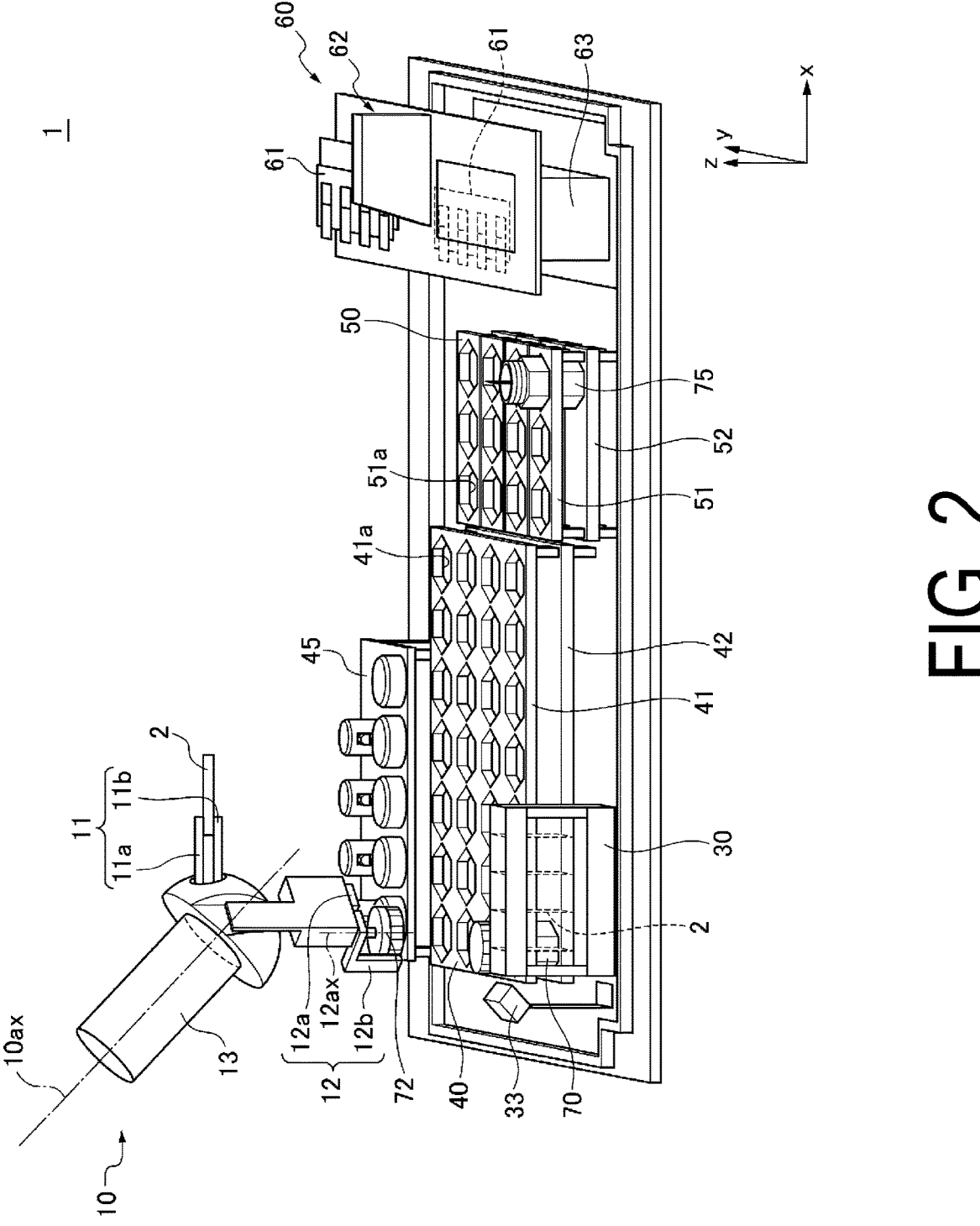
FIG. 2 is a perspective view illustrating a schematic configuration of the paraffin-embedded block preparation device 1.

FIGS. 1 and 2 are perspective views illustrating an example of a schematic configuration of a paraffin-embedded block preparation device 1 of an embodiment of the present invention. FIG. 2 is an enlarged view of a main part of the paraffin-embedded block preparation device 1. In the following description, an x direction and a y direction are defined as the horizontal direction, and a z direction is defined as the vertical direction. The x direction and the y direction are orthogonal to each other.

The paraffin-embedded block preparation device 1 mainly includes a head 10, a conveying unit 20 (corresponding to a first conveying unit), a holding portion 30, a chemical liquid bottle holding portion 40, a paraffin-filled bottle holding portion 50, and a paraffin fixing unit 60.

The head 10 is provided to the conveying unit 20 and is disposed above the holding portion 30, the chemical liquid bottle holding portion 40, and the paraffin-filled bottle holding portion 50. The head 10 mainly includes a cassette holder gripping unit 11 that grips a cassette holder 2 (described in detail below), a lid gripping unit 12 that grips a lid 72 (described in detail below), and a body portion 13 provided with the cassette holder gripping unit 11 and the lid gripping unit 12.

The cassette holder gripping unit 11 has two claws 11a and 11b (see FIG. 2) provided to be movable in parallel, and grips the cassette holder 2 using the claws 11a and 11b. The lid gripping unit 12 has two claws 12a and 12b (see FIG. 2) provided to be movable in parallel, and grips the lid 72 using the claws 12a and 12b.

The cassette holder gripping unit 11 includes an opening/closing unit (not illustrated) that opens and closes the claws 11a and 11b between a closed position at which the cassette holder 2 is gripped and an open position at which the cassette holder 2 is not gripped. The lid gripping unit 12 is provided with an opening/closing unit (not illustrated) that opens and closes the claws 12a and 12b between a closed position at which the lid 72 is gripped and an open position at which the lid 72 is not gripped. The opening/closing unit includes an actuator and a transmission mechanism that transmits power from the actuator.

The lid gripping unit 12 is provided so as to be rotatable about an axis 12ax. The lid gripping unit 12 includes an actuator that rotates the lid gripping unit 12 and a transmission mechanism that transmits power from the actuator.

The body portion 13 is provided so as to be rotatable about an axis 10ax. The body portion 13 includes an actuator that rotates the body portion 13 and a transmission mechanism that transmits power from the actuator.

The head 10 can adjust the orientations of the cassette holder gripping unit 11 and the lid gripping unit 12 by rotating the body portion 13 about the axis 10ax. The axis 10ax is inclined at approximately 45 degrees with respect to the z direction. The longitudinal directions of the cassette holder gripping unit 11 and the lid gripping unit 12 are inclined at approximately 45 degrees with respect to the axis 10ax of the head 10. Therefore, when the head 10 is rotated about the axis 10ax, the positions and orientations of the cassette holder gripping unit 11 and the lid gripping unit 12 are changed between: a state where the longitudinal direction of the cassette holder gripping unit 11 is along the z direction (the cassette holder gripping unit 11 holds the cassette holder 2 vertically) and the longitudinal direction of the lid gripping unit 12 is along the x direction; and a state where the longitudinal direction of the cassette holder gripping unit 11 is along the x direction (the cassette holder gripping unit 11 holds the cassette holder 2 horizontally) and the longitudinal direction of the lid gripping unit 12 is along the z direction.

The conveying unit 20 makes the head 10 move in the horizontal direction or the vertical direction. The conveying unit 20 mainly includes rails 21 and 22 extending in the x direction, a rail 23 extending in the y direction, a rail 24 extending in the z direction, and a driving unit 25 including an actuator (not illustrated).

The rail 21 is provided with the rail 24 and the rail 22 is provided with the driving unit 25. The driving unit 25 is provided with the rail 23. The driving unit 25 makes the head 10 and the rails 23 and 24 move in the x direction along the rail 21, and makes the head 10 move in the y direction along the rail 23.

The head 10 is provided to the rail 24. The driving unit 25 moves the head 10 and the rails 23 and 24 in the z direction.

Thus, the conveying unit 20 can convey the head 10, that is, the cassette holder 2 gripped by the cassette holder gripping unit 11 among the holding portion 30, the chemical liquid bottle holding portion 40, the paraffin-filled bottle holding portion 50, and the paraffin fixing unit 60.

Figure 3:
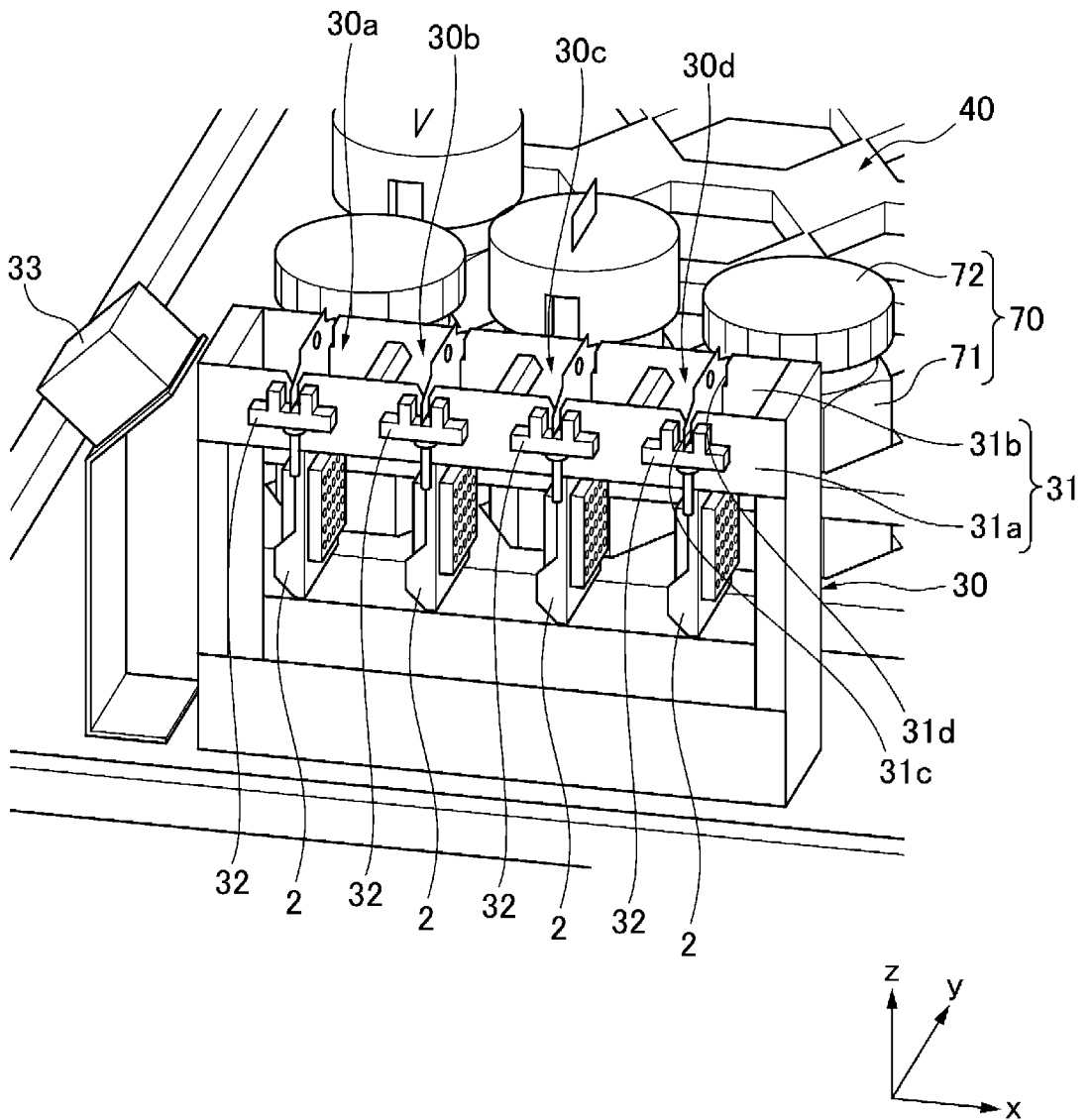
FIG. 3 is a perspective view illustrating an example of a schematic configuration of a holding portion 30.

The holding portion 30 holds the cassette holder vertically. FIG. 3 is a perspective view illustrating an example of a schematic configuration of the holding portion 30.

The holding portion 30 mainly includes a frame 31 and a sensor 32. The frame 31 includes two plate-shaped portions 31a and 31b disposed in parallel while extending substantially along the x direction. The plate-shaped portions 31a and 31b are respectively provided with four slits 31c and four slits 31d. The slits 31c and 31d extend along the z direction, and the positions of the slits 31c and the slits 31d in the x direction substantially match.

With the slits 31c and 31d, the holding portion 30 is provided with holding portions 30a, 30b, 30c, and 30d adjacent to each other. The cassette holder 2 is inserted into the slits 31c and 31d. As a result, the cassette holder 2 is held vertically in the holding portions 30a, 30b, 30c, and 30d. When the cassette holder 2 is vertically oriented, the longitudinal direction of the cassette holder 2 is along the vertical direction.

In the mode illustrated in FIG. 3, the holding portions 30a, 30b, 30c, and 30d are provided adjacent to each other, but the holding portions 30a, 30b, 30c, and 30d may not be adjacent to each other.

Figure 4:
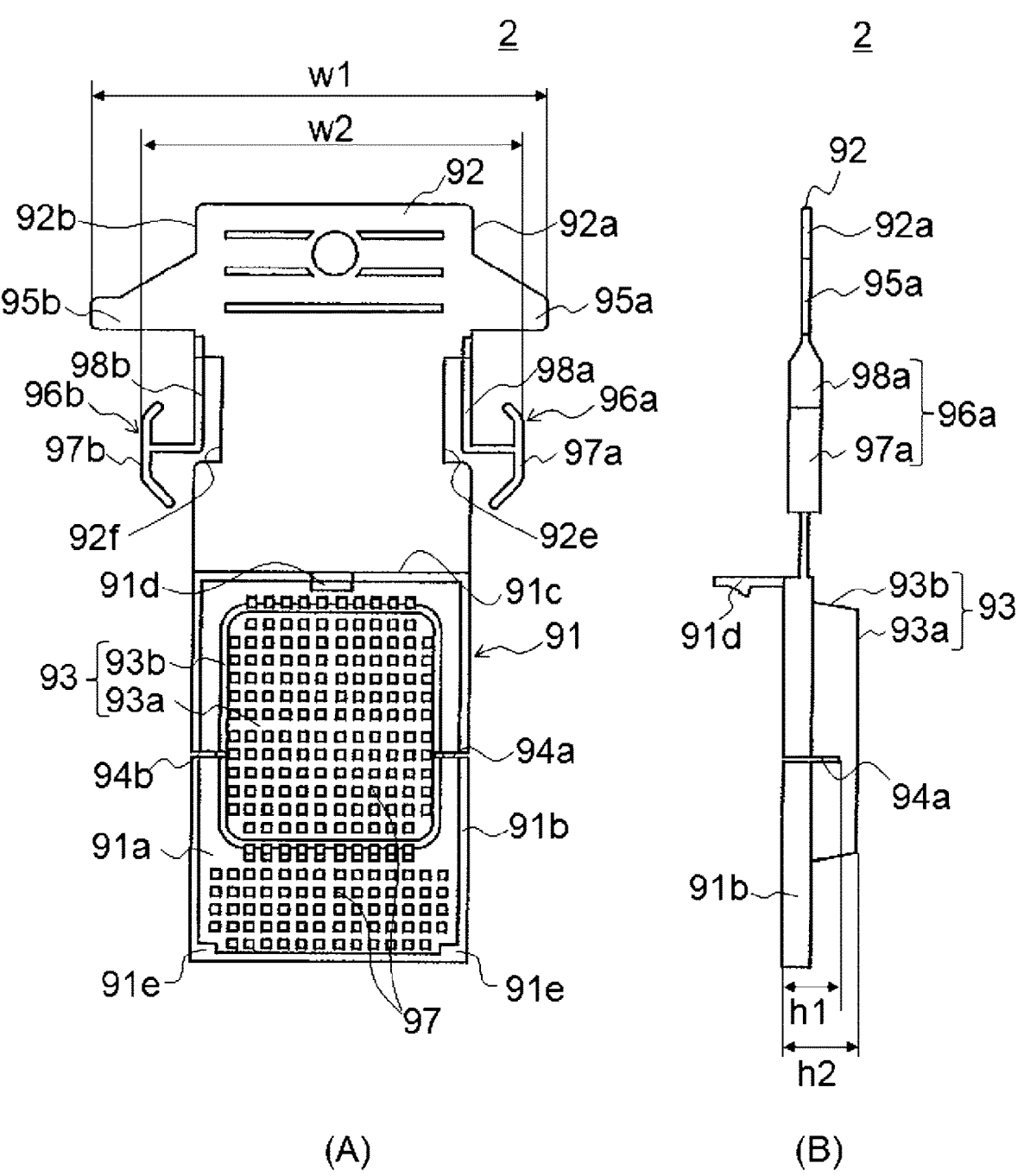
FIG. 4 is a diagram illustrating an example of a schematic configuration of a cassette holder 2, with (A) being a front view and (B) being a side view.

The cassette holder 2 will now be described. FIG. 4 is a diagram illustrating an example of a schematic configuration of the cassette holder 2, with (A) being a plan view and (B) being a side view.

The cassette holder 2 mainly includes a cassette receiving portion 91 to which a cassette 101 (see FIG. 5) is set, a plate-shaped portion 92 having a substantially plate-like shape, and a protrusion 93 provided on the cassette receiving portion 91. The cassette receiving portion 91 and the protrusion 93 are provided with a pair of slits 94a and 94b.

In the description of the cassette holder 2, a direction substantially orthogonal to the extending direction of the plate-shaped portion 92 is defined as an upward-downward direction, a protruding direction of the protrusion 93 is defined as a downward direction, and a direction opposite to the protruding direction of the protrusion 93 is defined as an upward direction. The plan view in FIG. 4(A) illustrates the cassette holder 2 as viewed from above.

The cassette receiving portion 91 has a rectangular shape in plan view (when the cassette holder 2 is viewed from above), and mainly includes a bottom surface 91a and a rib 91b. The bottom surface 91a is a flat surface with which the lower surface of the cassette 101 comes into contact when the cassette 101 is set, and has a rectangular shape in plan view. The bottom surface 91a is provided with a plurality of through holes 97.

The rib 91b protrudes upward from the bottom surface 91a. The rib 91b has a rectangular shape in plan view and comes into contact with the peripheral edge of the cassette 101 when the cassette 101 is set. However, the shape of the rib 91b is not limited to this. For example, the rib may have a rectangular U shape in plan view, or may be made up of two parallel bar-shaped portions.

The rib 91b is provided with a cassette pressing claw 91d for holding the cassette 101 when the cassette 101 is set to the cassette receiving portion 91. However, the cassette pressing claw 91d is not essential.

The bottom surface 91a is provided with the protrusion 93 protruding downward. The inside of the protrusion 93 is hollow. In the present embodiment, the protrusion 93 has a substantially truncated pyramid shape, but the shape of the protrusion 93 is not limited to this.

The protrusion 93 is provided with the plurality of through holes 97. In the present embodiment, the through holes 97 are provided in a bottom surface 93a of the protrusion 93 and is not provided in a side surface 93b, but may be provided in the side surface 93b.

Figure 5:
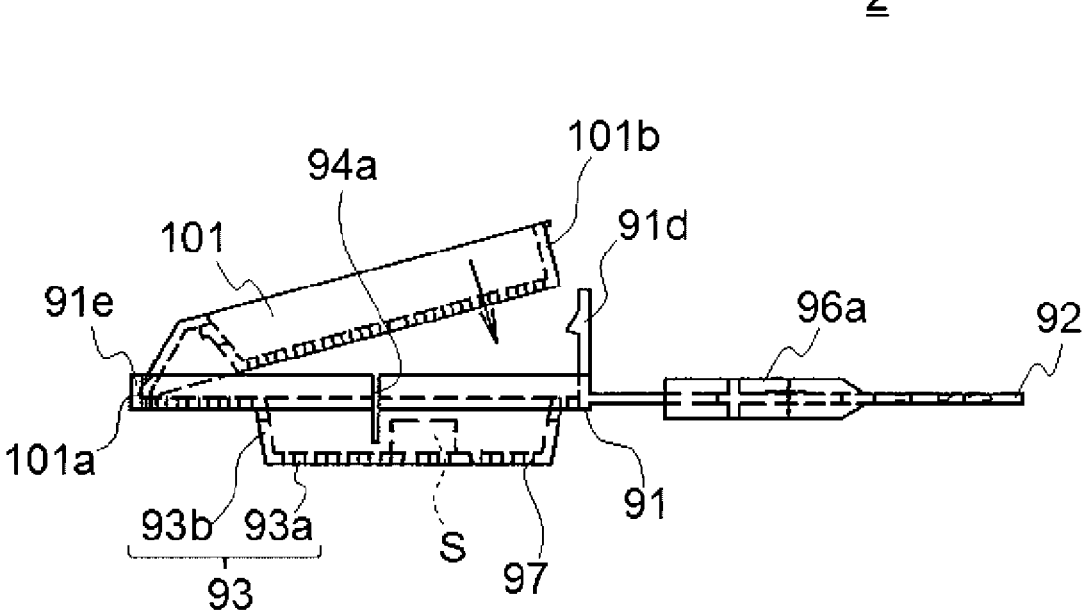
FIG. 5 is a diagram illustrating a how a cassette 101 is set to the cassette holder 2.

FIG. 5 is a diagram illustrating a state how the cassette 101 is set to the cassette holder 2. In a state where a specimen (hereinafter, referred to as sample S) is placed on the bottom surface 93a, the cassette 101 is attached to the cassette receiving portion 91. When a rear end 101b of the cassette 101 is inserted into the rib 91b after a front end 101a of the cassette 101 has been brought into contact with a projection 91e of the rib 91b, the cassette pressing claw 91d is caught by the rear end 101b. As a result, the cassette 101 is attached to the cassette holder 2, and the sample S is sealed in the cassette holder 2.

The description will now return to FIG. 4. The bottom surface 91a, the rib 91b, and the side surface 93b are provided with the slits 94a and 94b. The slits 94a and 94b are substantially parallel to the short sides of the rib 91b, and are collinearly arranged in plan view of the cassette holder 2. A height h1 of the slits 94a and 94b in side view is equal to or more than half of a distance h2 between a distal end of the rib 91b and a distal end of the protrusion 93.

The plate-shaped portion 92 is provided on one side 91c of the two short sides of the rib 91b. The plate-shaped portion 92 extends substantially parallel to the bottom surface 91a. The plate-shaped portion 92 has a substantially rectangular shape in plan view of the cassette holder 2, and has two sides 92a and 92b along a direction (first direction) substantially parallel to the long side of the rib 91b. The sides 92a and 92b have substantially the same length as the long side of the rib 91b in plan view. As a result, the direction along the sides 92a and 92b is the longitudinal direction of the cassette holder 2.

The sides 92a and 92b are provided with projections 95a and 95b, respectively. The projections 95a and 95b are a pair of projections protruding outward in plan view.

The sides 92a and 92b are provided with projections 96a and 96b, respectively. The projections 96a and 96b are a pair of projections protruding outward in plan view. The heights of the projections 96a and 96b are lower than the heights of the projections 95a and 95b. In other words, a width w2 between both ends of the projections 96a and 96b is smaller than a width w1 between both ends of the projections 95a and 95b. The projections 96a and 96b are provided between the cassette receiving portion 91 and the projections 95a and 95b.

The distal end of each of the projections 96a and 96b is configured to be movable in a direction (second direction) substantially parallel to the short side (side 91c) of the rib 91b. The projections 96a and 96b respectively include flat surface portions 97a and 97b substantially parallel to the sides 92a and 92b, and L-shaped arm portions 98a and 98b connecting the flat surface portions 97a and 97b and the sides 92a and 92b. The flat surface portions 97a and 97b are substantially orthogonal to a plane including the plate-shaped portion 92.

The sides 92a and 92b respectively include recesses 92e and 92f. The flat surface portions 97a and 97b move in a direction substantially parallel to the side 91c, with base end portions of the arm portions 98a and 98b deforming inside the recesses 92e and 92f.

Both ends of the flat surface portions 97a and 97b are bent toward the plate-shaped portion 92. The connection portions between the flat surface portions 97a and 97b and the bent portions of both ends may have an edge shape or an arc shape (R shape).

However, the configuration enabling the movement of the distal ends of the projections 96a and 96b in the direction substantially parallel to the side 91c is not limited to this.

The description will now return to FIG. 3. The sensor 32 is a sensor that detects whether the cassette holder 2 is held in the holding portions 30a, 30b, 30c, and 30d, and is provided for each of the holding portions 30a, 30b, 30c, and 30d. The sensor 32 is, for example, a transmission-type optical sensor, and has a light emitting unit and a light receiving unit facing each other across the slit 31c. The sensor 32 detects the presence or absence of the cassette holder 2, based on a fact that light emitted from the light emitting unit is blocked by the cassette holder 2 (projection 95a) inserted in the slit 31c so as to be not received by the light receiving unit.

A sensor 33 is provided adjacent to the frame 31. The sensor 33 is, for example, a reflective optical sensor, and detects the position of the cassette holder gripping unit 11.

The description will now return to FIGS. 1 and 2. In the chemical liquid bottle holding portion 40, a plurality of chemical liquid bottles 70 filled with chemical liquid containing formalin, ethanol, and xylene are provided adjacent to each other. When the cassette holder 2 is inserted into the chemical liquid bottles 70, the sample S inside the cassette holder 2 is immersed in the chemical liquid. A temporary placement portion 45 for temporarily placing a lid is provided adjacent to the chemical liquid bottle holding portion 40.

Figure 6:
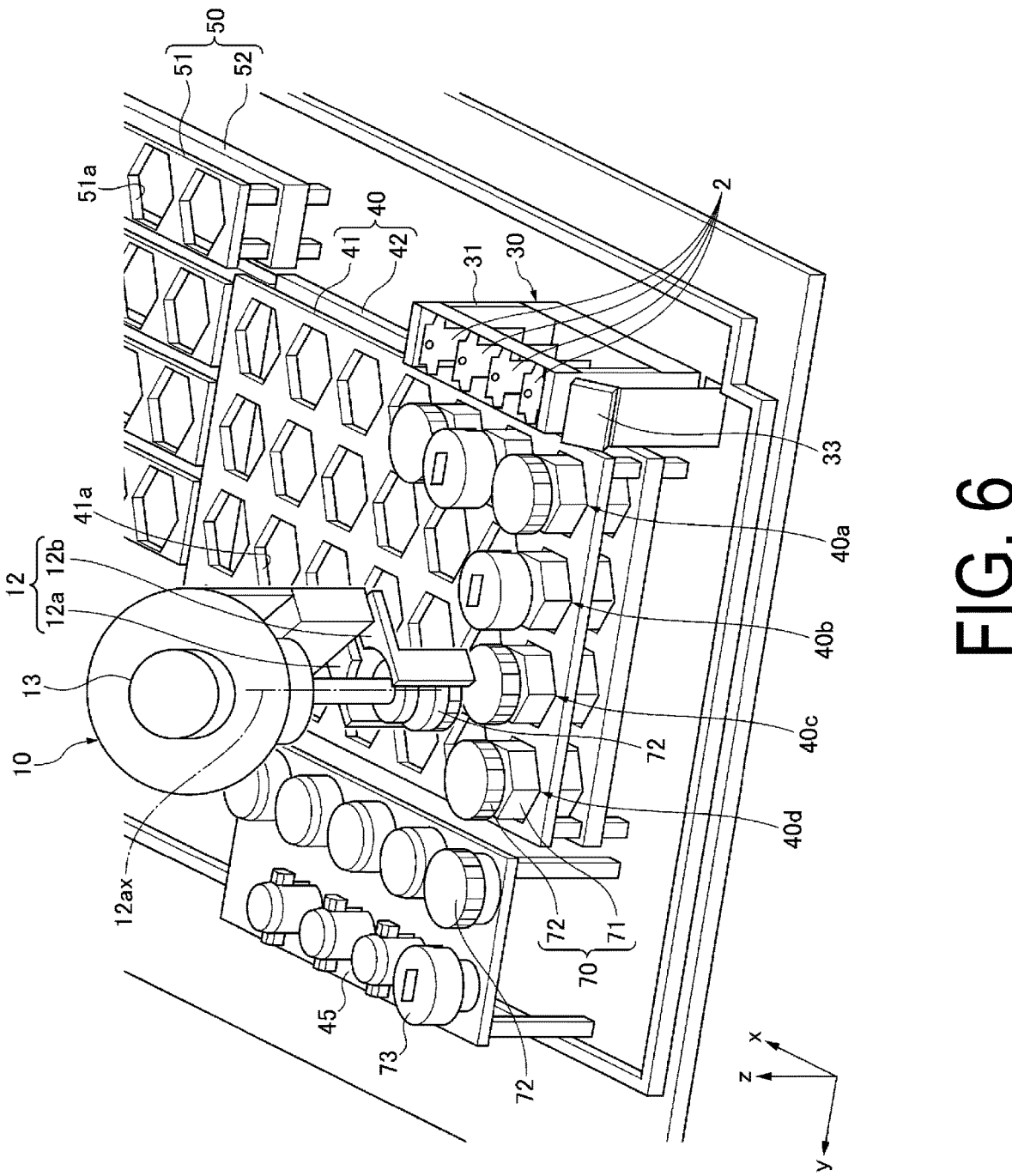
FIG. 6 is a perspective view illustrating an example of a schematic configuration of a chemical liquid bottle holding portion 40 and a temporary placement portion 45.

FIG. 6 is a perspective view illustrating an example of a schematic configuration of the chemical liquid bottle holding portion 40 and the temporary placement portion 45. The chemical liquid bottle holding portion 40 mainly includes plate-shaped portions 41 and 42 extending along the horizontal direction. The plate-shaped portion 41 is provided with a plurality of holes 41a.

The chemical liquid bottles 70 are provided in the holes 41a.

The chemical liquid bottle 70 includes a bottle body 71 a cross-sectional shape of which along a plane orthogonal to the center axis is polygonal, and the lid 72 that covers an opening portion of the bottle body 71. The bottle body 71 is made of, for example, glass. The bottle body 71 and the lid 72 are screwed together.

The shape of the hole 41a corresponds to the outer shape of the bottle body 71, and the bottle body 71 is inserted into the hole 41a. The holes 41a are arranged two-dimensionally along the x direction and the y direction. Therefore, the chemical liquid bottles 70 are two-dimensionally arranged in the chemical liquid bottle holding portion 40. When the bottle body 71 is inserted into the hole 41a, the bottom surface of the bottle body 71 is placed on the plate-shaped portion 42.

Figure 7:
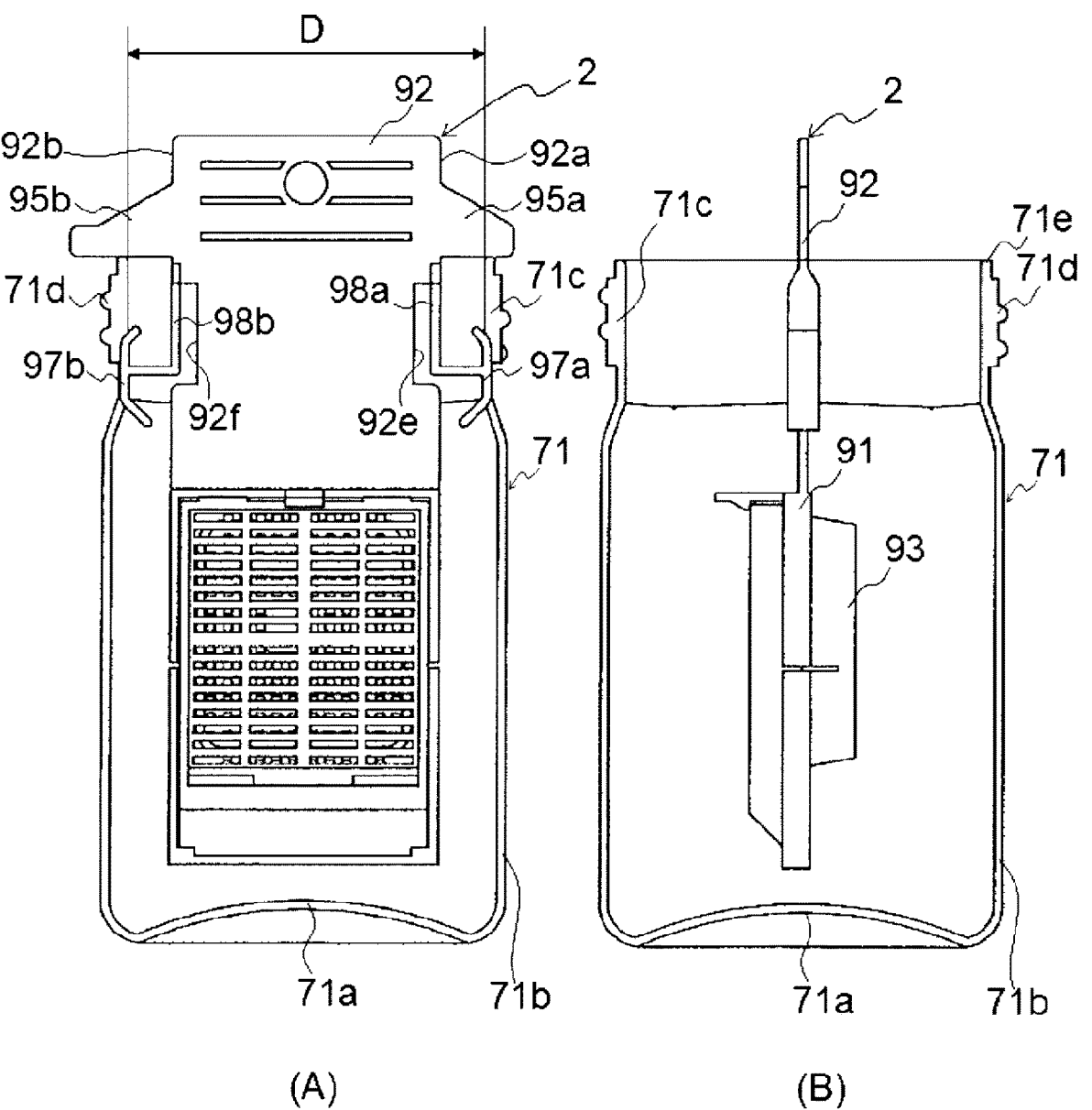
FIG. 7 is a diagram illustrating an example of a schematic configuration of a bottle body 71 in which the cassette holder 2 is provided, with (A) being a front view of the cassette holder 2 and (B) being a side view of the cassette holder 2.

The cassette holder 2 is inserted into the chemical liquid bottle 70. FIG. 7 is a diagram illustrating an example of a schematic configuration of the bottle body 71 in which the cassette holder 2 is provided, with (A) being a front view of the cassette holder 2 and (B) being a side view of the cassette holder 2. FIG. 7 is a cross-sectional view of the bottle body 71, with hatching indicating a cross section omitted.

The bottle body 71 mainly includes a bottom surface 71a, a side surface 71b that forms a hexagonal cylindrical shape and is provided on the upper side of the bottom surface 71a, and a tubular portion 71c that has a cylindrical shape and is provided on the upper side of the side surface 71b. The tubular portion 71c has an outer circumference surface provided with a thread 71d screwed with a thread formed on the lid 72. The tubular portion 71c has an opening portion 71e as an upper end surface.

The cassette holder 2 is inserted into the bottle body 71 through the opening portion 71e. During this process, the cassette holder 2 is vertically orientated with the plate-shaped portion 92 extending along the vertical direction. Since the width w1 (see FIG. 4) between both ends of the projections 95a and 95b is larger than a diameter D of the tubular portion 71c, the projections 95a, 95b are caught on the opening portion 71e, whereby the cassette holder 2 is positioned in the z direction.

The width w2 (see FIG. 4) between both ends of the projections 96a and 96b is smaller than the width w1 (see FIG. 4) between both ends of the projections 95a and 95b. Thus, the distal ends (the flat surface portions 97a and 97b) of the projections 96a and 96b are configured to be movable in a width direction of the cassette holder 2. Therefore, when the cassette holder 2 is inserted into the bottle body 71, the flat surface portions 97a and 97b come into contact with an inner circumference surface of the tubular portion 71c, and the flat surface portions 97a and 97b press the inner circumference surface of the tubular portion 71c. As a result, the cassette holder 2 is fixed to the bottle body 71 with the cassette holder 2 inserted in the bottle body 71 prevented from rotating.

The description will now return to FIG. 6. The chemical liquid bottle holding portion 40 includes chemical liquid bottle holding portions 40a, 40b, 40c, and 40d adjacently arranged. The chemical liquid bottle holding portions 40a to 40d are provided adjacent to each other in the y direction herein, but may not be adjacent to each other.

The chemical liquid bottle holding portions 40a to 40d respectively correspond to the holding portions 30a to 30d. The cassette holder 2 held in the holding portion 30a is immersed in the chemical liquid bottle 70 provided in the chemical liquid bottle holding portion 40a. The cassette holder 2 held in the holding portion 30b is immersed in the chemical liquid bottle 70 provided in the chemical liquid bottle holding portion 40b. The cassette holder 2 held in the holding portion 30c is immersed in the chemical liquid bottle 70 provided in the chemical liquid bottle holding portion 40c. The cassette holder 2 held in the holding portion 30d is immersed in the chemical liquid bottle 70 provided in the chemical liquid bottle holding portion 40d.

Figure 8:
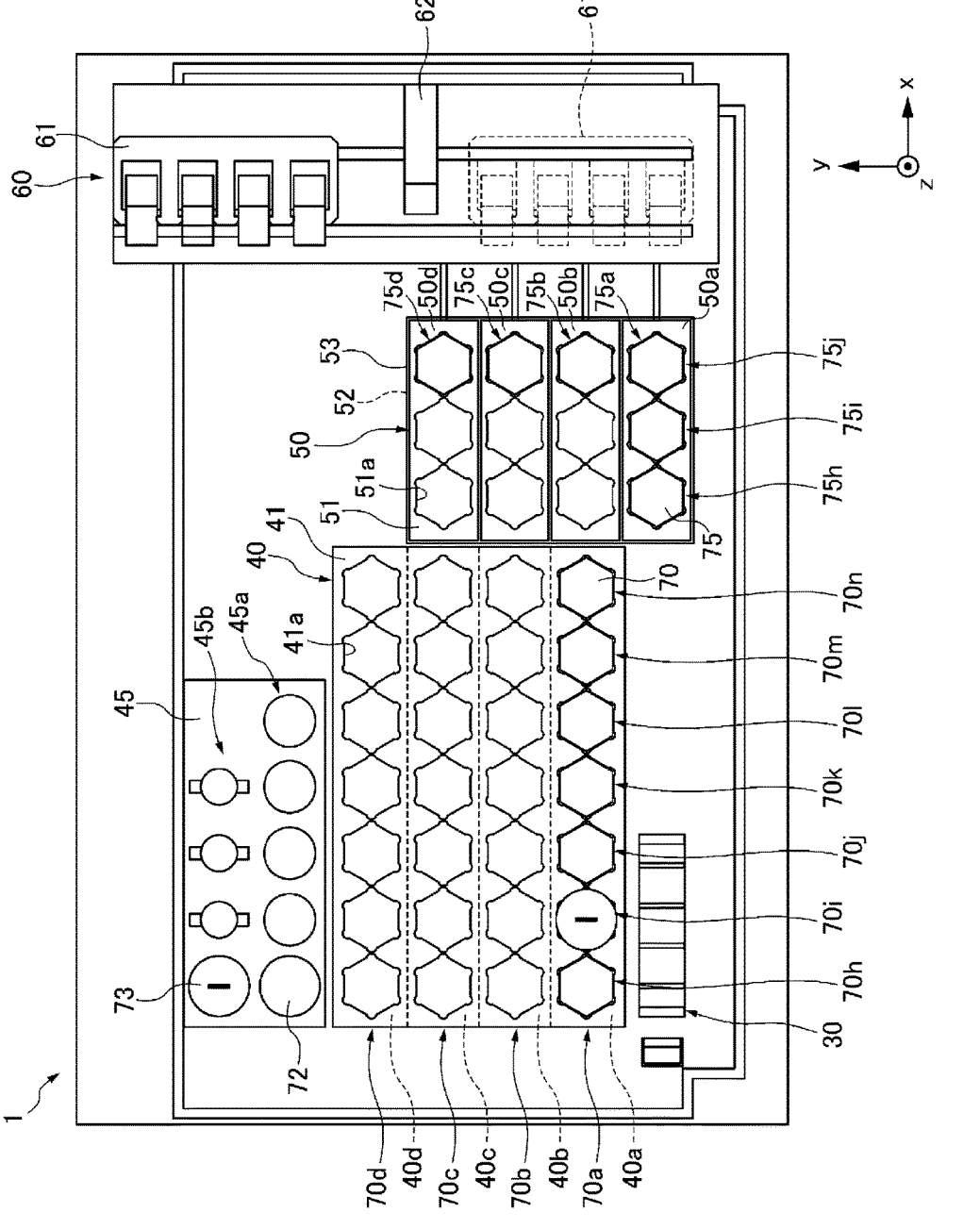
FIG. 8 is a plan view illustrating a schematic configuration of the paraffin-embedded block preparation device 1.

FIG. 8 is a plan view illustrating a schematic configuration of the paraffin-embedded block preparation device 1. In FIG. 8, the head 10 and the conveying unit 20 are omitted.

The chemical liquid bottle holding portions 40a to 40d are regions elongated in the x direction, and are respectively provided with chemical liquid bottle groups 70a to 70d. The chemical liquid bottle groups 70a to 70d include a plurality of chemical liquid bottles 70 provided along the x direction.

The cassette holder 2 held in the holding portion 30a is inserted into the chemical liquid bottle group 70a. The cassette holder 2 held in the holding portion 30b is inserted into the chemical liquid bottle group 70b. The cassette holder 2 held in the holding portion 30c is inserted into the chemical liquid bottle group 70c. The cassette holder 2 held in the holding portion 30d is inserted into the chemical liquid bottle group 70d.

Each of the chemical liquid bottle groups 70a to 70d includes seven chemical liquid bottles 70. The chemical liquid bottle groups 70a to 70d each include a chemical liquid bottle 70 h (corresponding to a first chemical liquid bottle) filled with formalin, chemical liquid bottles 70i, 70j, and 70k (corresponding to a second chemical liquid bottle) filled with ethanol, and chemical liquid bottles 70l, 70m, and 70n (corresponding to a third chemical liquid bottle) filled with xylene, arranged in this order from −x side. The cassette holder 2 is inserted into the chemical liquid bottles 70h, 70i, 70j, 70k, 70l, 70 m and 70n in this order.

Although some of the chemical liquid bottles 70 are not illustration in FIGS. 6 and 8, the chemical liquid bottles 70 are actually inserted into all the holes 41a in at least two of the chemical liquid bottle holding portions 40a to 40d.

The temporary placement portion 45 is provided on the farther side (+y side) of the chemical liquid bottle holding portion 40. The temporary placement portion 45 has a lid placement portion 45a on which the lid 72 removed from the bottle body 71 is placed, and a tentative lid placement portion 45b on which a tentative lid 73 is placed. The tentative lid 73 covers the bottle body 71 into which the cassette holder 2 has been inserted.

The description will now return to FIGS. 1 and 2. The paraffin-filled bottle holding portion 50 is provided adjacent to the chemical liquid bottle holding portion 40. However, the paraffin-filled bottle holding portion 50 and the chemical liquid bottle holding portion 40 may not be adjacent to each other. The paraffin-filled bottle holding portion 50 is provided with a paraffin-filled bottle 75 filled with paraffin in a liquid form (hereinafter, referred to paraffin liquid). The paraffin-filled bottle 75 is similar to the chemical liquid bottle 70 except that the liquid filled therein is paraffin, and includes the bottle body 71 and the lid 72.

As illustrated in FIG. 8, the paraffin-filled bottle holding portion 50 mainly includes plate-shaped portions 51 and 52 extending along the horizontal direction, and a heating portion 53. Each of the plate-shaped portions 51 is provided with a plurality of holes 51a. The shape of the hole 51a corresponds to the outer shape of the paraffin-filled bottle 75, and the paraffin-filled bottle 75 is inserted into the hole 51a. The holes 51a are arranged two-dimensionally along the x direction and the y direction. Therefore, the paraffin-filled bottles 75 are two-dimensionally arranged in the paraffin-filled bottle holding portion 50. When the paraffin-filled bottle 75 is inserted into the hole 51a, the bottom surface of the paraffin-filled bottle 75 is placed on the plate-shaped portion 52.

The heating portion 53 is provided so as to cover the plate-shaped portions 51 and 52. The heating portion 53 heats the liquid paraffin filling the paraffin-filled bottle 75 to about 60° C., to prevent solidification of the liquid paraffin.

Note that the form of the heating portion 53 is not limited to the illustrated form. For example, the heating portion 53 may be formed by attaching a heating wire to the plate-shaped portions 51 and 52.

The paraffin-filled bottle holding portion 50 includes paraffin-filled bottle holding portions 50a, 50b, 50c, and 50d adjacently arranged. The paraffin-filled bottle holding portions 50a to 50d are provided adjacent to each other in the y direction herein, but may not be adjacent to each other.

The paraffin-filled bottle holding portions 50a to 50d are regions elongated in the x direction, and are respectively provided with paraffin-filled bottle groups 75a to 75d. The paraffin-filled bottle groups 75a to 75d include the plurality of paraffin-filled bottles 75 provided along the x direction.

The paraffin-filled bottle holding portions 50a to 50d respectively correspond to the holding portions 30a to 30d and the chemical liquid bottle holding portions 40a to 40d. The cassette holder 2 held in the holding portion 30a is inserted in the paraffin-filled bottle 75 provided to the paraffin-filled bottle holding portion 50a. The cassette holder 2 held in the holding portion 30b is inserted in the paraffin-filled bottle 75 provided to the paraffin-filled bottle holding portion 50b. The cassette holder 2 held in the holding portion 30c is inserted in the paraffin-filled bottle 75 provided to the paraffin-filled bottle holding portion 50c. The cassette holder 2 held in the holding portion 30d is inserted in the paraffin-filled bottle 75 provided to the paraffin-filled bottle holding portion 50d.

The paraffin-filled bottle groups 75a to 75d each include three paraffin-filled bottles 75. The paraffin-filled bottle groups 75a to 75d each include paraffin-filled bottles 75h, 75i, and 75j in this order from the −x side. The cassette holder 2 is inserted in the paraffin-filled bottles 75h, 75i, and 75j in this order.

Although some of the paraffin-filled bottles 75 are not illustrated in FIGS. 6 and 8, the paraffin-filled bottles 75 are actually inserted into all the holes 51*a* in at least two of the paraffin-filled bottle holding portions 50*a* to 50*d*.

The description will now return to FIGS. 1 and 2. The paraffin fixing unit 60 is provided adjacent to the paraffin-filled bottle holding portion 50. However, the paraffin fixing unit 60 and the paraffin-filled bottle holding portion 50 may not be adjacent to each other.

The paraffin fixing unit 60 includes a placement portion 61 on which the cassette holder 2 is horizontally placed, a paraffin discharge unit 62 including a nozzle that discharges the paraffin, and a cooling unit 63 including a cooling mechanism. The placement portion 61 is provided to be movable in the horizontal direction (here, the y direction). The paraffin discharge unit 62 and the cooling unit 63 are provided adjacent to each other in the moving direction of the placement portion 61 which is the y direction herein.

Figure 9:
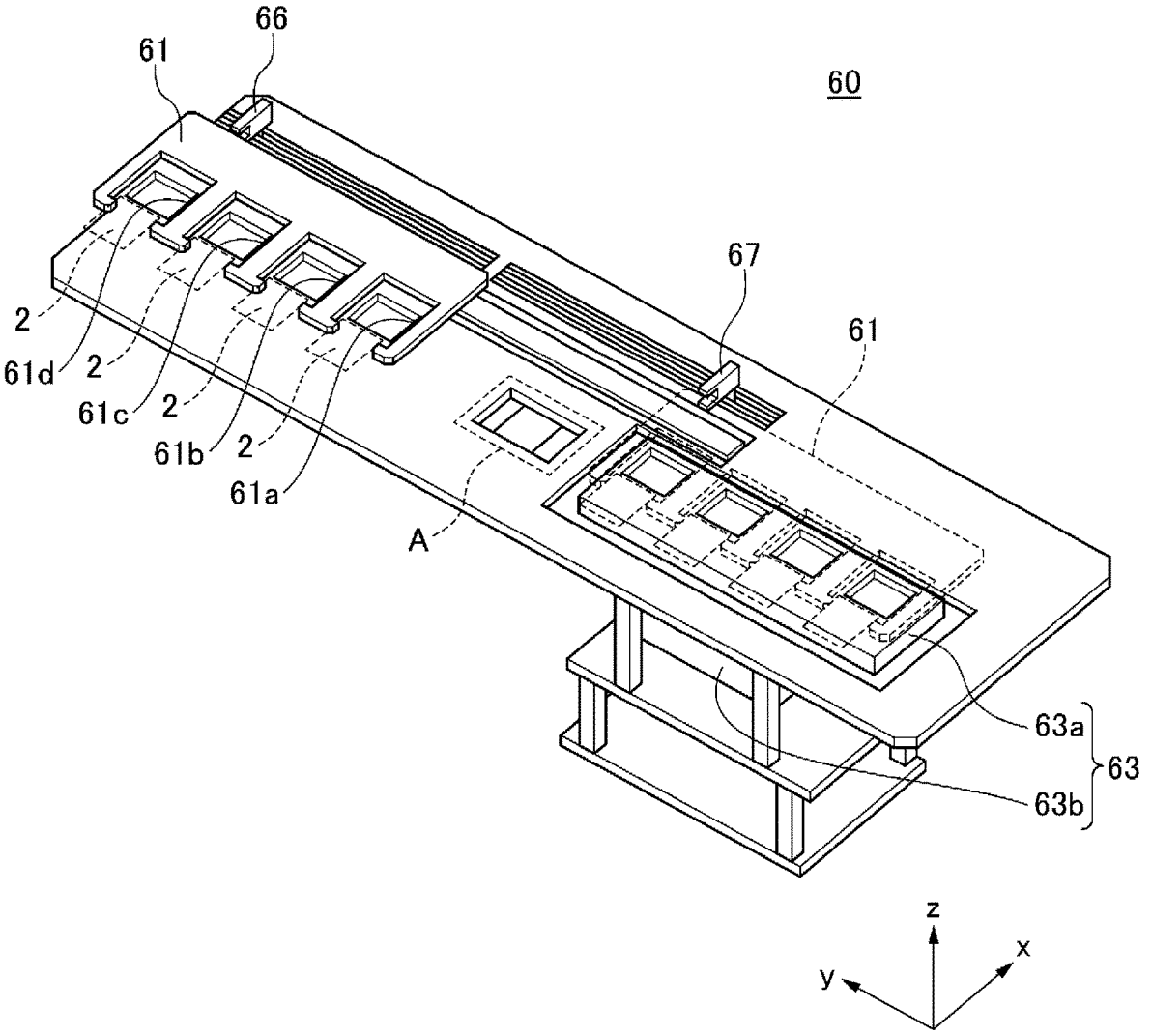
FIG. 9 is a perspective view illustrating an example of a schematic configuration of a paraffin fixing unit 60.

FIG. 9 is a perspective view illustrating an example of a schematic configuration of the paraffin fixing unit 60. In FIG. 9, the paraffin discharge unit 62 is omitted. The placement portion 61 is a plate-shaped member extending along the horizontal direction. The cassette holder is placed horizontally on the placement portion 61. The cassette holder 2 horizontally disposed corresponds to a case where the extending direction of the plate-shaped portion 92 is the horizontal direction and the cassette holder 2 faces upward (the protrusion 93 protrudes vertically downward).

The cooling unit 63 mainly includes a flat surface portion 63*a* on which the cassette holder 2 is placed and a cooling mechanism 63*b* that cools the flat surface portion 63*a*. The cooling mechanism 63*b* includes a cooling unit such as a Peltier element. The flat surface portion 63*a* is preferably made of metal to be more efficiently cooled by the cooling mechanism 63*b*.

The placement portion 61 is provided with four holes 61*a*, 61*b*, 61*c*, and 61*d*. The cassette holders 2 and paraffin receivers 102 are horizontally placed in the holes 61*a* to 61*d*.

Figure 10:
FIG. 10 is a perspective view illustrating an example of a schematic configuration of the cassette holder 2 and a paraffin receiver 102, with (A) being a perspective view of the paraffin receiver 102, (B) being a perspective view illustrating a state where the cassette holder 2 is placed on the paraffin receiver 102, and (C) being a cross-sectional view illustrating the state where the cassette holder 2 is placed on the paraffin receiver 102.

FIG. 10 is a perspective view illustrating an example of a schematic configuration of the cassette holder 2 and the paraffin receiver 102, with (A) being a perspective view of the paraffin receiver 102, (B) being a perspective view illustrating a state where the cassette holder 2 is placed on the paraffin receiver 102, and (C) being a cross-sectional view illustrating the state where the cassette holder 2 is placed on the paraffin receiver 102.

The paraffin receiver 102 mainly includes a plate-shaped portion 102*a* with which the cassette holder 2 comes into contact, a protrusion 102*b* formed in the plate-shaped portion 102*a*, and a rib 102*c* formed around the plate-shaped portion 102*a*. When the cassette holder 2 is placed on the paraffin receiver 102, the bottom surface 91*a* comes into contact with the plate-shaped portion 102*a*, and the protrusion 93 is inserted into the protrusion 102*b*.

The description will now return to FIG. 9. The paraffin receivers 102 are placed in the holes 61*a* to 61*d* in advance. The cassette holders 2 are placed on the paraffin receivers 102 placed in the holes 61*a* to 61*d* in advance.

The holes 61*a* to 61*d* respectively correspond to the holding portions 30*a* to 30*d*. The cassette holder 2 held in the holding portion 30*a* is placed on the paraffin receiver 102 placed in the hole 61*a*. The cassette holder 2 held in the holding portion 30*b* is placed on the paraffin receiver 102 placed in the hole 61*b*. The cassette holder 2 held in the holding portion 30*c* is placed on the paraffin receiver 102 placed in the hole 61*c*. The cassette holder 2 held in the holding portion 30*d* is placed on the paraffin receiver 102 placed in the hole 61*d*.

The paraffin fixing unit 60 includes conveying units 66 and 67 (corresponding to second conveying unit) that convey the placement portion 61 that is, the cassette holder 2 in the horizontal direction. The conveying unit 66 moves the placement portion 61 in the −y direction from a position indicated by solid line in FIG. 9, and disposes the cassette holders 2 provided in the holes 61*a* to 61*d* below (a region A indicated by dotted line in FIG. 9) a nozzle 62*d* (described in detail below) of the paraffin discharge unit 62. The conveying unit 67 moves the placement portion 61 in the −y direction, so that the cassette holders 2 provided in the holes 61*a* to 61*d* are moved onto the cooling unit 63 from the region A to be placed on the flat surface portion 63*a*.

In the present invention, the paraffin fixing unit 60 includes the two conveying units 66 and 67, but the paraffin fixing unit 60 may include one conveying unit having the functions of the conveying units 66 and 67.

Figure 11:
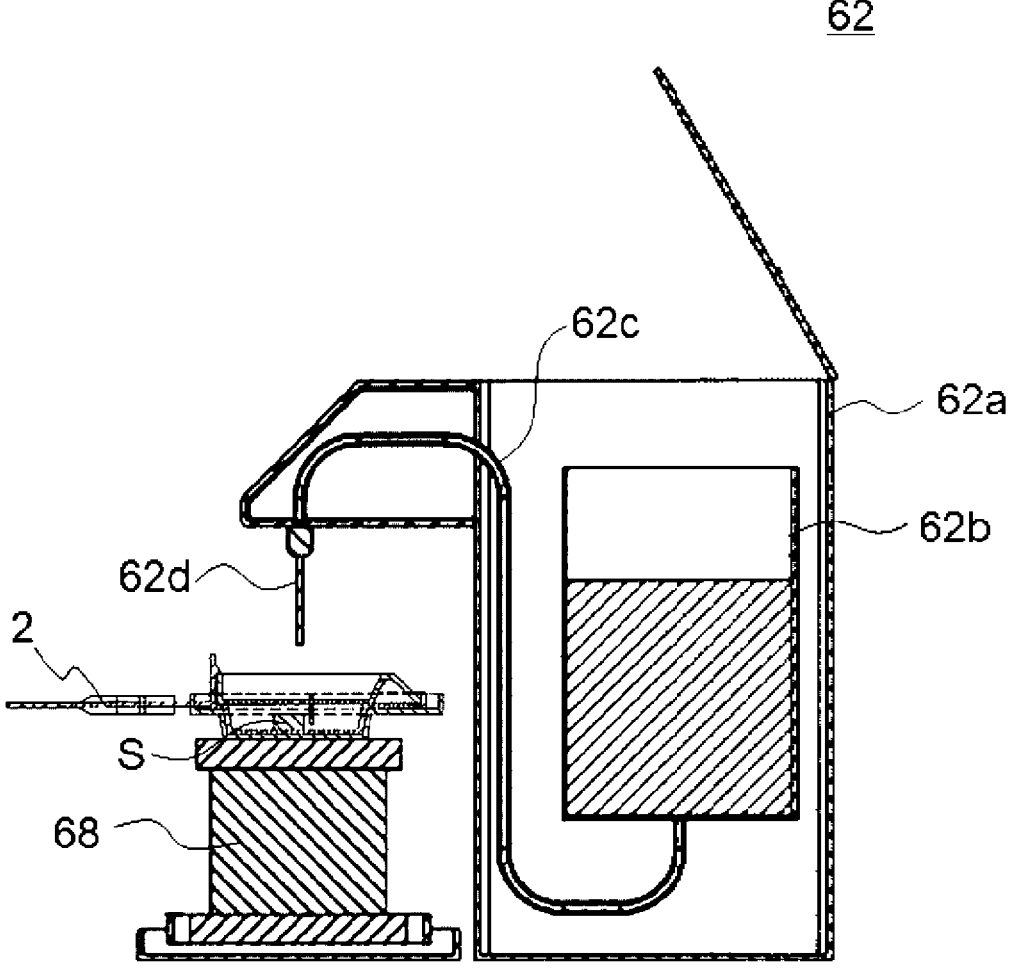
FIG. 11 is a cross-sectional view illustrating an example of a schematic configuration of a paraffin discharge unit 62.

FIG. 11 is a cross-sectional view illustrating an example of a schematic configuration of the paraffin discharge unit 62. The paraffin discharge unit 62 mainly includes a housing 62*a*, a tank 62*b*, a pipe 62*c*, and the nozzle 62*d*. The tank 62*b* and the pipe 62*c* are provided inside the housing 62*a*, and the housing 62*a* is provided with the nozzle 62*d*.

The housing 62*a* includes a heating portion not illustrated. The heating portion heats the tank 62*b*, the pipe 62*c* and the nozzle 62*d* to about 60° C. at which the paraffin turns into liquid.

The interior of the tank 62*b* is filled with the liquid paraffin. The paraffin is supplied from the tank 62*b* to the nozzle 62*d* through the pipe 62*c*, and discharged from the nozzle 62*d*.

A vibration table 68 is provided on the lower side of the nozzle 62*d* in the vertical direction (the region A indicated by the dotted line in FIG. 9). The vibration table 68 is capable of vibrating, for example, for translational motions in the three directions of x, y, and z and rotational motions about the respective axes. The vibration table 68 may be capable of vibrating in at least one direction, an is preferably capable of vibrating in a horizontal direction. Because the vibration table 68 is already known, a description thereof is omitted.

Further, the vibration table 68 includes a heating portion (not illustrated) and heats the cassette holder 2 placed on the vibration table 68. However, the heating portion is not essential in the vibration table 68.

Figure 12:
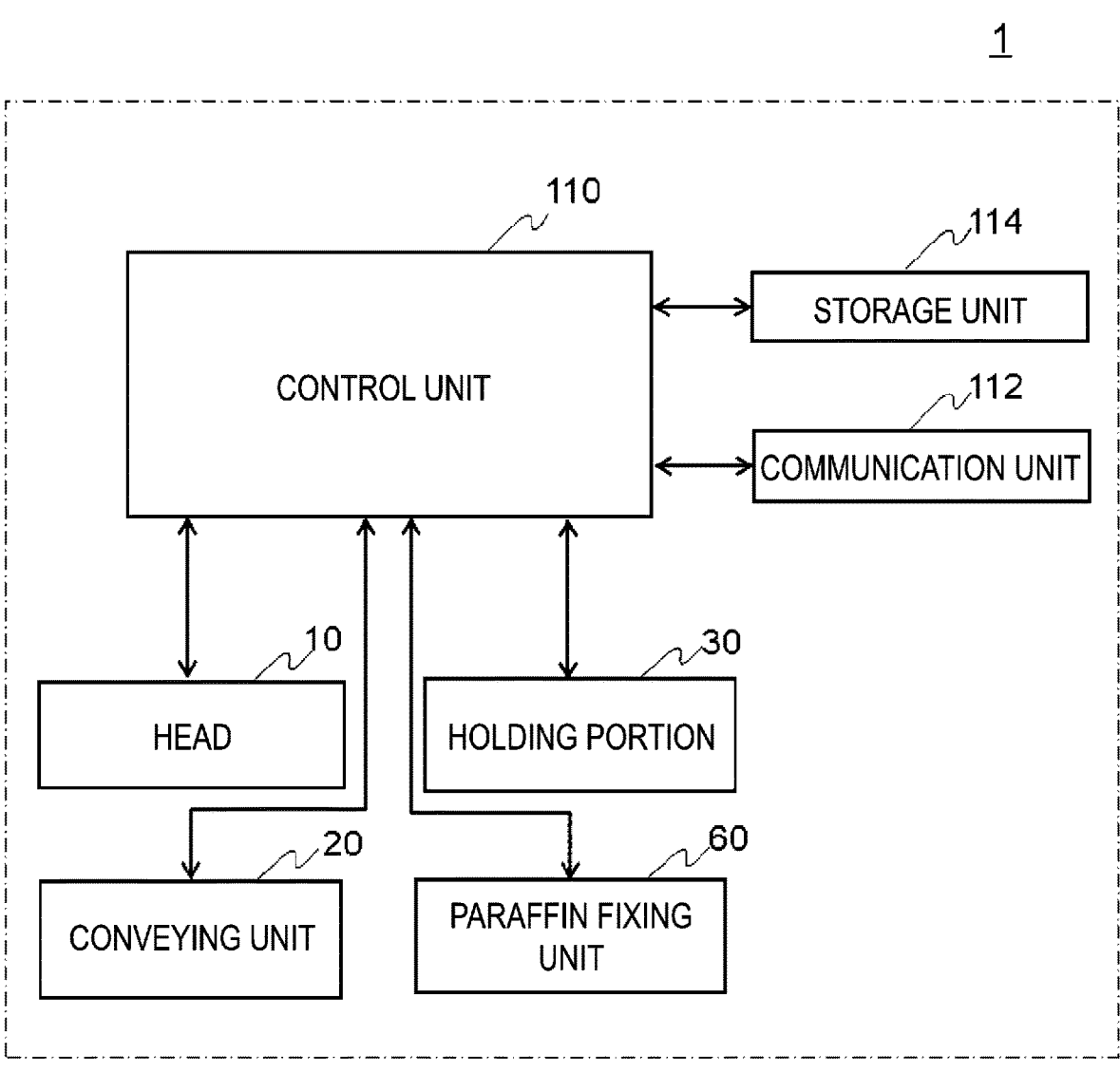
FIG. 12 is a block diagram illustrating an electrical configuration of the paraffin-embedded block preparation device 1.

FIG. 12 is a block diagram illustrating an electrical configuration of the paraffin-embedded block preparation device 1. The paraffin-embedded block preparation device 1 mainly includes a control unit 110, a communication unit 112, and a storage unit 114. The control unit 110 mainly includes a Central Processing Unit (CPU), and operates in accordance with a program stored in the storage unit 114.

The head 10 (the cassette holder gripping unit 11, the lid gripping unit 12, and the body portion 13), the conveying unit 20 (the driving unit 25), the holding portion 30 (the sensors 32 and 33), the paraffin fixing unit 60 (the paraffin discharge unit 62, the cooling unit 63, the conveying unit 66 and 67, and the vibration table 68) are connected to the control unit 110, and the control unit 110 controls each of these. Specifically, the control unit 110 controls the cassette holder gripping unit 11 to open and close the claws 11*a* and 11*b*, controls the lid gripping unit 12 to open and close the claws 12*a* and 12*b*, and rotates the lid gripping unit 12. The control unit 110 controls the body portion 13 to rotate the head 10 about the axis 10_ax_. The control unit 110 controls the conveying unit 20 to move the head 10 in the horizontal direction and the vertical direction. The control unit 110 acquires signals from the sensors 32 and 33 and controls the head 10 and the conveying unit 20 based on the signals. The control unit 110 controls the conveying unit 66 and 67 to move the placement portion 61 in the horizontal direction. The control unit 110 controls the paraffin discharge unit 62 to discharge paraffin from the nozzle 62_d_. The control unit 110 controls the vibration table 68 to vibrate the vibration table 68 and to heat the vibration table 68 by the heating portion (not illustrated). Details of the operation of the control unit 110 will be described in detail below.

The communication unit 112 includes a communication interface or the like for communicating with an external device.

The storage unit 114 is formed by a hard disk or the like. The storage unit 114 stores various programs and various pieces of information required for the control unit 110 to execute the processing, and information on results of the processing.

The configuration of the paraffin-embedded block preparation device 1 illustrated in FIG. 12 is described as a main configuration for describing the features of the present embodiment, and does not exclude, for example, a configuration of a general information processing apparatus.

Figure 13:
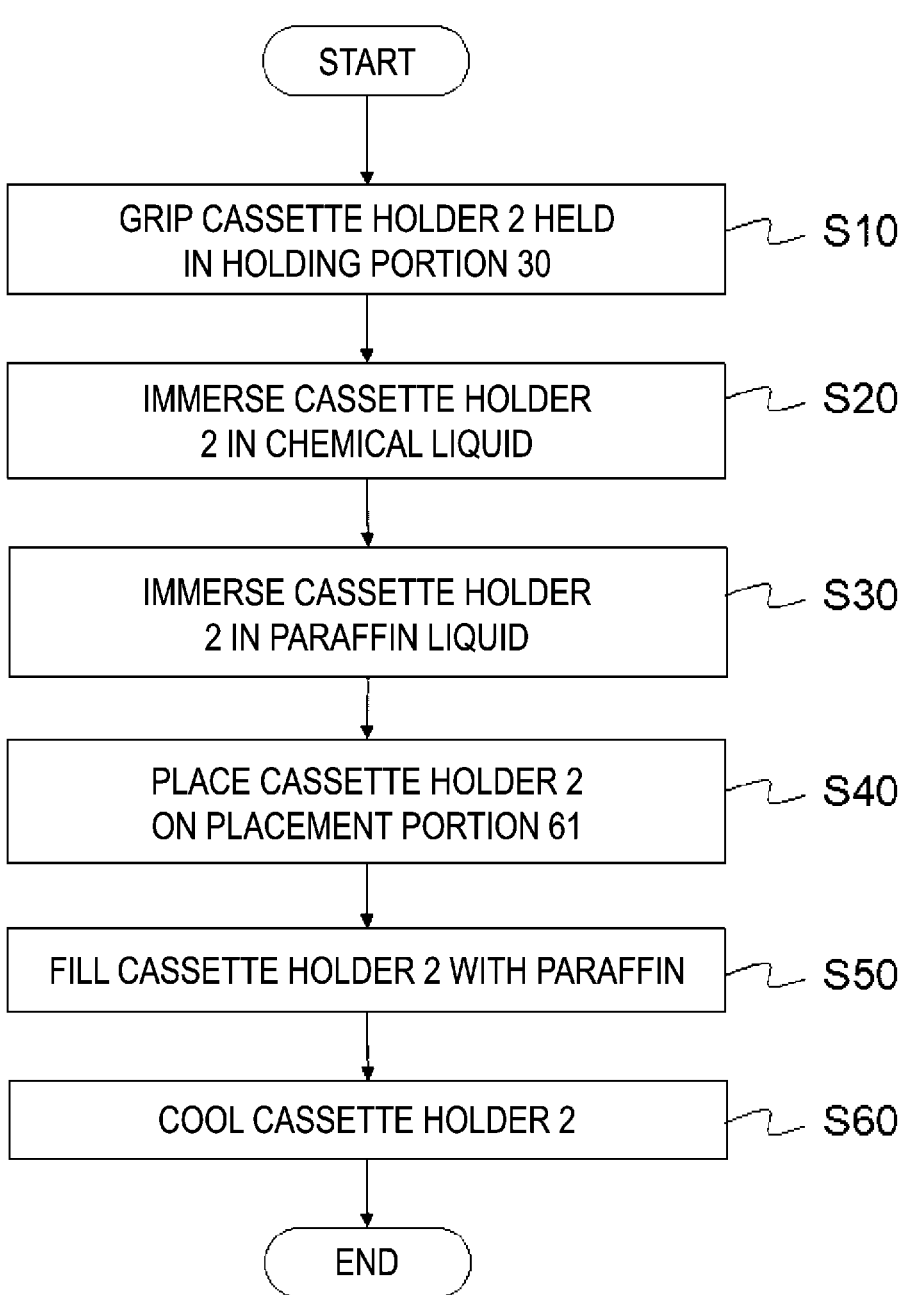
FIG. 13 is a flowchart illustrating a flow of processing executed by the paraffin-embedded block preparation device 1.

FIG. 13 is a flowchart illustrating a flow of processing executed by the paraffin-embedded block preparation device 1. The following processing is mainly executed by the control unit 110.

The control unit 110 causes the cassette holder gripping unit 11 to grip the cassette holder 2 provided to the holding portion 30 (step S10). The control unit 110 detects which of the holding portions 30_a_ to 30_d_ is holding the cassette holder 2, using the sensor 32. Then, the control unit 110 makes the conveying unit 20 move the cassette holder gripping unit 11 to be above the holding portion 30_a_, 30_b_, 30_c_, 30_d_ in which the cassette holder 2 is detected. The control unit 110 moves the cassette holder gripping unit 11 downward with the claws 11_a_ and 11_b_ opened, and closes the claws 11_a_ and 11_b_ to make the cassette holder gripping unit 11 grip the cassette holder 2.

For example, when cassette holders 2 are held by all of the holding portions 30_a_ to 30_d_, the cassette holder gripping unit 11 grips the cassette holder 2 held in the holding portions 30_a_, 30_b_, 30_c_, and 30_da_. For example, when the cassette holders 2 are held in the holding portions 30_b_ to 30_d_, the cassette holder gripping unit 11 grips the cassette holder 2 held in the holding portion 30_b_.

The control unit 110 positions the cassette holder gripping unit 11 above the holding portion 30_b_, 30_c_, 30_d_, based on a result of the detection by the sensor 33, with the claws 11_a_ and 11_b_ arranged in the open position. Then, the control unit 110 moves the claws 11_a_ and 11_b_ from the open position to the closed position to grip the cassette holder 2 with the claws 11_a_ and 11_b_.

Next, the control unit 110 immerses the cassette holder 2 in the chemical liquid (step S20). The control unit 110 moves the cassette holder gripping unit 11 to be above the chemical liquid bottle holding portion 40_a_, 40_b_, 40_c_, 40_d_ corresponding to the holding portion 30_a_, 30_b_, 30_c_, 30_d_ by which the cassette holder 2 gripped by the cassette holder gripping unit 11 has been held. For example, when the cassette holder gripping unit 11 is gripping the cassette holder 2 held in the holding portion 30_a_, the control unit 110 moves the cassette holder gripping unit 11 to be above the chemical liquid bottle holding portion 40_a_. For example, when the cassette holder gripping unit 11 is gripping the cassette holder 2 held in the holding portion 30_b_, the control unit 110 moves the cassette holder gripping unit 11 to be above the chemical liquid bottle holding portion 40_b_.

Figure 14:
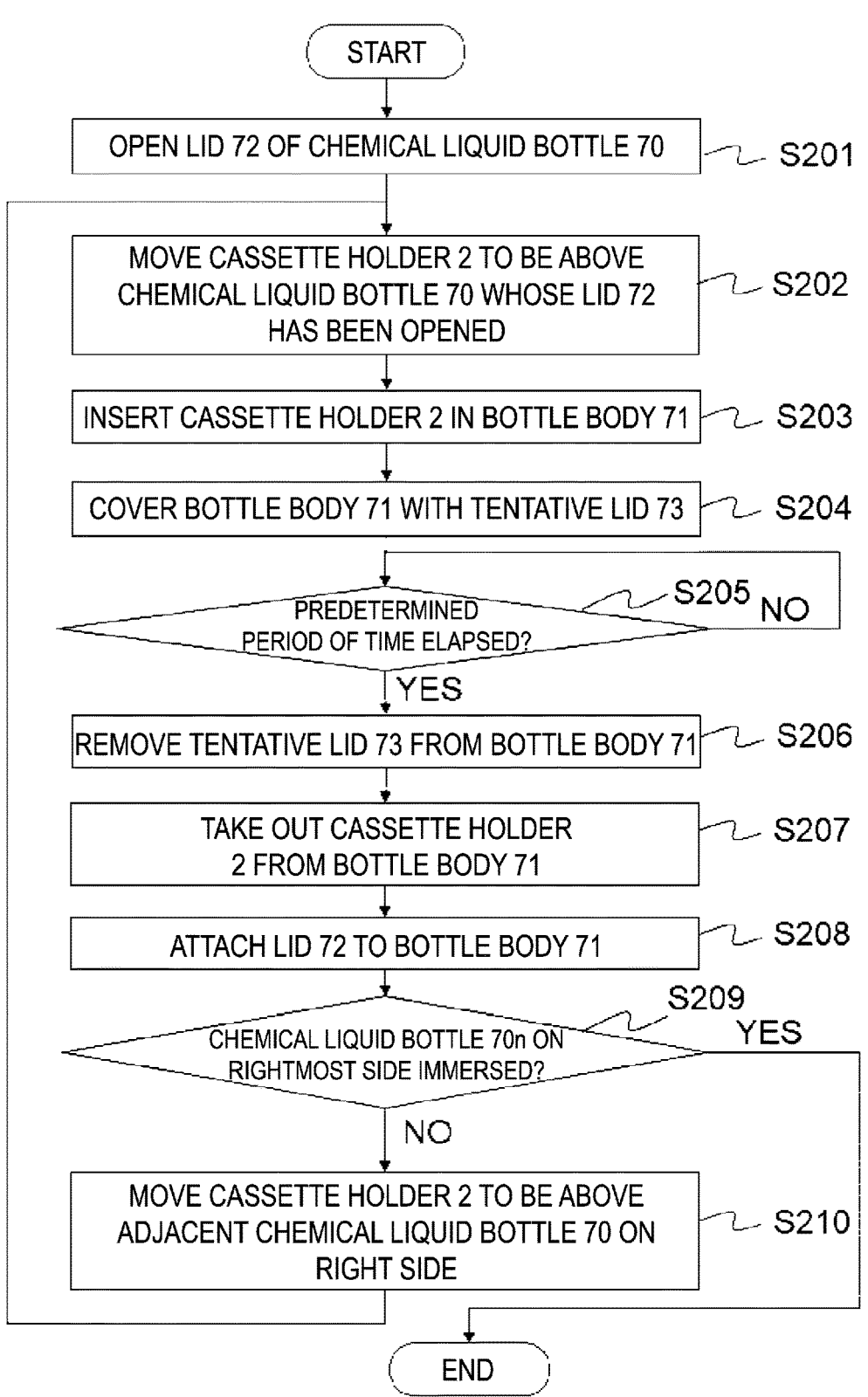
FIG. 14 is a flowchart illustrating a flow of processing (step S20) of immersing the cassette holder 2 in chemical liquid.

FIG. 14 is a flowchart illustrating a flow of processing (step S20) of immersing the cassette holder 2 in the chemical liquid. Hereinafter, the flow of step S20 will be described with reference to an example in which the cassette holder gripping unit 11 grips the cassette holder 2 held in the holding portion 30_a_.

The control unit 110 opens the lid 72 of the chemical liquid bottle 70 (step S201). When step S201 is performed for the first time, the control unit 110 opens the lid of the chemical liquid bottle 70 _h_ positioned at the leftmost side (−x side) among the chemical liquid bottles 70 arranged in the chemical liquid bottle holding portion 40_a_.

The processing of step S201 will be described. First, the control unit 110 rotates the head 10 about the axis 10_ax_ to change the orientation of the head 10 from a state in which the longitudinal direction of the cassette holder gripping unit 11 is along the z direction and the longitudinal direction of the lid gripping unit 12 is along the x direction to a state in which the longitudinal direction of the cassette holder gripping unit 11 is along the x direction and the longitudinal direction of the lid gripping unit 12 is along the z direction. Next, the control unit 110 moves the claws 12_a_ and 12_b_ to the open state and moves the lid gripping unit 12 vertically downward (−z direction).

Next, the control unit 110 moves the claws 12_a_ and 12_b_ to the closed state to grip the lid 72 with the lid gripping unit 12, rotates the lid gripping unit 12 gripping the lid 72 to rotate the lid 72 relative to the bottle body 71 to remove the lid 72 from the bottle body 71, and moves the lid gripping unit 12 vertically upward (in the +z direction). Since the bottle body 71 and the hole 41_a_ are both hexagonal when viewed in the z direction, the bottle body 71 does not rotate even when the lid 72 is rotated by the lid gripping unit 12, and the lid 72 can be removed from the bottle body 71 without gripping the bottle body 71.

Next, the control unit 110 moves the head 10 to the cassette holder 2 positioned above the chemical liquid bottle 70 whose lid 72 has been opened in step S201 (step S202). Then, the control unit 110 inserts the cassette holder 2 into the chemical liquid bottle 70 whose lid 72 has been opened in step S201, to immerse the cassette holder 2 in the chemical liquid (step S203).

The processing of step S203 will be described. First, the control unit 110 rotates the head 10 about the axis 10_ax_ to change the orientation of the head 10 from a state in which the longitudinal direction of the cassette holder gripping unit 11 is along the x direction and the longitudinal direction of the lid gripping unit 12 is along the z direction to a state in which the longitudinal direction of the cassette holder gripping unit 11 is along the z direction and the longitudinal direction of the lid gripping unit 12 is along the x direction. Next, the control unit 110 moves the cassette holder gripping unit 11 in the −z direction to insert the cassette holder 2 into the bottle body 71. When the cassette holder 2 is inserted in the bottle body 71, the control unit 110 moves the claws 11_a_ and 11_b_ to the open state to release the gripping of the cassette holder 2.

As illustrated in FIG. 7, since the projections 95_a_ and 95_b_ of the cassette holder 2 are caught on the opening portion 71_e_, the cassette holder 2 does not fall into the bottle body 71. In addition, since the distal ends (flat surface portions 97_a_ and 97_b_) of the projections 96_a_ and 96_b_ of the cassette holder 2 are in contact with the inner circumference surface of the tubular portion 71c and the flat surface portions 97a and 97b press the inner circumference surface of the tubular portion 71c, the cassette holder 2 inserted in the bottle body 71 does not rotate.

The description will now return to FIG. 14. The control unit 110 moves the head 10 in the +z direction, after bringing the claws 11a and 11b into the open state to release the gripping of the cassette holder 2. Then, the processing in step S203 ends.

Next, the control unit 110 puts the tentative lid 73 on the chemical liquid bottle 70 into which the cassette holder 2 has been inserted in step S203 (step S204).

The processing of step S204 will be described. First, the control unit 110 rotates the head 10 about the axis 10ax to change the orientation of the head 10 from a state in which the longitudinal direction of the cassette holder gripping unit 11 is along the z direction and the longitudinal direction of the lid gripping unit 12 is along the x direction to a state in which the longitudinal direction of the cassette holder gripping unit 11 is along the x direction and the longitudinal direction of the lid gripping unit 12 is along the z direction. Then, the control unit 110 moves the head 10 in the horizontal direction (at least one of the x direction and the y direction) and the +z direction to move the head 10 to be above the temporary placement portion 45. Then, the control unit 110 places the lid 72 gripped by the lid gripping unit 12 on the lid placement portion 45a.

Next, the control unit 110 causes the lid gripping unit 12 to grip the tentative lid 73 placed on the tentative lid placement portion 45b. Specifically, the control unit 110 moves the head 10 to be above the lid placement portion 45a, moves the head 10 in the −z direction, and then moves the claws 12a and 12b to the open state to place the lid 72 on the lid placement portion 45a. The control unit 110 moves the head 10 in the +z direction, then moves the head 10 in the horizontal direction to position the lid gripping unit 12 above the tentative lid placement portion 45b, and moves the claws 12a and 12b to the closed state after moving the head 10 in the −z direction, to grip the tentative lid 73.

Next, the control unit 110 places the gripped tentative lid 73 on the bottle body 71 so as to cover the opening portion of the bottle body 71 whose the lid 72 has been removed. Specifically, the control unit 110 moves the head 10 in the horizontal direction to position the tentative lid 73 above the bottle body 71 whose lid 72 has been removed, moves the head 10 in the −z direction, and then moves the claws 12a and 12b to the open state to place the tentative lid 73 on the bottle body 71. Therefore, it is possible to prevent evaporation of and emission of odor from the chemical liquid. Then, the processing in step S204 ends.

The control unit 110 determines whether a predetermined period of time has elapsed after the processing in step S203 has started (step S205). The predetermined period of time is, for example, any period of time (24 hours in the present embodiment) between 6 and 48 hours when the chemical liquid bottle 70 into which the cassette holder 2 is inserted in step S203 is the chemical liquid bottle 70h, and is one hour in a case of each of the chemical liquid bottles 70i, 70j, 70k, 70l, 70m, and 70n.

The control unit 110 makes the cassette holder 2 move up and down inside the chemical liquid bottle 70 at a constant time interval until the predetermined period of time elapses after the start of the processing in step S203 (during the processing in step S205) to stir the chemical liquid filled in the chemical liquid bottle 70. For example, the control unit 110 makes the cassette holder gripping unit 11 grip the cassette holder 2 and makes the head 10 sequentially move by a short distance (for example, about 10 mm to 30 mm) in the +z direction and the −z direction. The constant time is, for example, 15 minutes. Thus, a new chemical liquid can be supplied to the vicinity of the sample S.

When the predetermined period of time has not elapsed after the start of the processing in step S203 (NO in step S205), the control unit 110 repeats step S205.

When the predetermined period of time has elapsed from the start of the processing in step S203 (YES in step S205), the control unit 110 removes the tentative lid 73 from the bottle body 71 (step S206), and takes out the cassette holder 2 from the bottle body 71 whose tentative lid 73 has been removed (step S207).

The processing of step S206 will be described. First, the control unit 110 moves the head 10 in the horizontal direction and the vertical direction to dispose the head 10 above the chemical liquid bottle 70 into which the cassette holder 2 has been inserted. At this time, the head 10 is in a state in which the longitudinal direction of the lid gripping unit 12 is along the z direction. Next, the control unit 110 moves the claws 12a and 12b to the open state and moves the head 10 in the −z direction, and then moves the claws 12a and 12b to the closed state to make the lid gripping unit 12 grip the tentative lid 73. Then, the control unit 110 moves the head 10 in the +z direction to remove the tentative lid 73 from the bottle body 71, and rotates the head 10 about the axis 10ax to achieve a state where the longitudinal direction of the cassette holder gripping unit 11 is along the z direction. Then, the processing in step S206 ends.

The processing of step S207 will be described. The control unit 110 moves the claws 11a and 11b to the open state, moves the head 10 in the −z direction, and then moves the claws 11a and 11b to the closed state to make the cassette holder gripping unit 11 grip the cassette holder 2. Then, the control unit 110 moves the head 10 in the +z direction to pull out the cassette holder 2 from the bottle body 71. Then, the processing in step S207 ends.

Next, the control unit 110 attaches the lid 72 to the chemical liquid bottle 70 from which the cassette holder 2 has been taken out (step S208).

The processing of step S208 will be described. First, the control unit 110 rotates the head 10 about the axis 10ax to change the orientation of the head 10 from a state in which the longitudinal direction of the cassette holder gripping unit 11 is along the z direction and the longitudinal direction of the lid gripping unit 12 is along the x direction to a state in which the longitudinal direction of the cassette holder gripping unit 11 is along the x direction and the longitudinal direction of the lid gripping unit 12 is along the z direction. With the lid gripping unit 12 gripping the tentative lid 73, the control unit 110 moves the head 10 in the horizontal direction to move the lid gripping unit 12 to be above the tentative lid placement portion 45b, moves the head 10 in the −z direction, and then moves the claws 12a and 12b to the open state to place the tentative lid 73 on the tentative lid placement portion 45b.

Next, the control unit 110 moves the head 10 in the +z direction and then moves the head 10 in the horizontal direction so that the lid gripping unit 12 moves the head 10 to be above the lid placement portion 45a. Next, the control unit 110 moves the claws 12a and 12b to the open state and moves the head 10 in the −z direction, and then moves the claws 12a and 12b to the closed state to make the lid gripping unit 12 grip the lid 72. After moving the head 10 in the +z direction, the control unit 110 moves the head 10 to be above the chemical liquid bottle 70 from which the cassette holder 2 has been taken out in step S25, and rotates the lid gripping unit 12 while moving the head 10 in the −z direction to attach the lid 72 to the bottle body 71. Then, the control unit 110 moves the head 10 in the +z direction, after moving the claws 12a and 12b to the open state to release the gripping of the lid 72. Then, the processing in step S208 ends.

Next, the control unit 110 determines whether the processing up to step S208 has been completed for the chemical liquid bottle 70n disposed on the rightmost side (+x side) among the chemical liquid bottles 70 disposed in the chemical liquid bottle holding portion 40a (step S209). When the processing up to step S208 has not been completed for the chemical liquid bottle 70n disposed on the rightmost side (NO in step S209), the control unit 110 opens the lid of the adjacent chemical liquid bottle 70 on the right side of the chemical liquid bottle 70 to which the lid 72 has been attached in step S208 (step S210). The processing of opening the lid of the chemical liquid bottle 70 is the same as that in step S201. Thereafter, the control unit 110 returns the processing to Step S202.

For example, when the processing in steps S202 to S208 has been executed on the chemical liquid bottle 70h, the control unit 110 opens the lid 72 of the chemical liquid bottle 70i (step S210), moves the cassette holder 2 to be above the chemical liquid bottle 70i (step S202), and inserts the cassette holder 2 into the chemical liquid bottle 70i (step S203).

For example, when the processing in steps S202 to S208 has been executed on the chemical liquid bottle 70k the control unit 110 opens the lid 72 of the chemical liquid bottle 70 l(step S201), moves the cassette holder 2 to be above the chemical liquid bottle 70 l(step S202), and inserts the cassette holder 2 into the chemical liquid bottle 70 l(step S203).

When the processing up to step S208 is completed for the chemical liquid bottle 70n disposed on the rightmost side (YES in step S209), the control unit 110 ends the series of processing in step S20.

The description will now return to FIG. 13. Next, the control unit 110 immerses the cassette holder 2 in the paraffin liquid (step S30). The control unit 110 moves the cassette holder gripping unit 11 to be above the paraffin-filled bottle holding portion 50a, 50b, 50c, 50d corresponding to the holding portion 30a, 30b, 30c, 30d in which the cassette holder 2 gripped by the cassette holder gripping unit 11 has been held. For example, when the cassette holder gripping unit 11 is gripping the cassette holder 2 held in the holding portion 30a, the control unit 110 moves the cassette holder gripping unit 11 to be above the paraffin-filled bottle holding portion 50a. For example, when the cassette holder gripping unit 11 is gripping the cassette holder 2 held in the holding portion 30b, the control unit 110 moves the cassette holder gripping unit 11 to be above the paraffin-filled bottle holding portion 50b.

Figure 15:
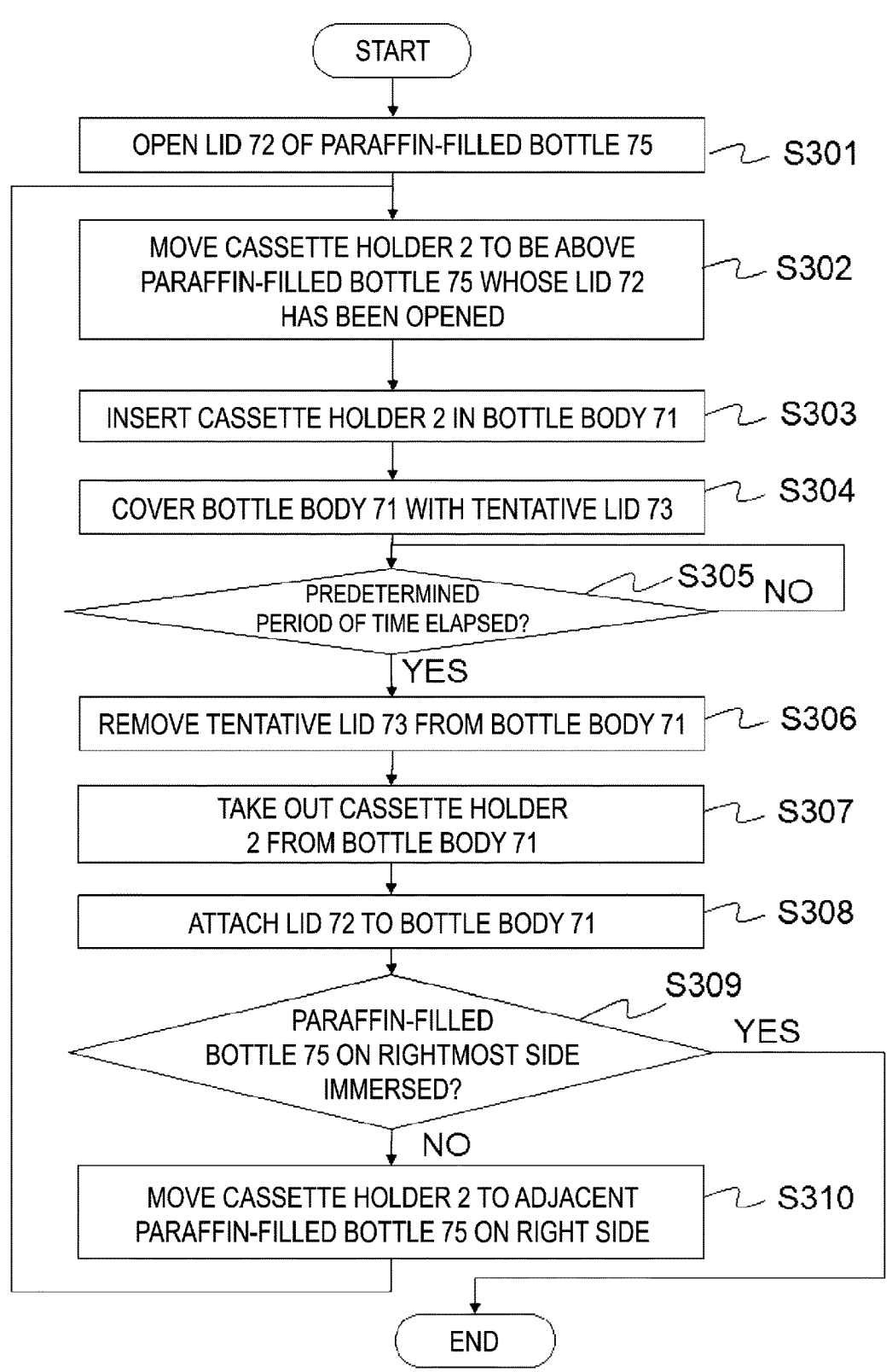
FIG. 15 is a flowchart illustrating a flow of processing (step S30) of immersing the cassette holder 2 in paraffin liquid.

FIG. 15 is a flowchart illustrating a flow of processing (step S30) of immersing the cassette holder 2 in the paraffin liquid. Hereinafter, the flow of step S30 will be described with reference to an example in which the cassette holder gripping unit 11 grips the cassette holder 2 held in the holding portion 30a.

The control unit 110 opens the lid 72 of the paraffin-filled bottle 75 (step S301). When step S301 is performed for the first time, the control unit 110 opens the lid of the paraffin-filled bottle 75 h positioned at the leftmost side (−x side) among the paraffin-filled bottles 75 arranged in the paraffin-filled bottle holding portion 50a. Since the processing in step S301 is the same as the processing in step S201, description thereof will be omitted.

Next, the control unit 110 moves the head 10 to position the cassette holder 2 above the paraffin-filled bottle 75 whose lid 72 has been opened in step S301 (step S302). Since the processing in step S302 is the same as the processing in step S202, description thereof will be omitted.

Then, the control unit 110 inserts the cassette holder 2 into the paraffin-filled bottle 75 whose lid 72 has been opened in step S301, to immerse the cassette holder 2 in the paraffin liquid (step S303). Since the processing in step S303 is the same as the processing in step S203, description thereof will be omitted.

Next, the control unit 110 puts the tentative lid 73 on the paraffin-filled bottle 75 into which the cassette holder 2 has been inserted in step S303 (step S304). Since the processing in step S304 is the same as the processing in step S204, description thereof will be omitted.

The control unit 110 determines whether a predetermined period of time has elapsed after the processing in step S33 has started (step S305). The predetermined period of time is 1 hour and 20 minutes for example.

As in step S205, the control unit 110 may make the cassette holder gripping unit 11 grip the cassette holder 2 until the predetermined period of time elapses after the processing in step S303 has started (during the processing in step S305), and move the cassette holder 2 up and down at a constant time interval to stir the paraffin liquid filled in the paraffin-filled bottle 75.

When the predetermined period of time has not elapsed after the start of the processing in step S303 (NO in step S305), the control unit 110 repeats step S305.

When the predetermined period of time has elapsed from the start of the processing in step S303 (YES in step S305), the control unit 110 removes the tentative lid 73 from the paraffin-filled bottle 75 (step S306), and takes out the cassette holder 2 from the paraffin-filled bottle 75 whose the tentative lid 73 has been removed (step S307). Since the processing in steps S306 and S307 is the same as the processing in respective steps S206 and S207, description thereof will be omitted.

Next, the control unit 110 attaches the lid 72 to the paraffin-filled bottle 75 from which the cassette holder 2 has been taken out (step S308). Since the processing in step S308 is the same as the processing in step S208, description thereof will be omitted.

Next, the control unit 110 determines whether the processing up to step S308 has been completed for the paraffin-filled bottle 75j disposed on the rightmost side (+x side) among the paraffin-filled bottles 75 disposed in the paraffin-filled bottle holding portion 50a (step S309). When the processing up to step S308 has not been completed for the paraffin-filled bottle 75j disposed on the rightmost side (NO in step S309), the control unit 110 opens the lid of the adjacent paraffin-filled bottle 75 on the right side of the paraffin-filled bottle 75 to which the lid 72 has been attached in step S308 (step S310). The processing of opening the lid of the paraffin-filled bottle 75 is the same as that in step S301. Thereafter, the control unit 110 returns the processing to Step S302.

When the processing up to step S308 is completed for the paraffin-filled bottle 75j disposed on the rightmost side (YES in step S309), the control unit 110 ends the series of processing in step S30.

The description will now return to FIG. 13. Next, the control unit 110 places the cassette holder 2 on the placement portion 61 (step S40). In this process, the control unit 110 places the cassette holder 2 gripped by the cassette holder gripping unit 11 on the paraffin receiver 102 placed in the hole 61*a*, 61*b*, 61*c*, 61*d* corresponding to the holding portions 30*a*, 30*b*, 30*c*, 30*d* in which the cassette holder 2 has been held. For example, when the cassette holder gripping unit 11 grips the cassette holder 2 held in the holding portion 30*a*, the control unit 110 places the cassette holder 2 on the paraffin receiver 102 placed in the hole 61*a*. For example, when the cassette holder gripping unit 11 grips the cassette holder 2 held in the holding portion 30*b*, the control unit 110 places the cassette holder 2 on the paraffin receiver 102 placed in the hole 61*b*.

The processing in step S40 will be described using as an example, a case where the cassette holder gripping unit 11 grips the cassette holder 2 held in the holding portion 30*a*. In step S36, since the longitudinal direction of the cassette holder gripping unit 11, that is, the cassette holder 2 is along the horizontal direction, the control unit 110 makes the conveying unit 20 move the cassette holder gripping unit 11 in the horizontal direction in a state where the cassette holder gripping unit 11 is along the horizontal direction, to dispose the cassette holder 2 above the hole 61*a*. Next, the control unit 110 makes the conveying unit 20 move the cassette holder gripping unit 11 in the −z direction, to place the cassette holder 2 on the paraffin receiver 102.

When the cassette holder 2 is placed on the paraffin receiver 102, the control unit 110 moves the claws 11*a* and 11*b* to the open position to separate the cassette holder 2 from the cassette holder gripping unit 11. Then, the control unit 110 makes the conveying unit 20 move the cassette holder gripping unit 11 in the horizontal direction and the vertical direction, to move the cassette holder gripping unit 11 away from the paraffin fixing unit 60. Then, the processing in step S40 ends.

Next, the control unit 110 fills the cassette holder 2 placed on the placement portion 61 with paraffin (step S50). Now, the processing in step S50 will be described using as an example a case where the cassette holder 2 is placed in the hole 61*a*. The control unit 110 makes the conveying unit 66 move the placement portion 61 in the −y direction, to dispose the hole 61*a* below the nozzle 62*d*. As a result, the cassette holder 2 provided in the hole 61*a* is disposed below the nozzle 62*d*. Then, in a state where the cassette holder 2 is disposed below the nozzle 62*d*, the control unit 110 discharges paraffin from the nozzle 62*d*.

As illustrated in FIGS. 10(B) and 10(C), since the cassette holder 2 is placed on the paraffin receiver 102, the paraffin discharged from the nozzle 62*d* fills the inside of the protrusion 93.

As illustrated in FIG. 11, in a state where the cassette holder 2 is disposed below the nozzle 62*d*, the cassette holder 2 and the paraffin receiver 102 are placed on the vibration table 68. The control unit 110 makes the vibration table 68, that is, the cassette holder 2 and the paraffin receiver 102 vibrate, while discharging paraffin from the nozzle 62*d*. Thus, the paraffin can fill the entirety of the inside of the protrusion 93.

At the same time, the control unit 110 heats the vibration table 68, that is, the cassette holder 2 and the paraffin receiver 102. As a result, it is possible to prevent air from remaining inside the protrusion 93 due to the paraffin solidifying before filling the entirety of the inside of the protrusion 93.

The description will now return to FIG. 13. Next, the control unit 110 cools the paraffin filled in the cassette holder 2 (step S60). The control unit 110 makes the conveying unit

67 move the placement portion 61 in the −y direction, to make the placement portion 61 below the nozzle 62*d* move to be on the upper side of the cooling unit 63. As result, the paraffin receivers 102 placed in the holes 61*a* to 61*d* is placed on the flat surface portion 63*a*, and the paraffin inside the cassette holder 2 is cooled by the cooling unit 63. Thus, a series of processing executed by the paraffin-embedded block preparation device 1 is completed.

While FIG. 13 illustrates the processing flow in the case where the paraffin-embedded block preparation device 1 processes one cassette holder 2, the paraffin-embedded block preparation device 1 can simultaneously process a plurality of cassette holders 2. Hereinafter, a case where processing is performed on two cassette holders 2 held in the holding portions 30*a* and 30*b* will be described as an example.

The control unit 110 executes the processing in step S10 and steps S201 to S204 on the cassette holder 2 held in the holding portion 30*a*, and executes the processing in step S10 and steps S201 to S205 on the cassette holder 2 held in the holding portion 30*b*, while the processing in step S205 is being executed on the cassette holder 2 held in the holding portion 30*a* (until the predetermined period of time elapses). After the processing in steps S206 to S210 has been executed on the cassette holder 2 held in the holding portion 30*a*, the processing in steps S206 to S210 is executed on the cassette holder 2 held in the holding portion 30*b*. Thus, the processing in steps S10 and S20 can be simultaneously executed on two cassette holders 2.

The paraffin-embedded block preparation device 1 also executes the processing in step S30 simultaneously on the cassette holders 2 held in the holding portions 30*a* and 30*b*. The control unit 110 executes the processing in steps S301 to S304 on the cassette holder 2 held in the holding portion 30*a*, and executes the processing in steps S301 to S305 on the cassette holder 2 held in the holding portion 30*b*, while the processing in step S305 is being executed on the cassette holder 2 held in the holding portion 30*a*. After the processing in steps S306 to S310 has been executed on the cassette holder 2 held in the holding portion 30*a*, the processing in steps S306 to S310 is executed on the cassette holder 2 held in the holding portion 30*b*. Thus, the processing in step S30 can be simultaneously executed on two cassette holders 2.

Then, the control unit 110 sequentially executes the processing steps S40 and S50 on the cassette holders 2 held in the holding portions 30*a* and 30*b*. Specifically, when it is determined YES in step S309 in the processing in steps S302 to S309 on the paraffin-filled bottle 75*j* corresponding to the cassette holder 2 held in the holding portion 30*a*, the control unit 110 executes the processing in step S40 and S50 after step S309. Then, when it is determined YES in step S309 in the processing in steps S302 to S309 on the paraffin-filled bottle 75*j* corresponding to the cassette holder 2 held in the holding portion 30*b*, the control unit 110 executes the processing in step S40 and S50 after step S309.

The control unit 110 executes step S60 for a plurality of cassette holders 2 simultaneously. Specifically, the control unit 110 moves the placement portion 61 in the −y direction, to make the placement portion 61 below the nozzle 62*d* move to be on the upper side of the cooling unit 63. As a result, all the cassette holders 2 and the paraffin receivers 102 placed on the placement portion 61 are placed on the flat surface portion 63*a*, and the paraffin in all the cassette holders 2 placed on the placement portion 61 is simultaneously cooled by the cooling unit 63.

Figure 16:
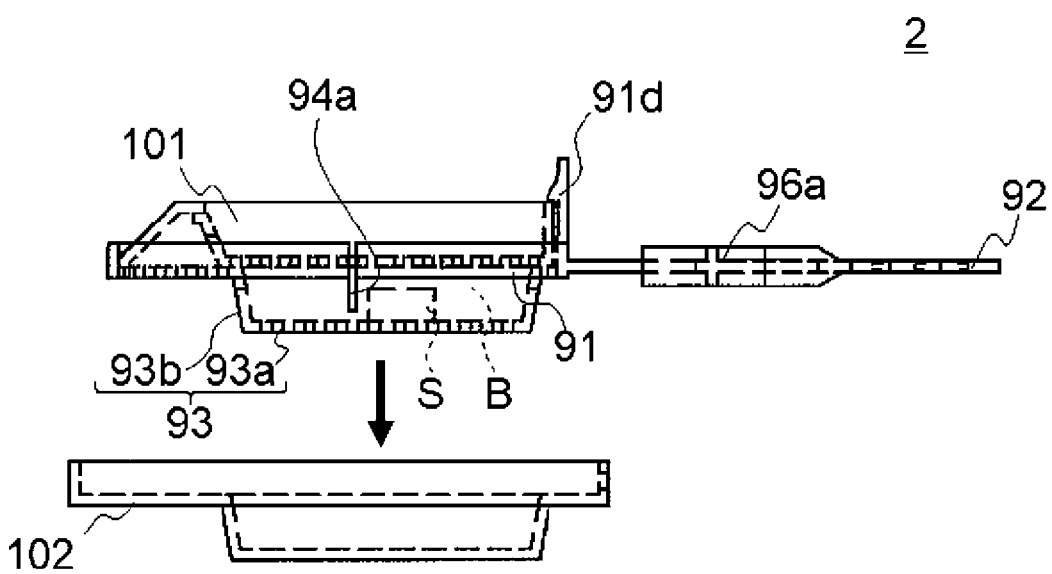
FIG. 16 is a diagram illustrating the cassette holder 2 after processing executed by the paraffin-embedded block preparation device 1.

FIG. 16 is a view illustrating the cassette holder 2 after processing executed by the paraffin-embedded block preparation device 1. With the paraffin receiver 102, the paraffin discharged in step S50 fills the protrusion 93, and the paraffin filled into the protrusion 93 in step S50 is solidified. Therefore, even when the paraffin receiver 102 is removed from the cassette holder 2, the solidified paraffin does not flow out from the protrusion 93. Thus, an embedded block B in which the sample S is embedded in the paraffin is formed inside the protrusion 93.

Figure 17:
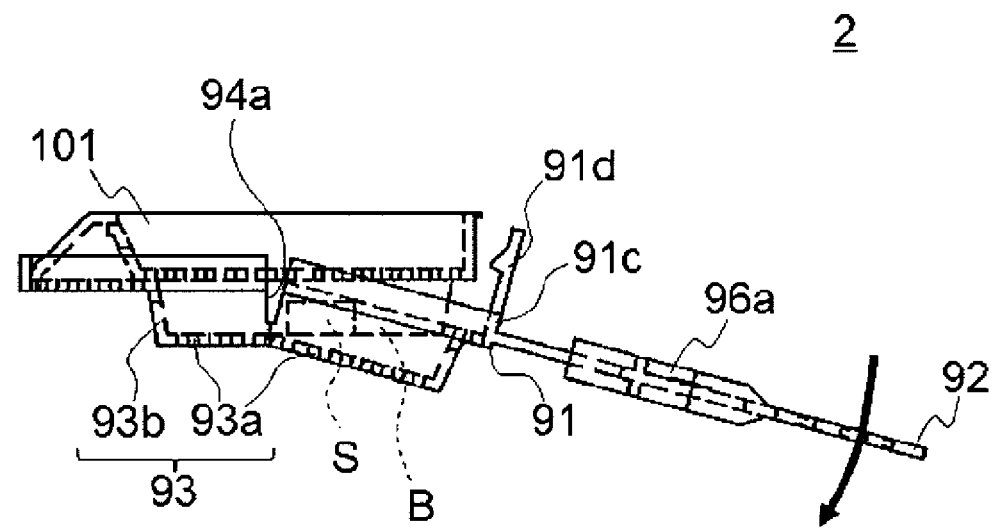
FIG. 17 is a diagram illustrating how an embedded block is taken out from the cassette holder 2.

FIG. 17 is a diagram illustrating how an embedded block is taken out from the cassette holder 2. Since the cassette receiving portion 91 and the protrusion 93 are provided with the pair of slits 94*a* and 94*b*, the cassette holder 2 can be folded along the slits 94*a* and 94*b*. Since the slits 94*a* and 94*b* are collinearly arranged, a force is likely to be concentrated between the slits 94*a* and 94*b*. Since the slits 94*a* and 94*b* are substantially parallel to the short side (side 91*c*) of the rib 91*b* and the plate-shaped portion 92 extends so as to protrude from the side 91*c*, when the operator grips the plate-shaped portion 92 and deforms the cassette holder 2 in a direction in which the opening portions of the slits 94*a* and 94*b* are widened (see the arrow in FIG. 17), the slits 94*a* and 94*b* and the point of effort (the position at which the operator grips the cassette holder 2) can be located far from each other, whereby the cassette holder 2 can be easily folded.

Figure 18:
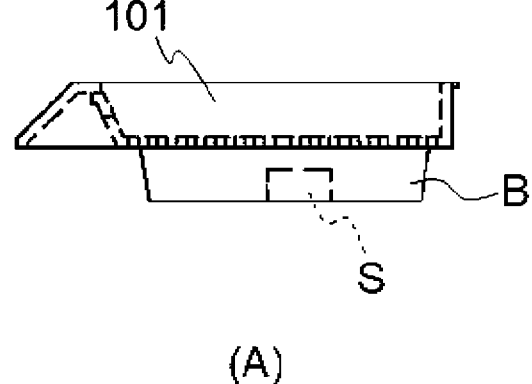
FIG. 18 is a view illustrating the cassette 101 and an embedded block B taken out from the cassette holder 2, with (A) being a side view and (B) being a perspective view.
Figure 18:
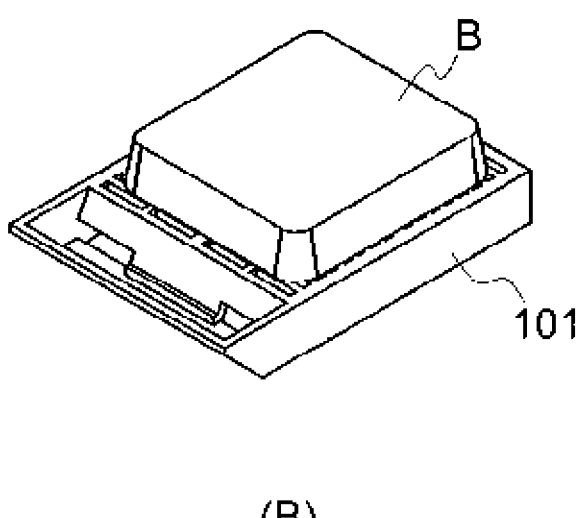

FIG. 18 is a view illustrating the cassette 101 and the embedded block B taken out from the cassette holder 2, with (A) being a side view and (B) being a perspective view. When the cassette holder 2 is folded, the cassette 101 and the embedded block B are taken out from the cassette holder 2. The cassette 101 and the embedded block B are integrated by solidifying molten paraffin.

According to the present embodiment, since the cassette receiving portion 91 and the protrusion 93 are provided with the slits 94*a* and 94*b*, and the slits 94*a* and 94*b* are collinearly arranged in plan view, the cassette holder 2 can be easily folded along the slits 94*a* and 94*b*, and the embedded block B can be easily taken out from the inside of the cassette holder 2, whereby the embedded block B is prepared with excellent workability.

According to the present embodiment, since the height h1 of the slits 94*a* and 94*b* is equal to or more than half the distance h2 between the distal end of the rib 91*b* and the distal end of the protrusion 93 in side view, the cassette holder 2 can be folded along the slits 94*a* and 94*b* with a small amount of force.

According to the present embodiment, the plate-shaped portion 92 extend substantially parallel to the bottom surface 91*a* from one of the two side 91*c* of the rib 91*b*. Thus, the plate-shaped portion 92 may be gripped when immersing the cassette 101 provided in the cassette receiving portion 91 in the chemical liquid. When the operator performs the chemical liquid treatment in which the sample S is immersed in the chemical liquid, the operator does not need to touch the cassette 101 immersed in the chemical liquid, and thus the operator can perform the operation safely and efficiently. When the paraffin-embedded block preparation device 1 is used, the cassette 101 can be taken out from the chemical liquid the cassette holder gripping unit 11 gripping the plate-shaped portion 92, and thus workability is high.

According to the present embodiment, since the sides 92*a* and 92*b* are respectively provided with the projections 95*a* and 95*b*, the projections 95*a* and 95*b* are caught on the opening portion 71*e* of the bottle body 71 when the cassette provided in the cassette receiving portion is immersed in the chemical liquid with the plate-shaped portion 92 gripped, so that the cassette holder 2 can be prevented from falling into the bottle body 71. Therefore, the operator can perform the chemical liquid treatment, by gripping the plate-shaped portion 92 and taking out the cassette 101 from the chemical liquid. When the paraffin-embedded block preparation device 1 is used, the cassette holder gripping unit 11 gripping the plate-shaped portion 92 does not come into contact with the chemical liquid, so that a failure of the paraffin-embedded block preparation device 1 can be prevented.

Further, according to the present embodiment, since the sides 92*a* and 92*b* are respectively provided with the projections 96*a* and 96*b*, the projections 96*a* and 96*b* come into contact with the inner circumference surface of the bottle body 71. Thus, the cassette holder 2 can be prevented from rotating in the bottle body 71. Since the flat surface portions 97*a* and 97*b* are provided at the distal ends of the projections 96*a* and 96*b*, the flat surface portions 97*a* and 97*b* can press the inner circumference surface of the bottle body 71. Therefore, the cassette holder 2 can be fixed to the bottle body 71.

In the present embodiment, the holding portion 30 includes the four holding portions 30*a* to 30*d*, the chemical liquid bottle holding portion 40 includes the four chemical liquid bottle holding portions 40*a* to 40*d*, and the paraffin-filled bottle holding portion 50 includes the four paraffin-filled bottle holding portions 50*a* to 50*d*. However, the holding portion 30 may include at least two holding portions 30*a* and 30*b*, the chemical liquid bottle holding portion 40 may include at least two chemical liquid bottle holding portions 40*a* and 40*b*, and the paraffin-filled bottle holding portion 50 may include at least two paraffin-filled bottle holding portions 50*a* and 50*b*. While the chemical liquid bottle holding portions 40*a* to 40*d* are provided adjacent to each other and the paraffin-filled bottle holding portions 50*a* to 50*d* are provided adjacent to each other, the chemical liquid bottle holding portions 40*a* to 40*d* and the paraffin-filled bottle holding portions 50*a* to 50*d* may not be adjacent to each other.

Second Embodiment

Figure 19:
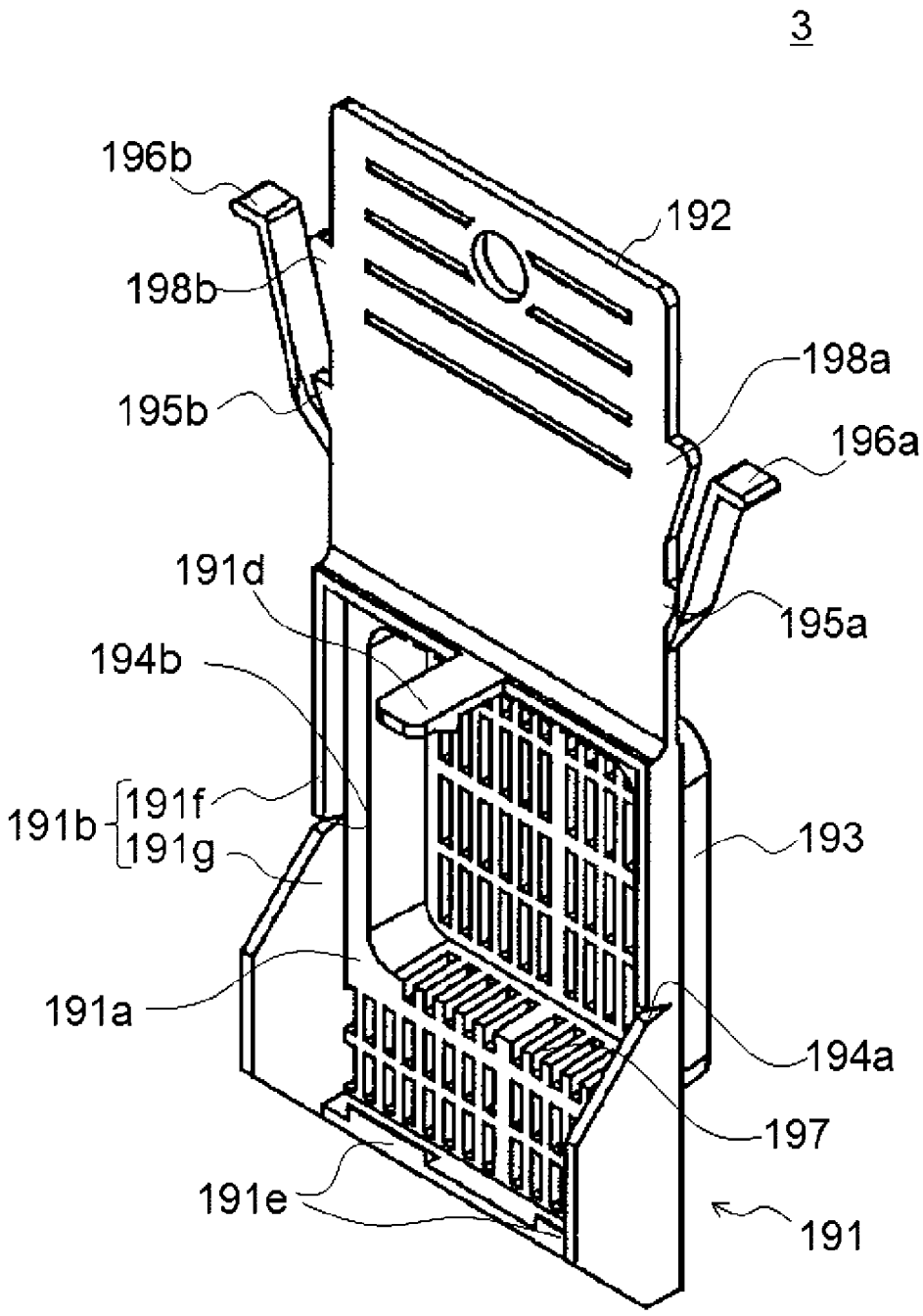
FIG. 19 is a perspective view illustrating an overview of a cassette holder 3.
Figure 20:
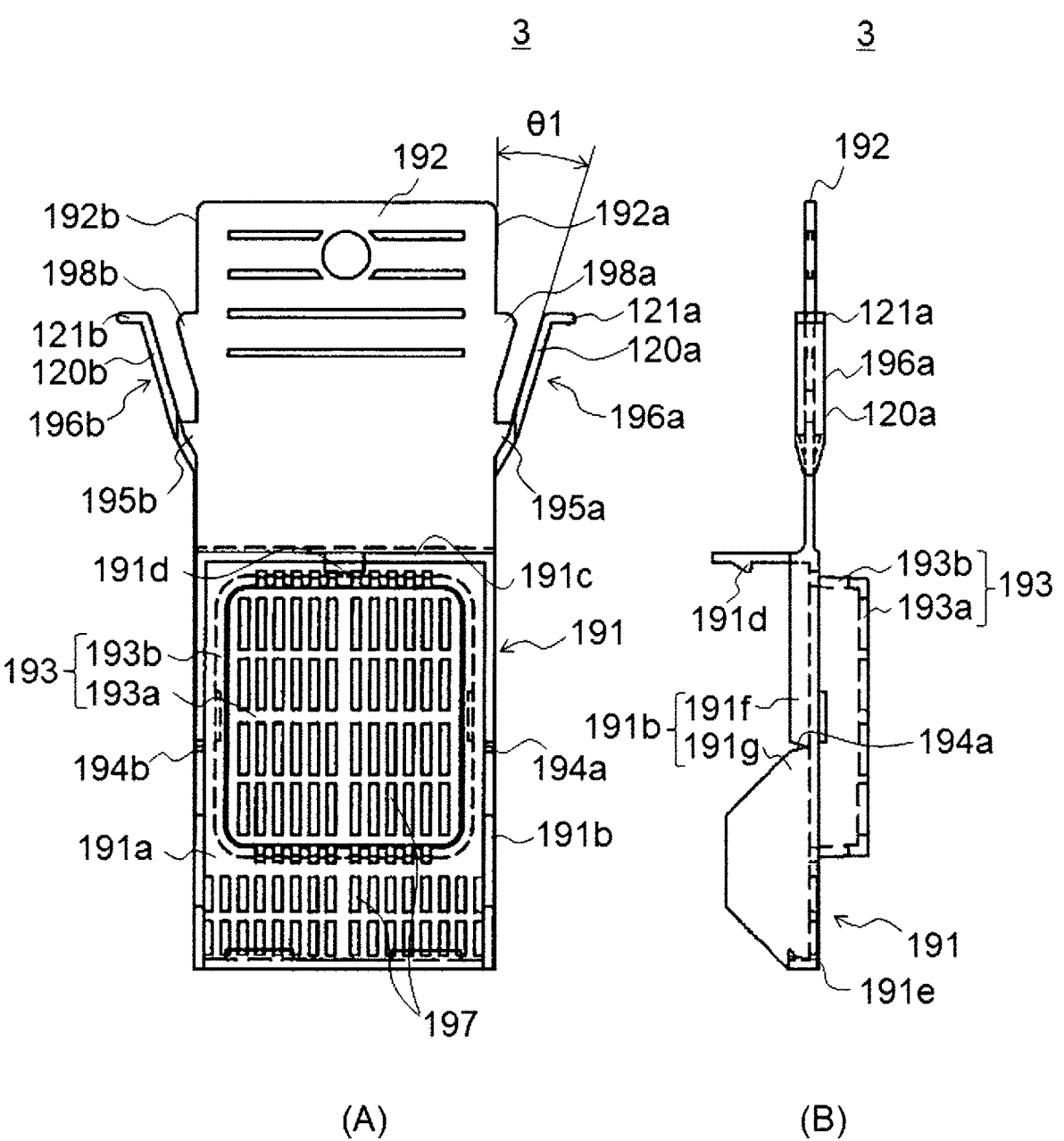
FIG. 20 is a diagram illustrating an example of a schematic configuration of the cassette holder 3, with (A) being a plan view and (B) being a side view.

FIG. 19 is a perspective view illustrating an overview of a cassette holder 3 according to a second embodiment of the present invention. FIG. 20 is a diagram illustrating an example of a schematic configuration of the cassette holder 3, with (A) being a plan view and (B) being a side view. Note that the same components as those in the first embodiment are denoted by the same reference numerals, and descriptions thereof will be omitted.

The cassette holder 3 mainly includes a cassette receiving portion 191 to which a cassette 101 (see FIG. 5) is set, a plate-shaped portion 192 having a substantially plate-like shape, and a protrusion 193 provided on the cassette receiving portion 191.

In the description of the cassette holder 3, a direction substantially orthogonal to the extending direction of the plate-shaped portion 192 is referred to as an upward-downward direction, a protruding direction of the protrusion 193 is referred to as a downward direction, and a direction opposite to the protruding direction of the protrusion 193 is referred to as an upward direction. The plan view in FIG. 19(A) illustrates the cassette holder 3 as viewed from above.

The cassette receiving portion 191 has a rectangular shape in plan view, and mainly includes a bottom surface 191*a* and a rib 191*b*. The bottom surface 191*a* is a flat surface with which the lower surface of the cassette 101 comes into contact when the cassette 101 is set, and has a rectangular shape in plan view. The bottom surface 191a is provided with a plurality of through holes 197.

The rib 191b protrudes upward from the bottom surface 191a. The rib 191b has a rectangular shape in plan view and comes into contact with the peripheral edge of the cassette 101 when the cassette 101 is set. The rib 191b includes a short rib 191f and a tall rib 191g. With the rib 191 g, the cassette holder 3 can be easily folded at slits 194a and 194b (described in detail below).

The rib 191b is provided with a cassette pressing claw 191d for holding the cassette 101 when the cassette 101 is set in the cassette receiving portion 191. However, the cassette pressing claw 191d is not essential. A projection 191e is provided on the side of the rib 191b opposite to the cassette pressing claw 191d.

The bottom surface 191a is provided with the protrusion 193 protruding downward. The protrusion 193 is hollow inside, and includes a bottom surface 193a on which the sample S is placed and a side surface 193b. The protrusion 193 is provided with the plurality of through holes 197.

The cassette receiving portion 191 is provided with the pair of slits 194a and 194b. The slits 194a and 194b are substantially parallel to a short side (side 191c) of the rib 91b, and are collinearly arranged in plan view of the cassette holder 3.

The plate-shaped portion 192 is provided to the side 191c and extends substantially parallel to the bottom surface 191a. The plate-shaped portion 192 has a rectangular shape in plan view, and has two sides 192a and 192b along a direction (first direction) substantially parallel to the long side of the rib 191b. The sides 192a and 192b have substantially the same length as the long side of the rib 191b in plan view. As a result, the direction along the sides 192a and 192b is the longitudinal direction of the cassette holder 3.

The sides 192a and 192b are respectively provided with projections 195a and 195b and projections 198a and 198b. The projections 195a and 195b and the projections 198a and 198b are pairs of projections protruding outward in plan view.

The sides 192a and 192b are provided with projections 196a and 196b, respectively. The projections 196a and 196b are a pair of projections protruding outward in plan view. The distal end of each of the projections 196a and 196b is configured to be movable in a direction substantially parallel to the side 91c.

The projections 196a and 196b respectively include arm portions 120a and 120b and distal end portions 121a and 121b provided at the distal ends of the arm portions 120a and 120b. The arm portions 120a and 120b have an elongated plate shape, and are cantilevered members whose base end sides are provided in the vicinity of the cassette receiving portion 191. The arm portions 120a and 120b are elastically deformable, and an angle θ1 formed by the arm portions 120a and 120b and the sides 192a and 192b is 25° to 45°. Therefore, the distal end portions 121a and 121b are easily movable in the width direction of the cassette holder 3. However, the angle θ1 is not limited to 25° to 45°.

The projections 195a and 195b are members for reinforcing the base end portions of the projections 196a and 196b, and are formed integrally with the projections 196a and 196b at the base ends of the projections 196a and 196b. The projections 198a and 198b come into contact with the projections 196a and 196b when the distal ends of the projections 196a and 196b move in a direction substantially parallel to the side 91c, and thus prevent excessive deformation of the projections 196a and 196b.

The cassette holder 3 is inserted into the bottle body 71 through the opening portion 71e (see FIG. 7). During this process, the cassette holder 3 is vertically orientated with the plate-shaped portion 192 extending along the vertical direction. Since the width between both ends of the projections 196a and 196b is larger than the diameter D (see FIG. 7) of the tubular portion 71c, the distal end portions 121a and 121b are caught on the opening portion 71e, whereby the cassette holder 3 is positioned in the z direction. With the projections 198a and 198b provided, the cassette holder 3 is prevent from falling into the bottle body 71 due to excessive deformation of the projections 196a and 196b.

In addition, since the distal ends of the projections 196a and 196b are configured to be movable in the width direction of the cassette holder 3, when the cassette holder 3 is inserted into the bottle body 71, edge portions of the projections 196a and 196b press the inner circumference surface of the opening portion 71e from the inside. As a result, the cassette holder 3 is fixed to the bottle body 71 with the cassette holder 3 inserted in the bottle body 71 prevented from rotating.

According to the present embodiment, since the plate-shaped portion 192 extends substantially parallel to the bottom surface 191a, the cassette holder gripping unit 11 can grip the plate-shaped portion 192 and immerse the cassette 101, provided in the cassette receiving portion 191, in the chemical liquid. The embedded block B can be easily taken out from the inside of the cassette holder 3 by folding the cassette holder 3 along the slits 194a and 194b, whereby the embedded block B can be prepared with high workability.

Figure 21:
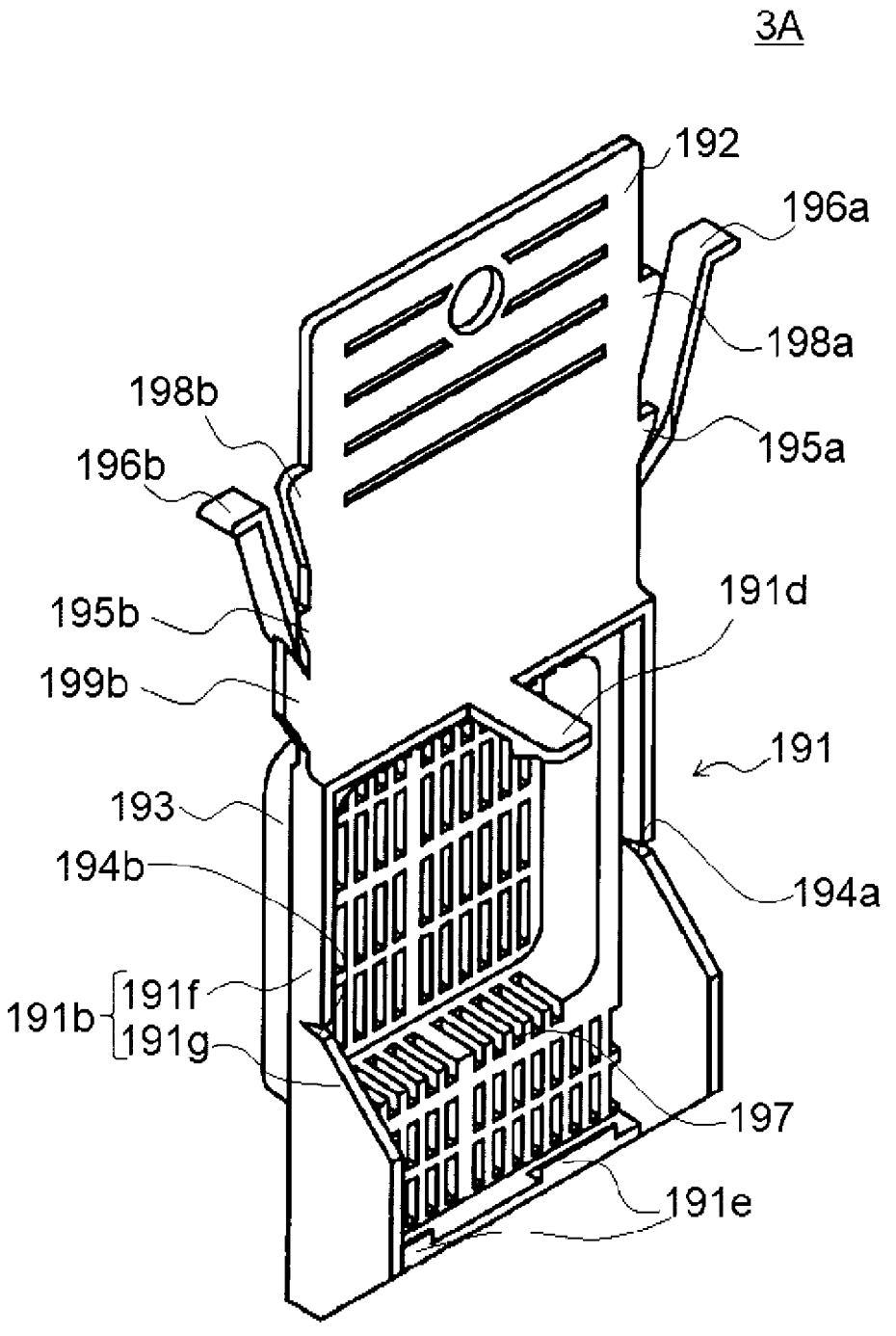
FIG. 21 is a perspective view illustrating an overview of a cassette holder 3A.

While in the cassette holder 3, the sides 192a and 192b are respectively provided with the projections 195a and 195b and the projections 196a and 196b, the side 192a or the side 192b may be further provided with a projection. In a cassette holder 3A illustrated in FIG. 21, the side 192b is provided with a projection 199b. The projection 199b is provided only on one side of the plate-shaped portion 192. The cassette holder 3A is positioned with respect to the bottle body 71 with the distal end of the projection 199b being in contact with the inner circumference surface of the tubular portion 71c (see FIG. 7).

Third Embodiment

Figure 22:
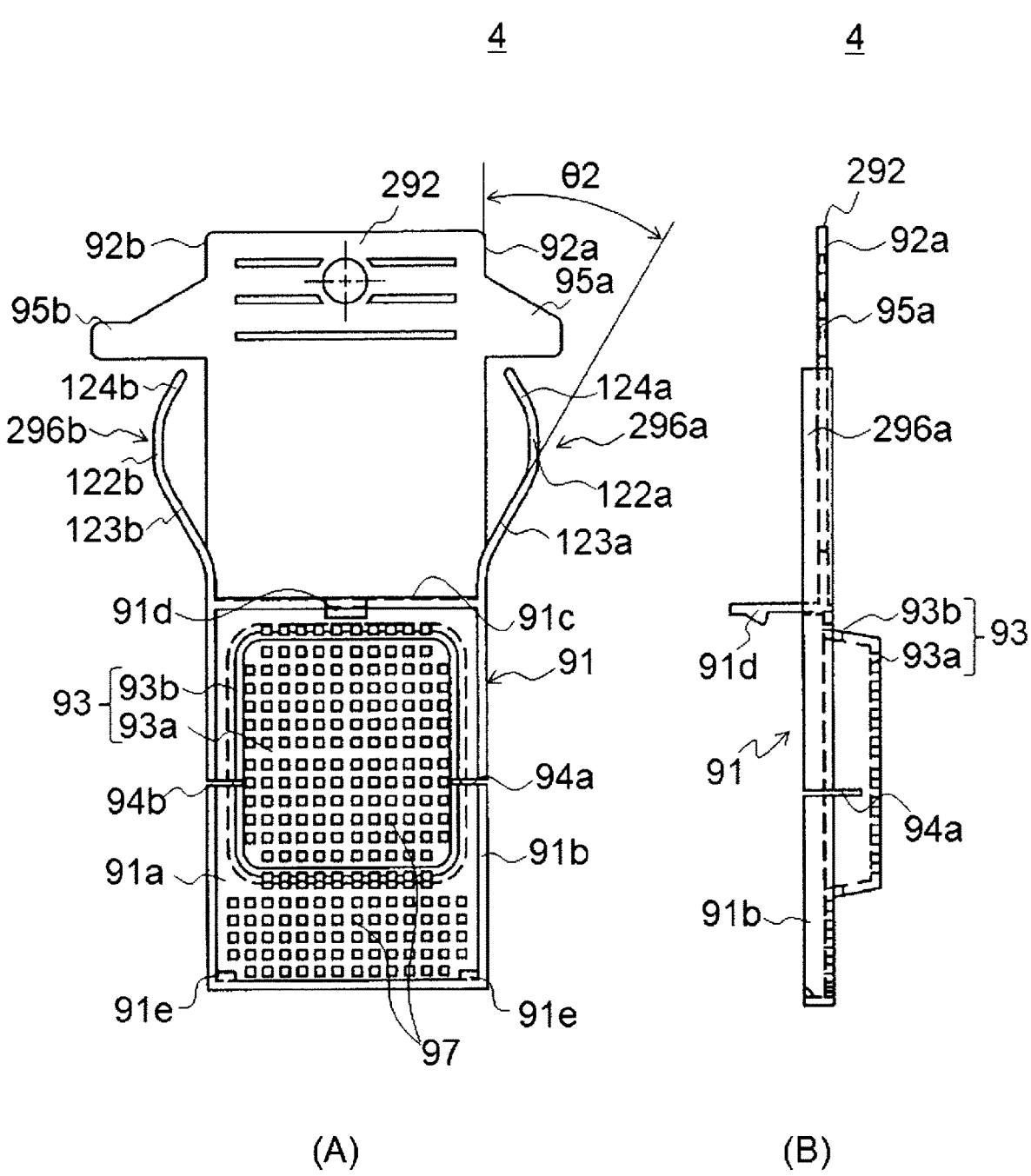
FIG. 22 is a diagram illustrating an overview of a cassette holder 4, with (A) being a plan view and (B) being a side view.

FIG. 22 is a diagram illustrating an overview of a cassette holder 4 according to a third embodiment of the present invention, with (A) being a plan view and (B) being a side view. Note that the same components as those in the first and the second embodiments are denoted by the same reference numerals, and descriptions thereof will be omitted.

The cassette holder 4 mainly includes the cassette receiving portion 91, a plate-shaped portion 292 having a substantially plate-like shape, and the protrusion 93. A direction substantially parallel to the short side (side 91c) of the rib 91b is a width direction (second direction of the present invention).

The side 91c is provided with the plate-shaped portion 292. The plate-shaped portion 292 includes projections 296a and 296b. The plate-shaped portion 292 is only different from the plate-shaped portion 92 in the presence/absence of the recesses 92e and 92f and the projections 296a and 296b, and the rest is the same.

The sides 92a and 92b are respectively provided with the projections 296a and 296b. The projections 296a and 296b are a pair of projections protruding outward in plan view. The heights of the projections 296a and 296b are lower than the heights of the projections 95a and 95b. The projections 296a and 296b are provided between the cassette receiving portion 91 and the projections 95a and 95b.

The projections 296a and 296b respectively include flat surface portions 122a and 122b substantially parallel to the sides 92a and 92b, arm portions 123a and 123b that connect the flat surface portions 122a and 122b and the sides 92a and 92b, and distal end portions 124a and 124b provided on the distal end sides of the flat surface portions 122a and 122b. The flat surface portions 122a and 122b are substantially orthogonal to a plane including the plate-shaped portion 92. The flat surface portions 122a and 122b and the distal end portions 124a and 124b of the projections 296a and 296b are each configured to be movable in the width direction.

The arm portions 123a and 123b have an elongated plate shape, and are elastically deformable cantilevered member whose base end side is provided in the vicinity of the cassette receiving portion 91. The distal end portions 124a and 124b are provided on the distal end sides of the flat surface portions 122a and 122b. When the arm portions 123a and 123b elastically deform, the flat surface portions 122a and 122b and the distal end portions 124a and 124b move in the width direction.

An angle θ2 formed by the arm portions 123a and 123b and the sides 92a and 92b is 25° to 45°, and is 30° in the present embodiment. Therefore, the arm portions 123a and 123b are long, and the flat surface portions 122a and 122b are movable with a small amount of force. However, the angle θ2 is not limited to 25° to 45°.

The connection portions between the flat surface portions 122a and 122b and the arm portions 123a and 123b, and between the flat surface portions 122a and 122b and the distal end portions 124a and 124b may have an edge shape or an arc shape (R shape). In the present embodiment, the connection portion has an arc shape (R8) with a radius of 8 mm.

The distal end portions 124a and 124b are provided on the ends of the projections 296a and 296b not provided to the plate-shaped portion 292. The distal end portions 124a and 124b are inclined to have a portion closer to the projections 95a and 95b being closer to the plate-shaped portion 292.

Figure 23:
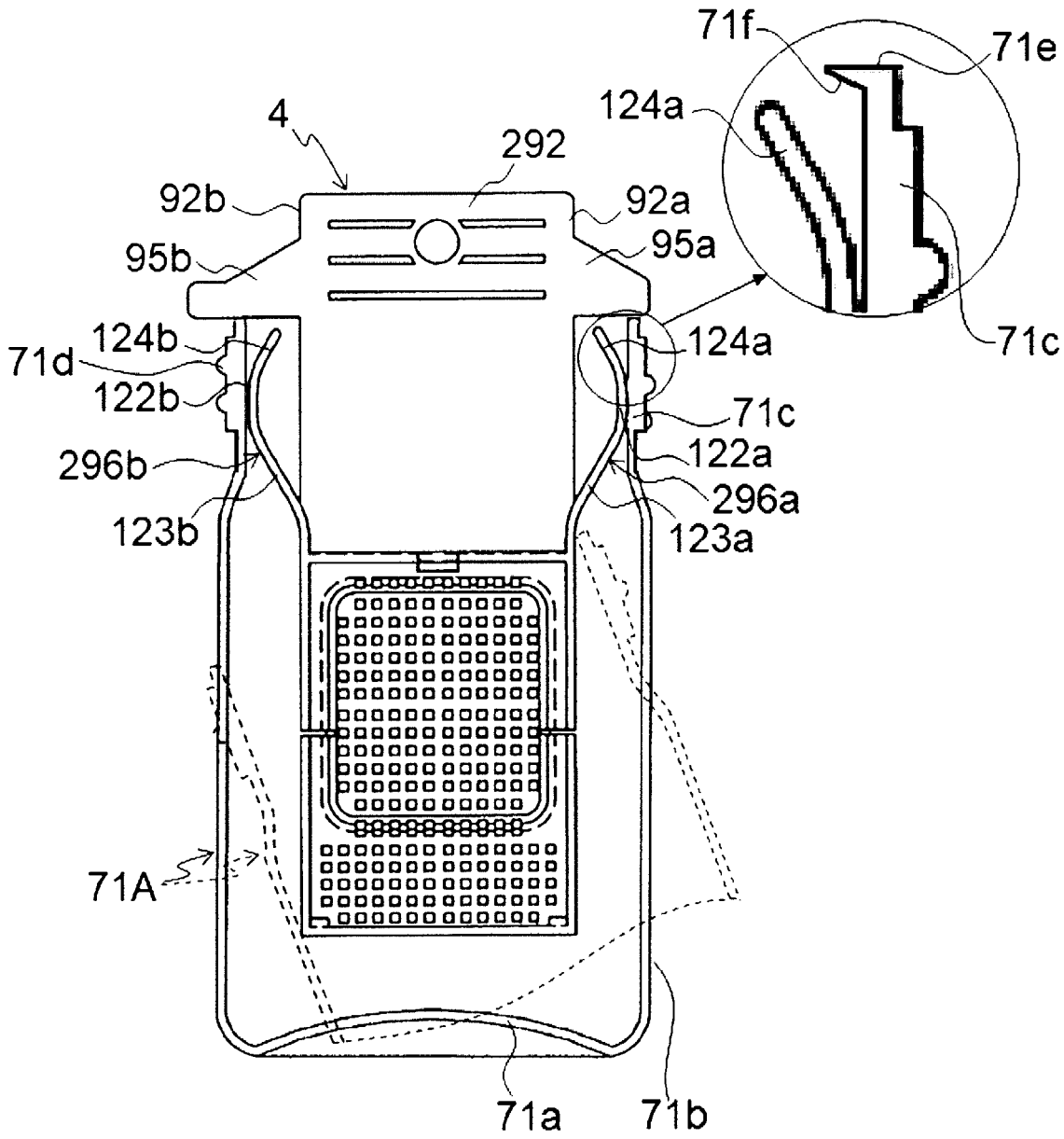
FIG. 23 is a cross-sectional view illustrating an example of a schematic configuration of a bottle body 71A in which the cassette holder 4 is provided.

FIG. 23 is a cross-sectional view illustrating an example of a schematic configuration of a bottle body 71A in which the cassette holder 4 is provided. In FIG. 23, hatching indicating a cross section is omitted. The bottle body 71A is different from the bottle body 71 in that it is made of plastic, and is the same as the bottle body 71 in that it includes the bottom surface 71a, the side surface 71b, the tubular portion 71c, and the opening portion 71e. When the cassette holder 4 is inserted in the bottle body 71A, the projections 296a and 296b elastically deform to approach the plate-shaped portion 292, the flat surface portions 122a and 122b come into contact with the inner circumference surface of the tubular portion 71c (see FIG. 7), and the flat surface portions 122a and 122b press the inner circumference surface of the tubular portion 71c. As a result, the cassette holder 4 is fixed to the bottle body 71 with the cassette holder 4 inserted in the bottle body 71 prevented from rotating.

The bottle body 71A is made of plastic, and has the opening portion 71e provided with a projection 71f protruding inward. For example, when the bottle body 71A is formed by blow molding, since the opening portion 71e is formed by cutting an excess portion with a cutting-off tool, a burr due to the cutting-off process is formed as the projection 71f. In the cassette holder 4, since the distal end portions 124a and 124b of the projections 296a and 296b are inclined to have portions closer to the plate-shaped portion 292 being closer to the projections 95a and 95b, the cassette holder 4 can be smoothly inserted in and taken out from the bottle body 71A without the projections 296a and 296b getting caught by the projection 71f.

According to the present embodiment, the projections 296a and 296b can have a simple shape. Therefore, manufacturing is facilitated. With the distal end portions 124a and 124b provided, the projections 296a and 296b can be prevent from being damaged.

According to the present embodiment, the arm portions 123a and 123b of a cantilever form are provided that have the base end sides being provided in the vicinity of the cassette receiving portion 91. Thus, the cassette holder 4 can be inserted in the bottle body 71A, even when the cassette holder 4 is largely inclined with respect to the bottle body 71A (see dotted line in FIG. 23).

Figure 24:
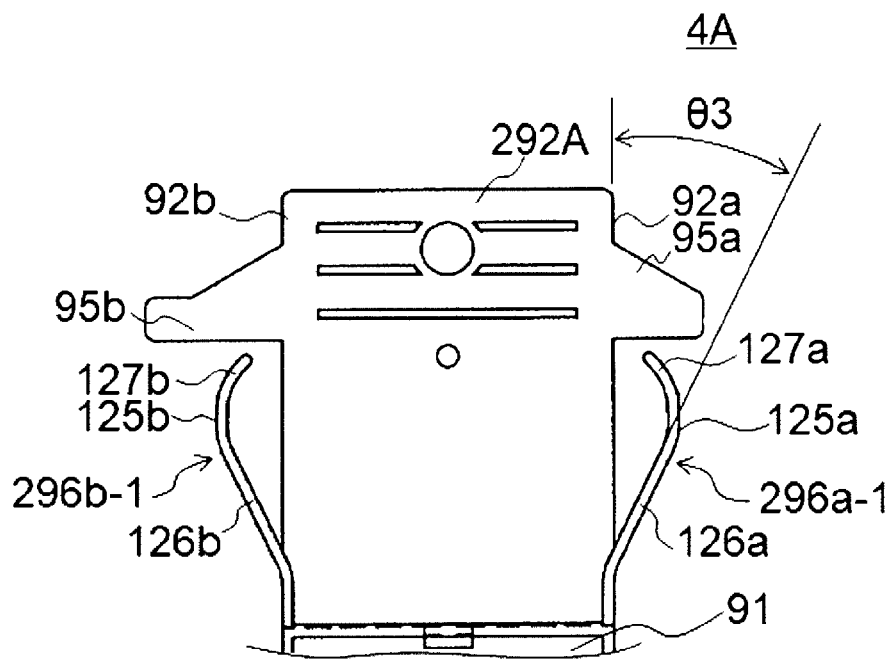
FIG. 24 is a diagram illustrating an overview of a cassette holder 4A.

The shape of the projections 296a and 296b is not limited to this. FIG. 24 is a diagram illustrating an overview of a cassette holder 4A according to a modification, and only illustrates the main part of the cassette holder 4A.

The cassette holder 4A mainly includes the cassette receiving portion 91, a plate-shaped portion 292A having a substantially plate-like shape, and the protrusion 93 (not illustrated). A plate-shaped portion 292A that has a substantially plate-like shape includes projections 296a-1 and 296b-1 respectively provided to the sides 92a and 92b. The projections 296a-1 and 296b-1 are a pair of projections protruding outward in plan view. The heights of the projections 296a-1 and 296b-1 are lower than the heights of the projections 95a and 95b. The projections 296a-1 and 296b-1 are provided between the cassette receiving portion 91 and the projections 95a and 95b.

The projections 296a-1 and 296b-1 respectively include flat surface portions 125a and 125b substantially parallel to the sides 92a and 92b, arm portions 126a and 126b that connect the flat surface portions 125a and 125b and the sides 92a and 92b, and distal end portions 127a and 127b provided on the distal end sides of the flat surface portions 125a and 125b. The flat surface portions 125a and 125b are substantially orthogonal to a plane including the plate-shaped portion 92.

The arm portions 126a and 126b have an elongated plate shape, and are elastically deformable cantilevered members whose base end sides are provided in the vicinity of the cassette receiving portion 91. The distal end portions 127a and 127b are provided on the distal end sides of the flat surface portions 125a and 125b. When the arm portions 126a and 126b elastically deform, the flat surface portions 125a and 125b and the distal end portions 127a and 127b are movable in the width direction.

An angle θ3 formed between the arm portions 126a and 126b and the sides 92a and 92b is 26°. Therefore, the arm portions 126a and 126b are long, and the flat surface portions 125a and 125b are movable with a small amount of force.

Figure 25:
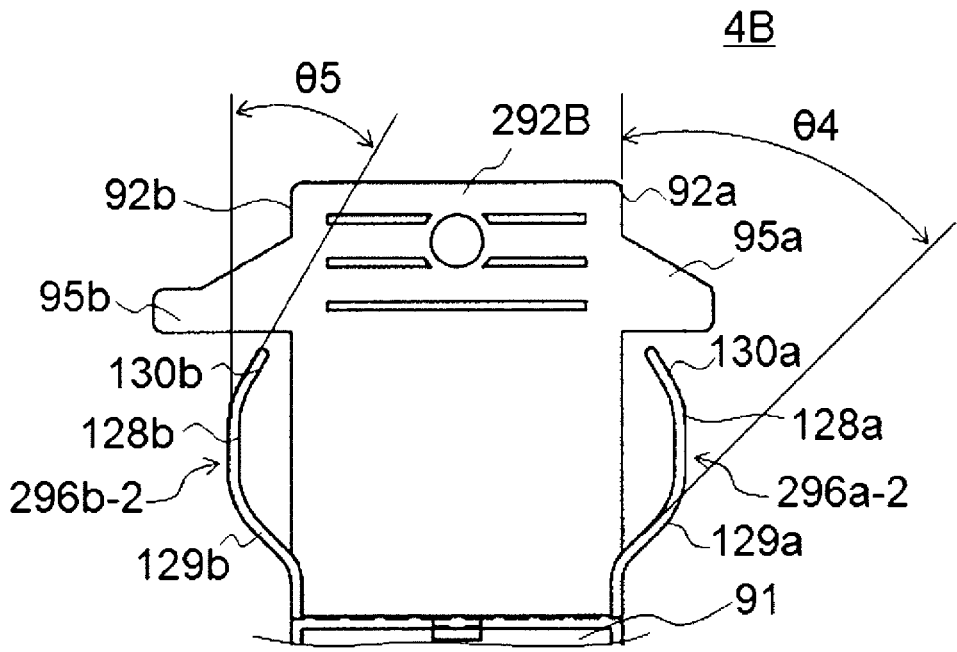
FIG. 25 is a diagram illustrating an overview of a cassette holder 4B.

FIG. 25 is a diagram illustrating an overview of a cassette holder 4B according to a modification, and only illustrates the main part of the cassette holder 4B. The cassette holder 4B mainly includes the cassette receiving portion 91, a plate-shaped portion 292B having a substantially plate-like shape, and the protrusion 93 (not illustrated). A plate-shaped portion 292B that has a substantially plate-like shape includes projections 296a-2 and 296b-2 respectively provided to the sides 92a and 92b. The projections 296a-2 and 296b-2 are a pair of projections protruding outward in plan view. The heights of the projections 296a-2 and 296b-2 are lower than the heights of the projections 95a and 95b. The projections 296a-2 and 296b-2 are provided between the cassette receiving portion 91 and the projections 95a and 95b.

The projections 296a-2 and 296b-2 respectively include flat surface portions 128a and 128b substantially parallel to the sides 92a and 92b, arm portions 129a and 129b that connect the flat surface portions 128a and 128b and the sides 92a and 92b, and distal end portions 130a and 130b provided on the distal end sides of the flat surface portions 128a and 128b. The flat surface portions 128a and 128b are substantially orthogonal to a plane including the plate-shaped portion 92.

The arm portions 129a and 129b have an elongated plate shape, and are elastically deformable cantilevered members whose base end sides are provided in the vicinity of the cassette receiving portion 91. The distal end portions 130a and 130b are provided on the distal end sides of the flat surface portions 128a and 128b. When the arm portions 129a and 129b elastically deform, the flat surface portions 128a and 128b and the distal end portions 130a and 130b are movable in the width direction.

An angle θ4 formed between the arm portions 129a and 129b and the sides 92a and 92b is 45°. Therefore, even if the lengths of the arm portions 129a and 129b are short, a large amount of movement of the flat surface portions 128a and 128b can be guaranteed.

An angle θ5 formed between the distal end portions 130a and 130b and the flat surface portions 128a and 128b is 30°. Therefore, even if the arm portions 129a and 129b are excessively deformed, with the distal end portions 130a and 130b in contact with the plate-shaped portion 292B, the projections 296a-2 and 296b-2 can be prevented from breaking.

Fourth Embodiment

Figure 26:
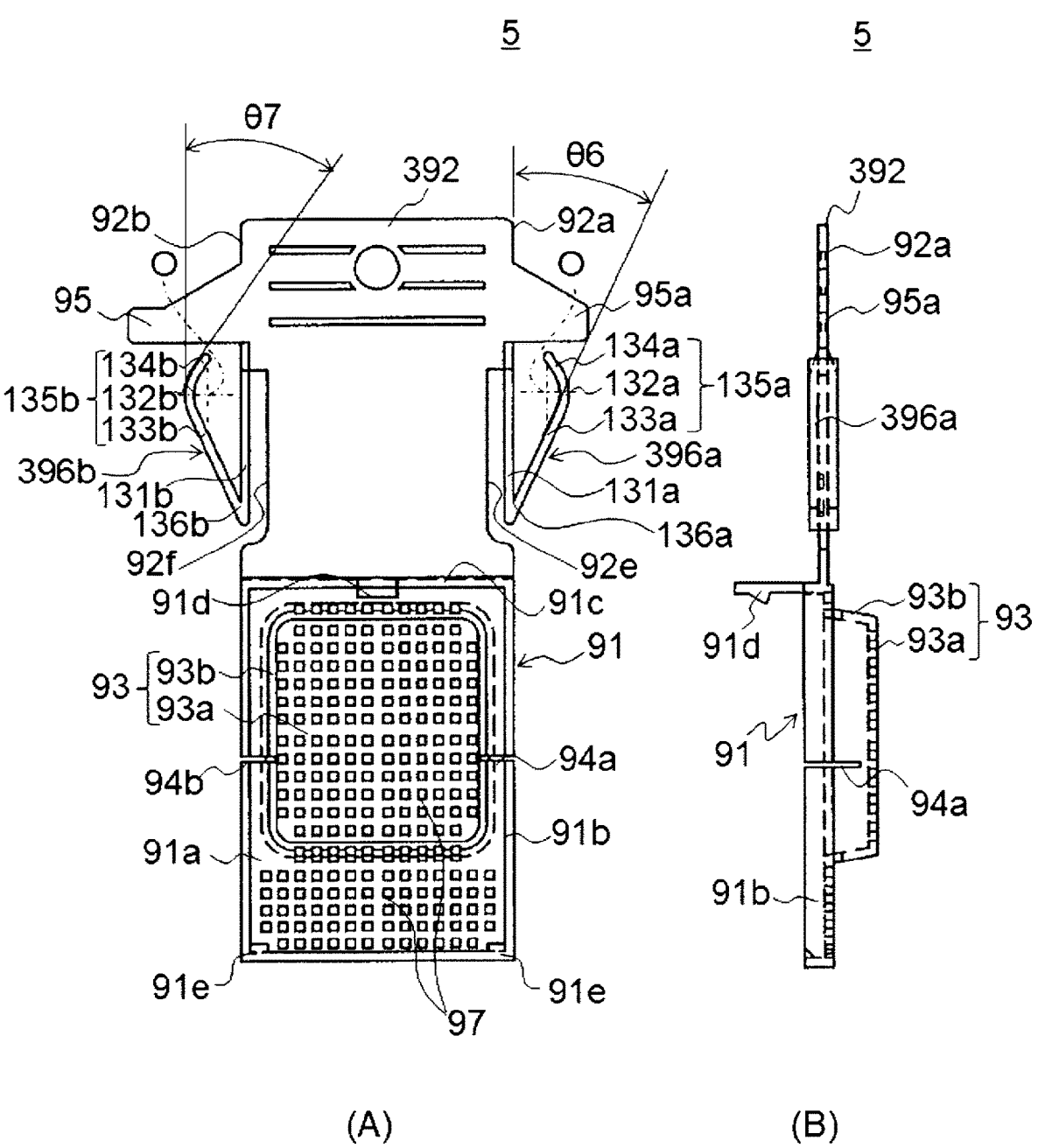
FIG. 26 is a diagram illustrating an overview of a cassette holder 5, with (A) being a plan view and (B) being a side view.

FIG. 26 is a diagram illustrating an overview of a cassette holder 5 according to a fourth embodiment of the present invention, with (A) being a plan view and (B) being a side view. The cassette holder 5 mainly includes the cassette receiving portion 91, a plate-shaped portion 392 having a substantially plate-like shape, and the protrusion 93. Note that the same components as those in the first to third embodiments are denoted by the same reference numerals, and descriptions thereof will be omitted.

The side 91c is provided with the plate-shaped portion 392. The plate-shaped portion 392 is only different from the plate-shaped portion 92 in the projections 396a and 396b, and the rest is the same.

The sides 92a and 92b are respectively provided with the projections 396a and 396b. The projections 396a and 396b are a pair of projections protruding outward in plan view. The heights of the projections 396a and 396b are lower than the heights of the projections 95a and 95b. The projections 396a and 396b are provided between the cassette receiving portion 91 and the projections 95a and 95b.

The projections 396a and 396b have bent ends to be in a hook shape. The projections 396a and 396b respectively include arm portions 131a and 131b of a cantilever form, and protruding portions 135a and 135b of an elongated plate shape. The protruding portions 135a and 135b are provided at the distal ends of the arm portions 131a and 131b and protrude in a direction away from the plate-shaped portion 392.

The protruding portions 135a and 135b respectively include connection portions 133a and 133b having one ends provided to the arm portions 131a and 131b, arc portions

132a and 132b provided on the distal end sides of the connection portions 133a and 133b, and distal end portions 134a and 134b provided on the distal end sides of the arc portions 132a and 132b. The arc portions 132a and 132b and the distal end portions 134a and 134b of the projections 396a and 396b are each configured to be movable in the width direction.

The arm portions 131a and 131b have an elongated plate shape, and are elastically deformable. The arm portions 131a and 131b have a cantilever form with the base end sides respectively fixed to the projections 95a and 95b, protrude toward the cassette receiving portion 91 from the projections 95a and 95b, and extend substantially parallel to the sides 92a and 92b.

The arm portions 131a and 131b are respectively connected to the connection portions 133a and 133b at top portions 136a and 136b. The connection portions 133a and 133b have a cantilever form with the top portions 136a and 136b fixed, and can elastically deform.

The arc portions 132a and 132b have an arc shape and are provided on the sides of the connection portions 133a and 133b opposite to the arm portions 131a and 131b. The arc portions 132a and 132b have a center O located closer to the plate-shaped portion 392 side than the protruding portions 135a and 135b are. Therefore, the arc portions 132a and 132b are convex outward.

When the arm portions 131a and 131b and the protruding portions 135a and 135b elastically deform in a direction approaching the plate-shaped portion 392, the arc portions 132a and 132b move in the width direction. An angle θ6 formed by the arm portions 131a and 131b and the connection portions 133a and 133b is 25° to 65°, and is 25° in the present embodiment. With the angle θ6 set to be small, the connection portions 133a and 133b become long, and the arm portions 131a and 131b and the connection portions 133a and 133b are elastically deformed together to move the arc portions 132a and 132b. Thus, the projections 396a and 396b are soft and are deformed by a small amount of force. However, the angle θ6 is not limited to 25° to 65°.

The distal end portions 130a and 130b are provided on the ends of the projections 396a and 396b not provided to the plate-shaped portion 392. The distal end portions 130a and 130b are inclined at an angle θ7 of 30° to have a portion closer to the projections 95a and 95b being closer to the plate-shaped portion 392.

Figure 27:
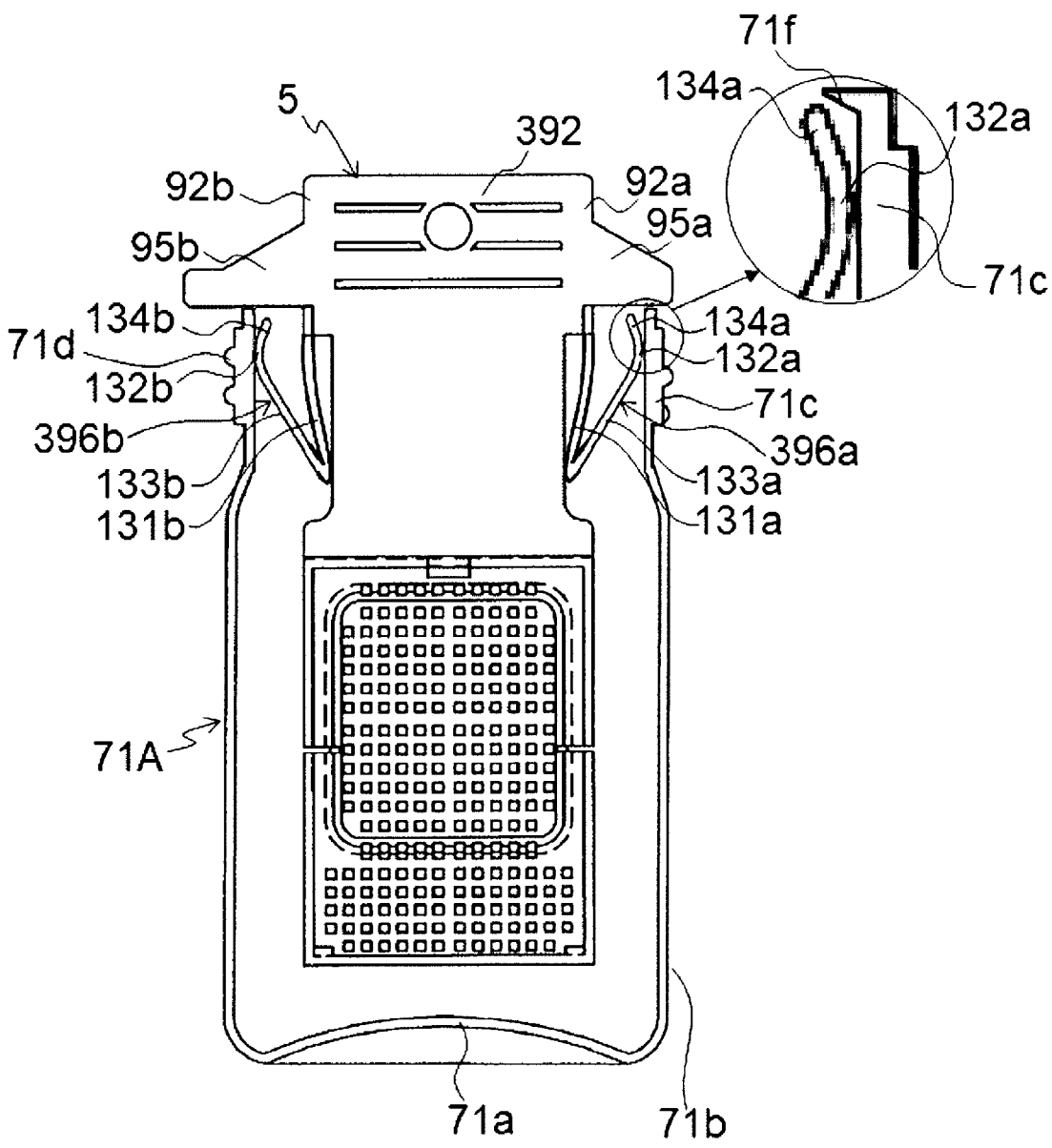
FIG. 27 is a cross-sectional view illustrating an example of a schematic configuration of a bottle body 71A in which the cassette holder 5 is provided.

FIG. 27 is a cross-sectional view illustrating an example of a schematic configuration of the bottle body 71A in which the cassette holder 5 is provided. In FIG. 27, hatching indicating a cross section is omitted. When the cassette holder 5 is inserted in the bottle body 71A, the arm portions 131a and 131b and the protruding portions 135a and 135b are elastically deformed, the arc portions 132a and 132b come into contact with the inner circumference surface of the tubular portion 71c, and the arc portions 132a and 132b press the inner circumference surface of the tubular portion 71c. As a result, the cassette holder 5 is fixed to the bottle body 71A with the cassette holder 5 inserted in the bottle body 71A prevented from rotating. The distal end portions 130a and 130b are inclined to have a portion closer to the projections 95a and 95b being closer to the plate-shaped portion 392, the distal end portions 130a and 130b are not caught by the projection 71f even when the projections 396a and 396b deform, whereby the cassette holder 5 can be smoothly inserted in and taken out from the bottle body 71A.

According to the present embodiment, the arm portions 131a and 131b extend substantially parallel to the sides 92a and 92b, the direction of the force applied to the arc portions 132*a* and 132*b* and the direction of deformation of the arm portions 131*a* and 131*b* substantially coincide with each other, and thus the arc portions 132*a* and 132*b* can easily move. In addition, since the total length of the projections 396*a* and 396*b* (the arm portions 131*a* and 131*b* and the protruding portions 135*a* and 135*b*) is long, the projections 396*a* and 396*b* is elastically deformable with a small amount of force, and the projections 396*a* and 396*b* can be deformed with a small amount of force.

The shape of the projections 396*a* and 396*b* is not limited to this. The projections 396*a* and 396*b* have the arm portions 131*a* and 131*b* and the connection portions 133*a* and 133*b* connected to each other via the top portions 136*a* and 136*b* with a pointed shape. Alternatively, the arm portions 131*a* and 131*b* and the connection portions 133*a* and 133*b* may be connected via an arc. In the present invention, the mode in which the arm portions and the connection portions are connected to each other via an arc (the top portion is not pointed) is also included in the hook shaped projection having a bent end.

Figure 28:
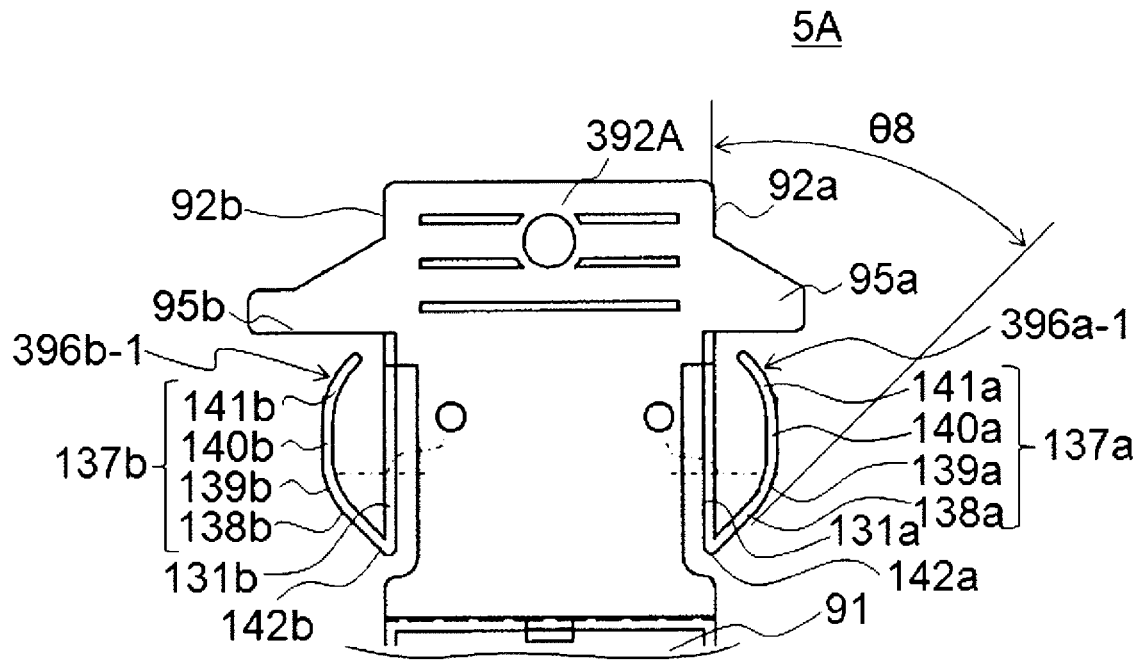
FIG. 28 is a diagram illustrating an overview of a cassette holder 5A.

Further, for example, the projection may include a flat surface portion in addition to the arc portion. FIG. 28 is a diagram illustrating an overview of a cassette holder 5A according to a modification, and only illustrates the main part of the cassette holder 5A. The cassette holder 5A mainly includes the cassette receiving portion 91, a plate-shaped portion 392A having a substantially plate-like shape, and the protrusion 93 (not illustrated). The plate-shaped portion 392A that has a substantially plate-like shape includes projections 396*a*-1 and 396*b*-1 respectively provided to the sides 92*a* and 92*b*.

The projections 396*a*-1 and 396*b*-1 are a pair of projections protruding outward in plan view. The heights of the projections 396*a*-1 and 396*b*-1 are lower than the heights of the projections 95*a* and 95*b*. The projections 396*a*-1 and 396*b*-1 are provided between the cassette receiving portion 91 and the projections 95*a* and 95*b*.

The projections 396*a*-1 and 396*b*-1 have bent ends to be in a hook shape. The projections 396*a*-1 and 396*b*-1 respectively include the arm portions 131*a* and 131*b* of a cantilever form, and protruding portions 137*a* and 137*b* of an elongated plate shape. The protruding portions 137*a* and 137*b* are provided at the distal ends of the arm portions 131*a* and 131*b* and protrude in a direction away from the plate-shaped portion 392.

The protruding portions 137*a* and 137*b* respectively include connection portions 138*a* and 138*b* having one ends provided to the arm portions 131*a* and 131*b*, arc portions 139*a* and 139*b* provided on the distal end sides of the connection portions 138*a* and 138*b*, flat surface portion 140*a* and 140*b* provided on the distal end sides of the arc portions 139*a* and 139*b*, and distal end portions 141*a* and 141*b* provided on the distal end sides of the flat surface portions 140*a* and 140*b*. The flat surface portions 140*a* and 140*b* are substantially parallel to the sides 92*a* and 92*b* and substantially orthogonal to a plane including the plate-shaped portion 392A. The arm portions 131*a* and 131*b* are respectively connected to the connection portions 138*a* and 138*b* via top portions 142*a* and 142*b*.

The arc portions 139*a* and 139*b* have an arc shape and are provided on the sides of the connection portions 138*a* and 138*b* opposite to the arm portions 131*a* and 131*b*. The arc portions 139*a* and 139*b* have a center O located closer to the plate-shaped portion 392 side than the protruding portions 137*a* and 137*b* are. Therefore, the arc portions 139*a* and 139*b* are convex outward. Therefore, when the cassette holder 5A is inserted in the bottle body 71A (see FIGS. 23 and 27), first, the arc portions 139*a* and 139*b* come into contact with the inner circumference surface of the tubular portion 71*c* (see FIGS. 23 and 27).

An angle θ8 formed by the arm portions 131*a* and 131*b* and the connection portions 138*a* and 138*b* is 45°. Since the angle θ8 is large, the arc portions 139*a* and 139*b*, the flat surface portions 140*a* and 140*b*, and the distal end portions 141*a* and 141*b* move in the width direction only through elastic deformation of the arm portions 131*a* and 131*b*, without elastically deforming the connection portions 138*a* and 138*b*. In addition, since the protruding portions 137*a* and 137*b* are also elastically deformable, the projections 396*a*-1 and 396*b*-1 can be deformed using a small amount of force.

The distal end portions 141*a* and 141*b* are provided on the ends of the projections 396-1*a* and 396-1*b* not provided to the plate-shaped portion 392A. The flat surface portions 140*a* and 140*b* and the distal end portions 141*a* and 141*b* are connected to each other via curved surfaces. The distal end portions 141*a* and 141*b* are inclined to have a portion closer to the projections 95*a* and 95*b* being closer to the plate-shaped portion 392A. Therefore, even if the projections 396*a* and 396*b* are deformed, the distal end portions 141*a* and 141*b* are not caught by the projection 71*f* (see FIGS. 23 and 27), so that the cassette holder 5A can be smoothly inserted in and taken out from the bottle body 71A.

Figure 29:
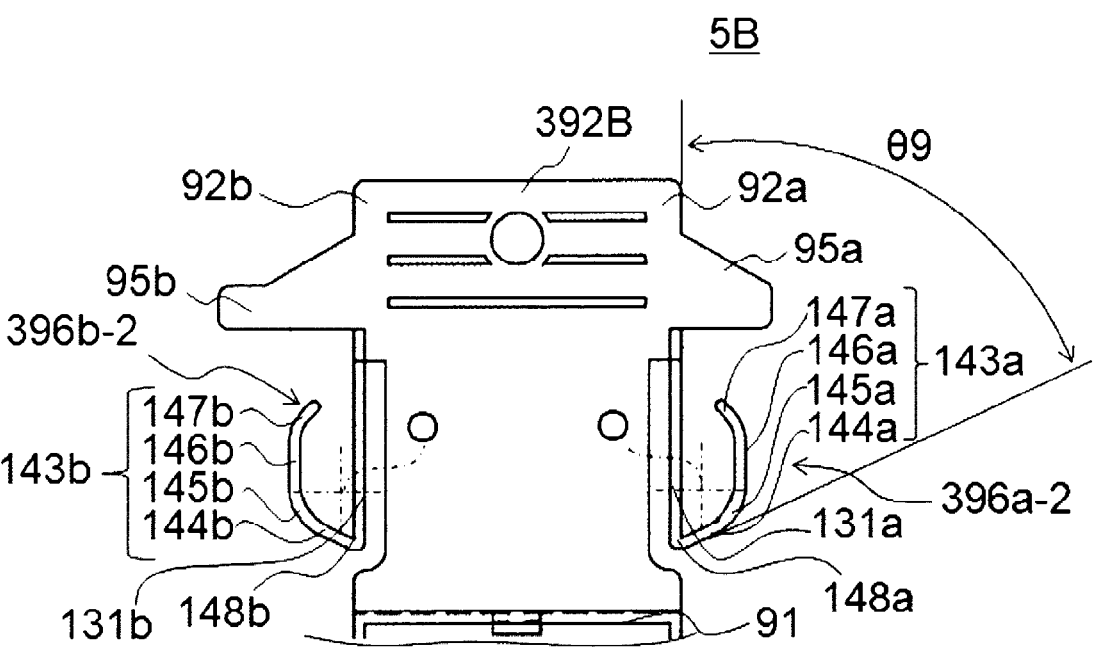
FIG. 29 is a diagram illustrating an overview of a cassette holder 5B.

FIG. 29 is a diagram illustrating an overview of a cassette holder 5B according to a modification, and only illustrates the main part of the cassette holder 5B. The cassette holder 5B mainly includes the cassette receiving portion 91, a plate-shaped portion 392B having a substantially plate-like shape, and the protrusion 93 (not illustrated). The plate-shaped portion 392BS that has a substantially plate-like shape includes projections 396*a*-2 and 396*b*-2 respectively provided to the sides 92*a* and 92*b*.

The projections 396*a*-2 and 396*b*-2 are a pair of projections protruding outward in plan view. The heights of the projections 396*a*-2 and 396*b*-2 are lower than the heights of the projections 95*a* and 95*b*. The projections 396*a*-2 and 396*b*-2 are provided between the cassette receiving portion 91 and the projections 95*a* and 95*b*.

The projections 396*a*-2 and 396*b*-2 have bent ends to be in a hook shape. The projections 396*a*-2 and 396*b*-2 respectively include the arm portions 131*a* and 131*b* of a cantilever form, and protruding portions 143*a* and 143*b* of an elongated plate shape. The protruding portions 143*a* and 143*b* are provided at the distal ends of the arm portions 131*a* and 131*b* and protrude in a direction away from the plate-shaped portion 392.

The protruding portions 143*a* and 143*b* respectively include connection portions 144*a* and 144*b* having one ends provided to the arm portions 131*a* and 131*b*, arc portions 145*a* and 145*b* provided on the distal end sides of the connection portions 144*a* and 144*b*, flat surface portion 146*a* and 146*b* provided on the distal end sides of the arc portion 145*a* and 145*b*, and distal end portions 147*a* and 147*b* provided on the distal end sides of the flat surface portions 146*a* and 146*b*. The flat surface portions 146*a* and 146*b* are substantially parallel to the sides 92*a* and 92*b* and substantially orthogonal to a plane including the plate-shaped portion 392B. The arm portions 131*a* and 131*b* are respectively connected to the connection portions 144*a* and 144*b* at top portions 148*a* and 148*b*.

The arc portions 145*a* and 145*b* have an arc shape and are provided on the sides of the connection portions 144*a* and 144*b* opposite to the arm portions 131*a* and 131*b*. The arc portions 145*a* and 145*b* have the center O located closer to the plate-shaped portion 392 than the protruding portions 143a and 143b are. Therefore, the arc portions 145a and 145b are convex outward. Therefore, when the cassette holder 5B is inserted in the bottle body 71A, first, the arc portions 145a and 145b come into contact with the inner circumference surface of the tubular portion 71c (see FIGS. 23 and 27).

An angle θ9 formed by the arm portions 131a and 131b and the connection portions 144a and 144b is 65°. Since the angle θ9 is large, the flat surface portions 140a and 140b move in the width direction only through elastic deformation of the arm portions 131a and 131b, without elastically deforming the connection portions 144a and 144b.

The distal end portions 147a and 147b are provided on the ends of the projections 396a-2 and 396b-2 not provided to the plate-shaped portion 392B. The flat surface portions 146a and 146b and the distal end portions 147a and 147b are connected to each other via curved surfaces. The distal end portions 147a and 147b are inclined to have a portion closer to the projections 95a and 95b being closer to the plate-shaped portion 392B. Therefore, even if the projections 396a-2 and 396b-2 are deformed, the distal end portions 147a and 147b are not caught by the projection 71f (see FIGS. 23 and 27), so that the cassette holder 5B can be smoothly inserted in and taken out from the bottle body 71A.

Fifth Embodiment

Figure 30:
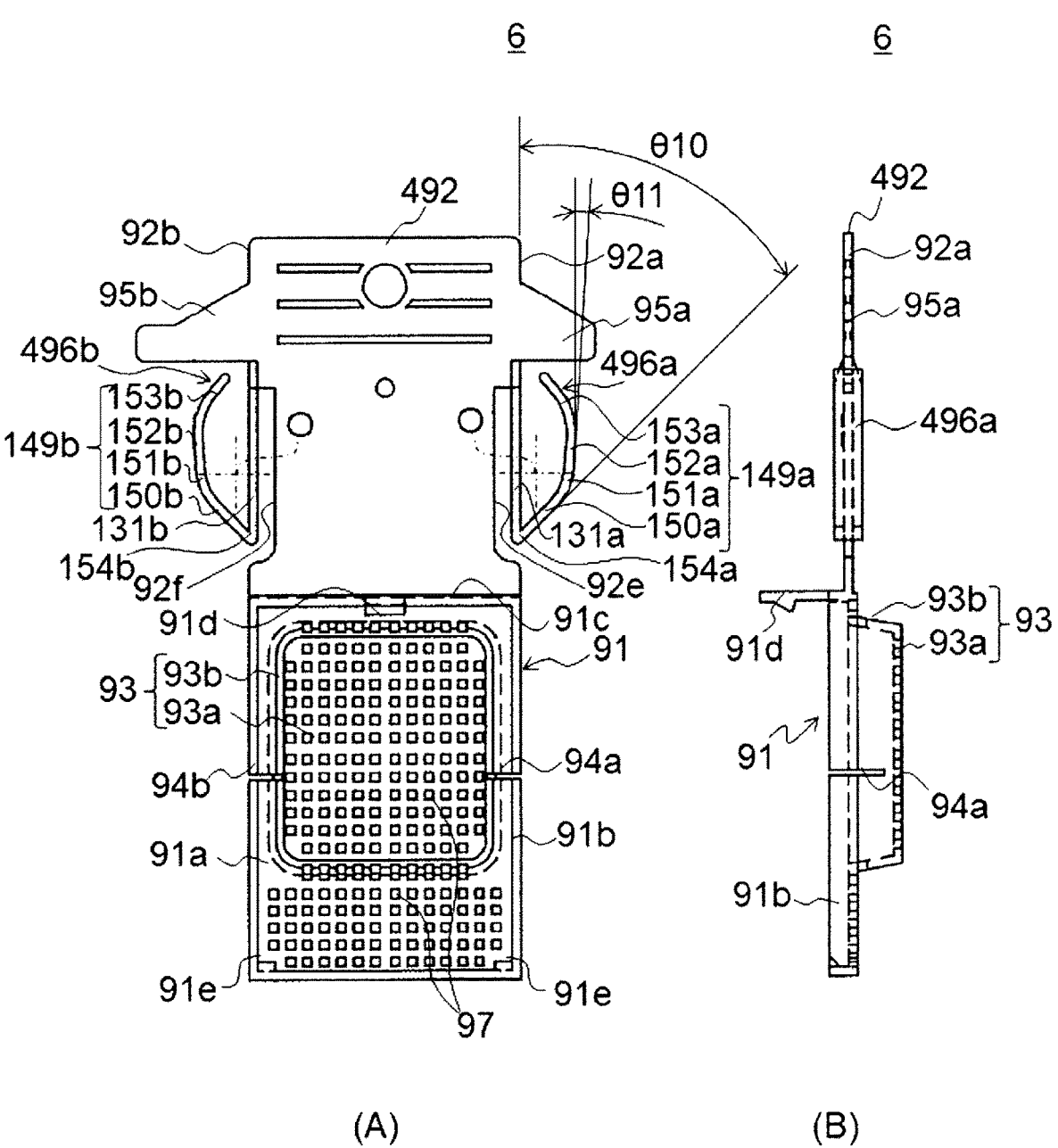
FIG. 30 is a diagram illustrating an overview of a cassette holder 6, with (A) being a plan view and (B) being a side view.

FIG. 30 is a diagram illustrating an overview of a cassette holder 6 according to a fifth embodiment of the present invention, with (A) being a plan view and (B) being a side view. Note that the same components as those in the first to fourth embodiments are denoted by the same reference numerals, and descriptions thereof will be omitted.

The cassette holder 6 mainly includes the cassette receiving portion 91, a plate-shaped portion 492 having a substantially plate-like shape, and the protrusion 93. The side 91c is provided with the plate-shaped portion 492. The plate-shaped portion 492 includes projections 496a and 496b. The plate-shaped portion 492 is only different from the plate-shaped portion 92 in the projections 496a and 496b, and the rest is the same.

The sides 92a and 92b are respectively provided with the projections 496a and 496b. The projections 496a and 496b are a pair of projections protruding outward in plan view. The heights of the projections 496a and 496b are lower than the heights of the projections 95a and 95b. The projections 496a and 496b are provided between the cassette receiving portion 91 and the projections 95a and 95b.

The projections 496a and 496b have bent ends to be in a hook shape. The projections 496a and 496b respectively include arm portions 131a and 131b of a cantilever form, and protruding portions 149a and 149b of an elongated plate shape. The protruding portions 149a and 149b are provided at the distal ends of the arm portions 131a and 131b and protrude in a direction away from the plate-shaped portion 492.

The protruding portions 149a and 149b respectively include connection portions 150a and 150b having one ends provided to the arm portions 131a and 131b, arc portions 151a and 151b provided on the distal end sides of the connection portions 150a and 150b, flat surface portions 152a and 152b provided on the distal end sides of the arc portion 151a and 151b, and distal end portions 153a and 153b provided on the distal end sides of the flat surface portions 152a and 152b.

The arm portions 131a and 131b are respectively connected to the connection portions 150a and 150b at top portions 154a and 154b. The connection portions 150a and 150b have a cantilever form with the top portions 154a and 154b fixed.

The protruding portions 149a and 149b can elastically deform, and when the arm portions 131a and 131b and the protruding portions 149a and 149b elastically deform, the arc portions 151a and 151b, the flat surface portions 152a and 152b, and the distal end portions 153a and 153b move in the width direction.

An angle θ10 formed by the arm portions 131a and 131b and the connection portions 150a and 150b is 25° to 65°, and is 45° in the present embodiment. However, the angle θ10 is not limited to 25° to 65°.

The arc portions 151a and 151b have an arc shape and are provided on the sides of the connection portions 150a and 150b opposite to the arm portions 131a and 131b. The arc portions 151a and 151b have the center O located closer to the plate-shaped portion 492 than the protruding portions 149a and 149b are. Therefore, the arc portions 151a and 151b are convex outward.

The flat surface portions 152a and 152b are each inclined with respect to the sides 92a and 92b, and are each substantially orthogonal to a plane including the plate-shaped portion 92. The flat surface portion 152a is inclined with respect to the side 92a to have a portion closer to the projection 95a being farther from the side 92a, and the flat surface portion 152b is inclined with respect to the side 92b to have a portion closer to the projection 95b being farther from the side 92b. An angle θ11 thereof is 3.5° to 5°, and is 3.5° in the present embodiment. However, θ11 is not limited to 3.5° to 5°.

When the cassette holder 6 is inserted in the bottle body 71A (see FIGS. 23 and 27), the flat surface portions 152a and 152b come into contact with the inner circumference surface of the tubular portion 71c, and the flat surface portions 152a and 152b press the inner circumference surface of the tubular portion 71c. As a result, the cassette holder 6 is fixed to the bottle body 71A with the cassette holder 6 inserted in the bottle body 71A prevented from rotating.

According to the present embodiment, since the flat surface portions 152a and 152b are inclined with respect to the sides 92a and 92b to have a portion closer to the projections 95a and 95b being farther from the sides 92a and 92b, the flat surface portions 152a and 152b can more strongly press the inner circumference surface of the tubular portion 71c.

Sixth Embodiment

Figure 31:
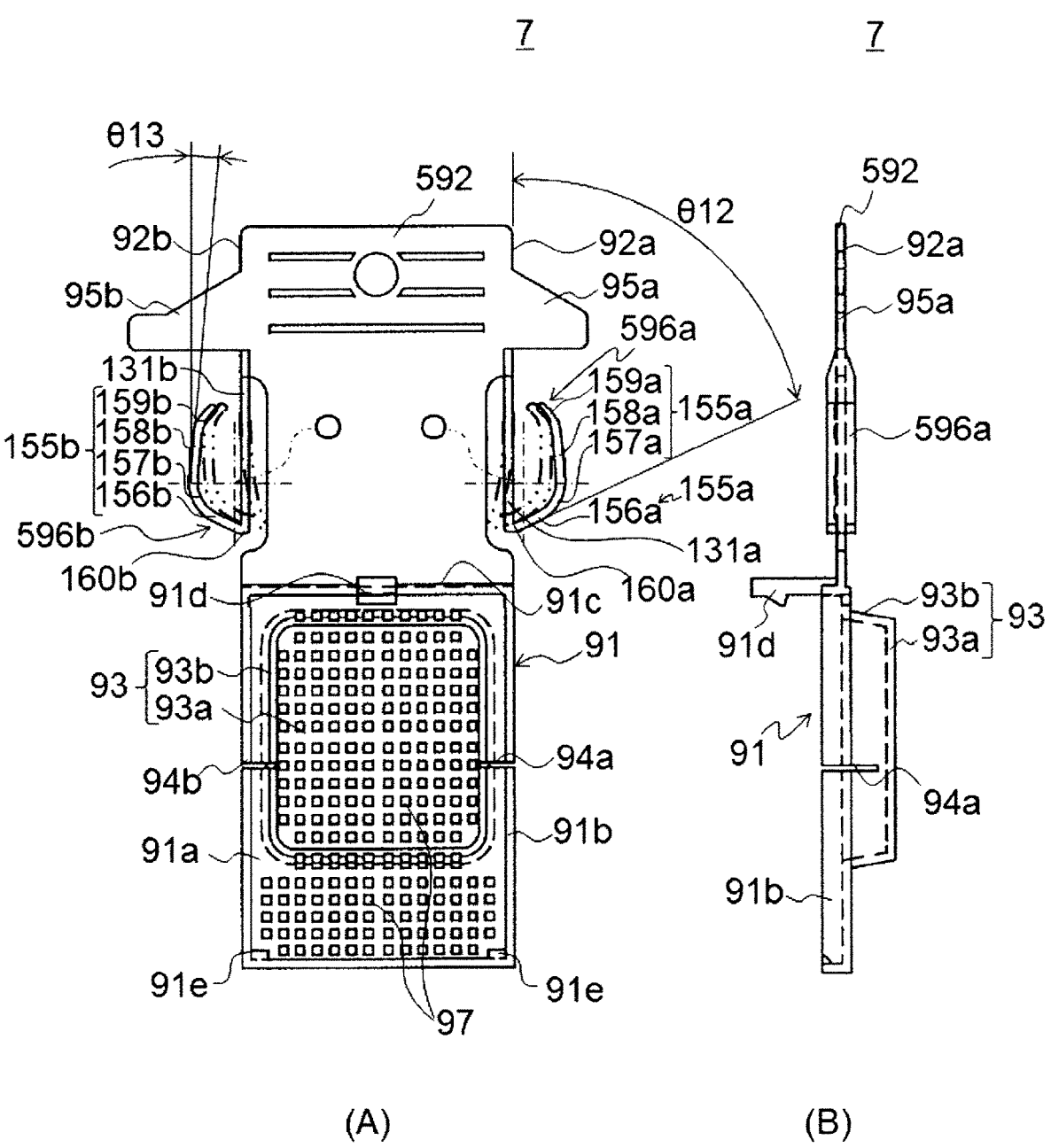
FIG. 31 is a diagram illustrating an overview of a cassette holder 7, with (A) being a plan view and (B) being a side view.

FIG. 31 is a diagram illustrating an overview of a cassette holder 7 according to a sixth embodiment of the present invention, with (A) being a plan view and (B) being a side view. Note that the same components as those in the first to fifth embodiments are denoted by the same reference numerals, and descriptions thereof will be omitted.

The cassette holder 7 mainly includes the cassette receiving portion 91, a plate-shaped portion 592 having a substantially plate-like shape, and the protrusion 93. The side 91c is provided with the plate-shaped portion 592. The plate-shaped portion 592 includes projections 596a and 596b. The plate-shaped portion 592 is only different from the plate-shaped portion 92 in the projections 596a and 596b, and the rest is the same.

The sides 92*a* and 92*b* are respectively provided with the projections 596*a* and 596*b*. The projections 596*a* and 596*b* are a pair of projections protruding outward in plan view. The heights of the projections 596*a* and 596*b* are lower than the heights of the projections 95*a* and 95*b*. The projections 596*a* and 596*b* are provided between the cassette receiving portion 91 and the projections 95*a* and 95*b*.

The projections 596*a* and 596*b* have bent ends to be in a hook shape. The projections 596*a* and 596*b* respectively include arm portions 131*a* and 131*b* of a cantilever form, and protruding portions 155*a* and 155*b* of an elongated plate shape. The protruding portions 155*a* and 155*b* are provided at the distal ends of the arm portions 131*a* and 131*b* and protrude in a direction away from the plate-shaped portion 592.

The protruding portions 155*a* and 155*b* respectively include connection portions 156*a* and 156*b* having one ends provided to the arm portions 131*a* and 131*b*, arc portions 157*a* and 157*b* provided on the distal end sides of the connection portions 156*a* and 156*b*, flat surface portions 158*a* and 158*b* provided on the distal end sides of the arc portion 157*a* and 157*b*, and distal end portions 159*a* and 159*b* provided on the distal end sides of the flat surface portions 158*a* and 158*b*.

The arm portions 131*a* and 131*b* are respectively connected to the connection portions 156*a* and 156*b* at top portions 160*a* and 160*b*. The connection portions 156*a* and 156*b* have a cantilever form with the top portions 160*a* and 160*b* fixed.

An angle θ12 formed by the arm portions 131*a* and 131*b* and the connection portions 156*a* and 156*b* is 25° to 65°, and is 65° in the present embodiment. Thus, the arc portions 157*a* and 157*b*, the flat surface portions 158*a* and 158*b*, and the distal end portions 159*a* and 159*b* move in the width direction, mainly through the elastic deformation of the arm portions 131*a* and 131*b*, with almost no elastic deformation of the connection portions 156*a* and 156*b*. However, the angle θ12 is not limited to 25° to 65°.

The arc portions 157*a* and 157*b* are provided on the sides of the connection portions 156*a* and 156*b* opposite to the arm portions 131*a* and 131*b*. The arc portions 157*a* and 157*b* have an arc shape centered on the point O (for example, an arc having a radius of 5 mm to 8 mm). The arc portions 157*a* and 157*b* have the center O located closer to the plate-shaped portion 592 than the protruding portions 155*a* and 155*b* are. Therefore, the arc portions 157*a* and 157*b* are convex outward.

The flat surface portions 158*a* and 158*b* are each inclined with respect to the sides 92*a* and 92*b*, and are each substantially orthogonal to a plane including the plate-shaped portion 92. The flat surface portion 158*a* is inclined with respect to the side 92*a* to have a portion closer to the projection 95*a* being closer from the side 92*a*, and the flat surface portion 158*b* is inclined with respect to the side 92*b* to have a portion closer to the projection 95*b* being closer to the side 92*b*. An angle θ13 thereof is 3.5° to 5°, and is 5° in the present embodiment. However, θ13 is not limited to 3.5° to 5°.

The distal end portions 159*a* and 159*b* are provided on the ends of the projections 596*a* and 596*b* not provided to the plate-shaped portion 592. The distal end portions 159*a* and 159*b* are inclined to have a portion closer to the projections 95*a* and 95*b* being closer to the plate-shaped portion 592.

Figure 32:
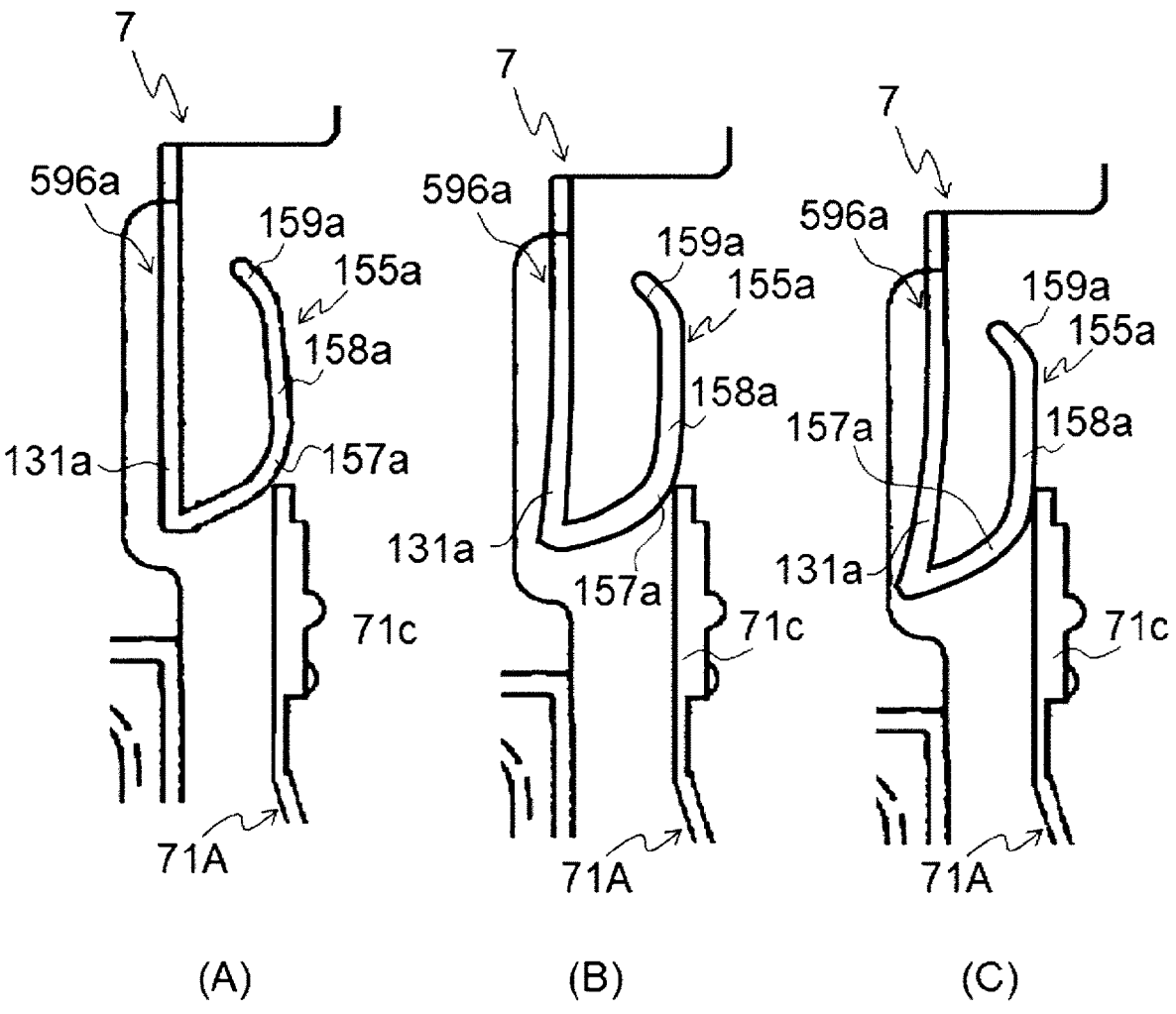
FIG. 32 is a diagram schematically illustrating how the cassette holder 7 is provided in the bottle body 71A, with (A) illustrating a state before deformation of a projection 596a, (B) illustrating how the projection 596a deforms, and (C) illustrating a state where the projection 596a is completely deformed.

FIG. 32 is a diagram schematically illustrating how the cassette holder 7 is provided in the bottle body 71A, with (A) illustrating a state before deformation of a projection 596*a*, (B) illustrating how the projection 596*a* deforms, and (C)

illustrating a state where the projection 596*a* is completely deformed. As illustrated in FIG. 32(A), the flat surface portions 158*a* and 158*b* are inclined to have a portion closer to the sides 92*a* and 92*b* being closer to the projections 95*a* and 95*b*, and the arc portions 157*a* and 157*b* are convex outward. Thus, the arc portions 157*a* and 157*b* are positioned on the outermost sides of the protruding portions 155*a* and 155*b*. Therefore, when the cassette holder 7 is inserted in the bottle body 71A, first, the arc portions 157*a* and 157*b* come into contact with the inner circumference surface of the tubular portion 71*c*.

When the cassette holder 7 is pushed in from the state illustrated in FIG. 32(A), as illustrated in FIG. 32(B), the arm portions 131*a* and 131*b* elastically deform while the arc portions 157*a* and 157*b* move along the inner circumference surface of the tubular portion 71*c*. When the cassette holder 7 is further pushed in from the state illustrated in FIG. 32(B), as illustrated in FIG. 32(C), the arm portions 131*a* and 131*b* (and the protruding portions 155*a* and 155*b* in some cases) elastically deform, and the flat surface portions 158*a* and 158*b* become substantially parallel to the sides 92*a* and 92*b* (two-dot chain line in FIG. 31 indicates the same state). Thus, in a state where the cassette holder 7 is completely inserted in the bottle body 71A, the entirety of the flat surface portions 158*a* and 158*b* are in contact with the inner circumference surface of the tubular portion 71*c*, and the entirety of the flat surface portions 158*a* and 158*b* press the inner circumference surface of the tubular portion 71*c*. As a result, the cassette holder 7 is fixed to the bottle body 71A with the cassette holder 7 inserted in the bottle body 71A prevented from rotating.

The distal end portions 159*a* and 159*b* are inclined to have portions closer to the projections 95*a* and 95*b* being closer to the plate-shaped portion 592. Thus, the cassette holder 7 can be smoothly inserted in and taken out from the bottle body 71A without the projections 596*a* and 596*b* getting caught by the projection 71*f* (not illustrated in FIG. 32).

According to the present embodiment, since the flat surface portions 158*a* and 158*b* are inclined with respect to the sides 92*a* and 92*b* to have a portion closer to the projections 95*a* and 95*b* being closer from the sides 92*a* and 92*b*, the entirety of the flat surface portions 158*a* and 158*b* can press the inner circumference surface of the tubular portion 71*c*. Thus, the cassette holder 7 can be firmly fixed to the bottle body 71A, even though the projections 596*a* and 596*b* are soft and easily deformable.

According to the present embodiment, the projections 596*a* and 596*b* deform while the arc portions 157*a* and 157*b* press the inner circumference surface of the bottle body 71A. Thus, the cassette holder 7 is inserted in and taken out from the bottle body 71A without imposing excessive force on the projections 596*a* and 596*b*, whereby the cassette holder 7 can be smoothly inserted and taken out, and the projections 596*a* and 596*b* can be prevented from being damaged.

Figure 33:
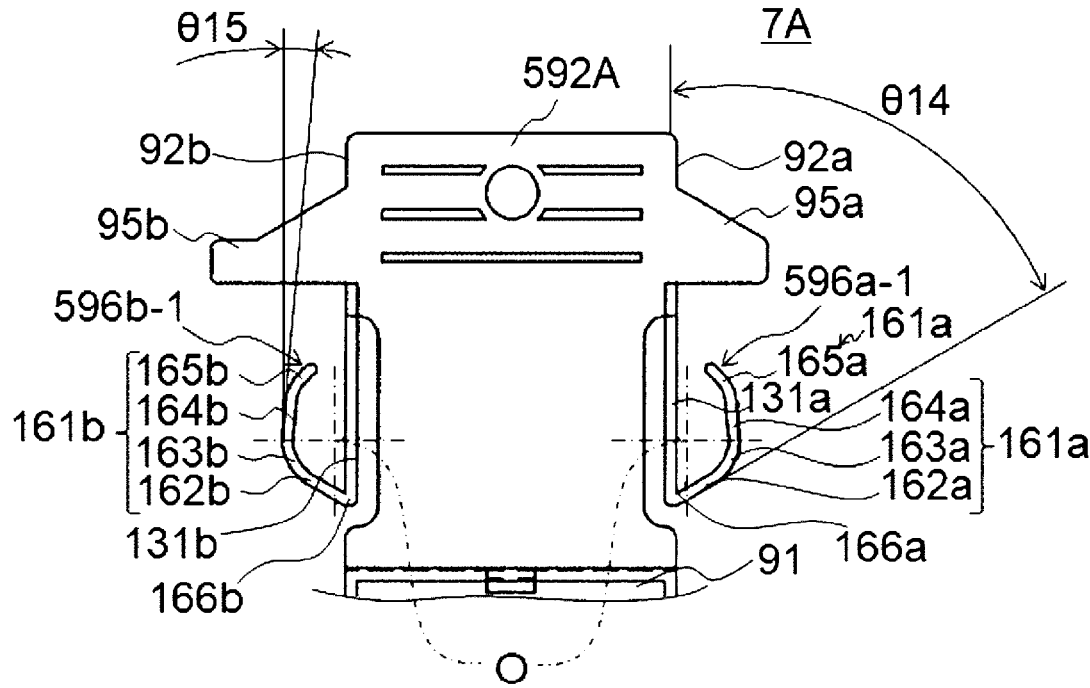
FIG. 33 is a diagram illustrating an overview of a cassette holder 7A.

The shape of the projections 596*a* and 596*b* is not limited to this. FIG. 33 is a diagram illustrating an overview of a cassette holder 7A according to a modification, and only illustrates the main part of the cassette holder 7A. The cassette holder 7A mainly includes the cassette receiving portion 91, a plate-shaped portion 592A having a substantially plate-like shape, and the protrusion 93 (not illustrated). A plate-shaped portion 592A that has a substantially plate-like shape includes projections 596*a*-1 and 596*b*-1 respectively provided to the sides 92*a* and 92*b*.

The projections 596*a*-1 and 596*b*-1 are a pair of projections protruding outward in plan view. The heights of the projections 596a-1 and 596b-1 are lower than the heights of the projections 95a and 95b. The projections 596a-1 and 596b-1 are provided between the cassette receiving portion 91 and the projections 95a and 95b.

The projections 596a-1 and 596b-1 have bent ends to be in a hook shape. The projections 596a-1 and 596b-1 respectively include the arm portions 131a and 131b of a cantilever form, and protruding portions 161a and 161b of an elongated plate shape. The protruding portions 161a and 161b are provided at the distal ends of the arm portions 131a and 131b and protrude in a direction away from the plate-shaped portion 592A.

The protruding portions 161a and 161b respectively include connection portions 162a and 162b having one ends provided to the arm portions 131a and 131b, arc portions 163a and 163b provided on the distal end sides of the connection portions 162a and 162b, flat surface portions 164a and 164b provided on the distal end sides of the arc portion 163a and 163b, and distal end portions 165a and 165b provided on the distal end sides of the flat surface portions 164a and 164b. The arm portions 131a and 131b are respectively connected to the connection portions 162a and 162b at top portions 166a and 166b.

An angle θ14 formed by the arm portions 131a and 131b and the connection portions 162a and 162b is 60°. Thus, the arc portions 163a and 163b, the flat surface portions 164a and 164b, and the distal end portions 165a and 165b move in the width direction, mainly through the elastic deformation of the arm portions 131a and 131b, with almost no elastic deformation of the connection portions 162a and 162b.

The arc portions 163a and 163b are provided on the sides of the connection portions 162a and 162b opposite to the arm portions 131a and 131b. The arc portions 163a and 163b have an arc shape centered on the point O. The center O of the arc portions 163a and 163b is located closer to the plate-shaped portion 592A than the protruding portions 161a and 161b are, and thus the arc portions 163a and 163b are convex outward.

The flat surface portions 164a and 164b are each inclined with respect to the sides 92a and 92b, and are each substantially orthogonal to a plane including the plate-shaped portion 592A. The flat surface portion 164a is inclined with respect to the side 92a to have a portion closer to the projection 95a being closer from the side 92a, and the flat surface portion 164b is inclined with respect to the side 92b to have a portion closer to the projection 95b being closer to the side 92b. An angle θ15 thereof is 5°.

Therefore, when the cassette holder 7A is inserted in the bottle body 71A, first, the arc portions 163a and 163b come into contact with the inner circumference surface of the tubular portion 71c. The arm portions 131a and 131b and the protruding portions 161a and 161b elastically deform while the arc portions 163a and 163b move along the inner circumference surface of the tubular portion 71c, until the flat surface portions 164a and 164b become substantially parallel to the sides 92a and 92b.

The distal end portions 165a and 165b are inclined to have portions closer to the projections 95a and 95b being closer to the plate-shaped portion 592A. Thus, the cassette holder 7A can be smoothly inserted in and taken out from the bottle body 71A without the projections 596a-1 and 596b-1 getting caught by the projection 71f (see FIGS. 23 and 27).

Figure 34:
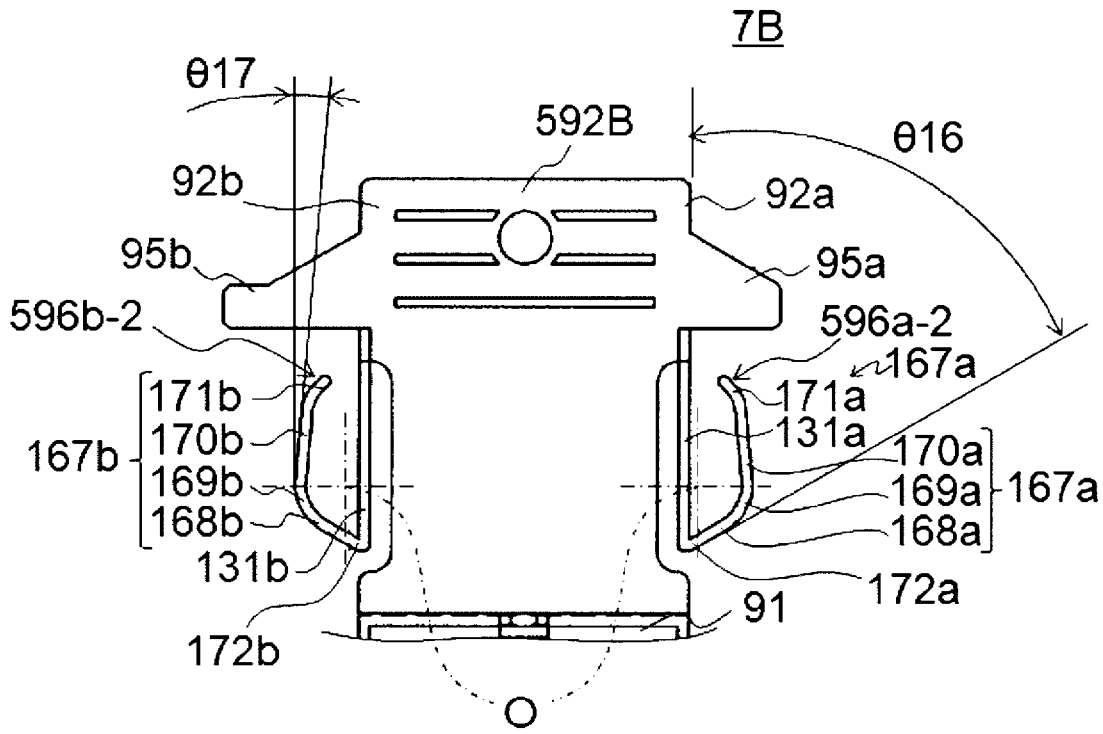
FIG. 34 is a diagram illustrating an overview of a cassette holder 7B.

FIG. 34 is a diagram illustrating an overview of a cassette holder 7B according to a modification, and only illustrates the main part of the cassette holder 7B. The cassette holder 7B mainly includes the cassette receiving portion 91, a plate-shaped portion 592B having a substantially plate-like shape, and the protrusion 93 (not illustrated). A plate-shaped portion 592B that has a substantially plate-like shape includes projections 596a-2 and 596b-2 respectively provided to the sides 92a and 92b.

The projections 596a-2 and 596b-2 are a pair of projections protruding outward in plan view. The heights of the projections 596a-2 and 596b-2 are lower than the heights of the projections 95a and 95b. The projections 596a-2 and 596b-2 are provided between the cassette receiving portion 91 and the projections 95a and 95b.

The projections 596a-2 and 596b-2 have bent ends to be in a hook shape. The projections 596a-2 and 596b-2 respectively include the arm portions 131a and 131b of a cantilever form, and protruding portions 167a and 167b of an elongated plate shape. The protruding portions 167a and 167b are provided at the distal ends of the arm portions 131a and 131b and protrude in a direction away from the plate-shaped portion 592B.

The protruding portions 167a and 167b respectively include connection portions 168a and 168b having one ends provided to the arm portions 131a and 131b, arc portions 169a and 169b provided on the distal end sides of the connection portions 168a and 168b, flat surface portions 170a and 170b provided on the distal end sides of the arc portion 169a and 169b, and distal end portions 171a and 171b provided on the distal end sides of the flat surface portions 170a and 170b. The arm portions 131a and 131b are respectively connected to the connection portions 168a and 168b at top portions 172a and 172b.

An angle θ16 formed by the arm portions 131a and 131b and the connection portions 168a and 168b is 60°. The flat surface portions 170a and 170b are each inclined with respect to the sides 92a and 92b, and are each substantially orthogonal to a plane including the plate-shaped portion 92. The flat surface portions 170a and 170b are inclined with respect to the sides 92a and 92b to have a portion closer to the projections 95a and 95b being closer to the sides 92a and 92b. An angle θ17 thereof is 5°.

Therefore, when the cassette holder 7B is inserted in the bottle body 71A, first, the arc portions 169a and 169b come into contact with the inner circumference surface of the tubular portion 71c (see FIGS. 23 and 27). The arm portions 131a and 131b and the protruding portions 167a and 167b elastically deform while the arc portions 169a and 169b move along the inner circumference surface of the tubular portion 71c, until the flat surface portions 170a and 170b become substantially parallel to the sides 92a and 92b.

The distal end portions 171a and 171b are inclined to have portions closer to the projections 95a and 95b being closer to the plate-shaped portion 592A. Thus, the cassette holder 7B can be smoothly inserted in and taken out from the bottle body 71A without the projections 596a-2 and 596b-2 getting caught by the projection 71f (see FIGS. 23 and 27).

Seventh Embodiment

Figure 35:
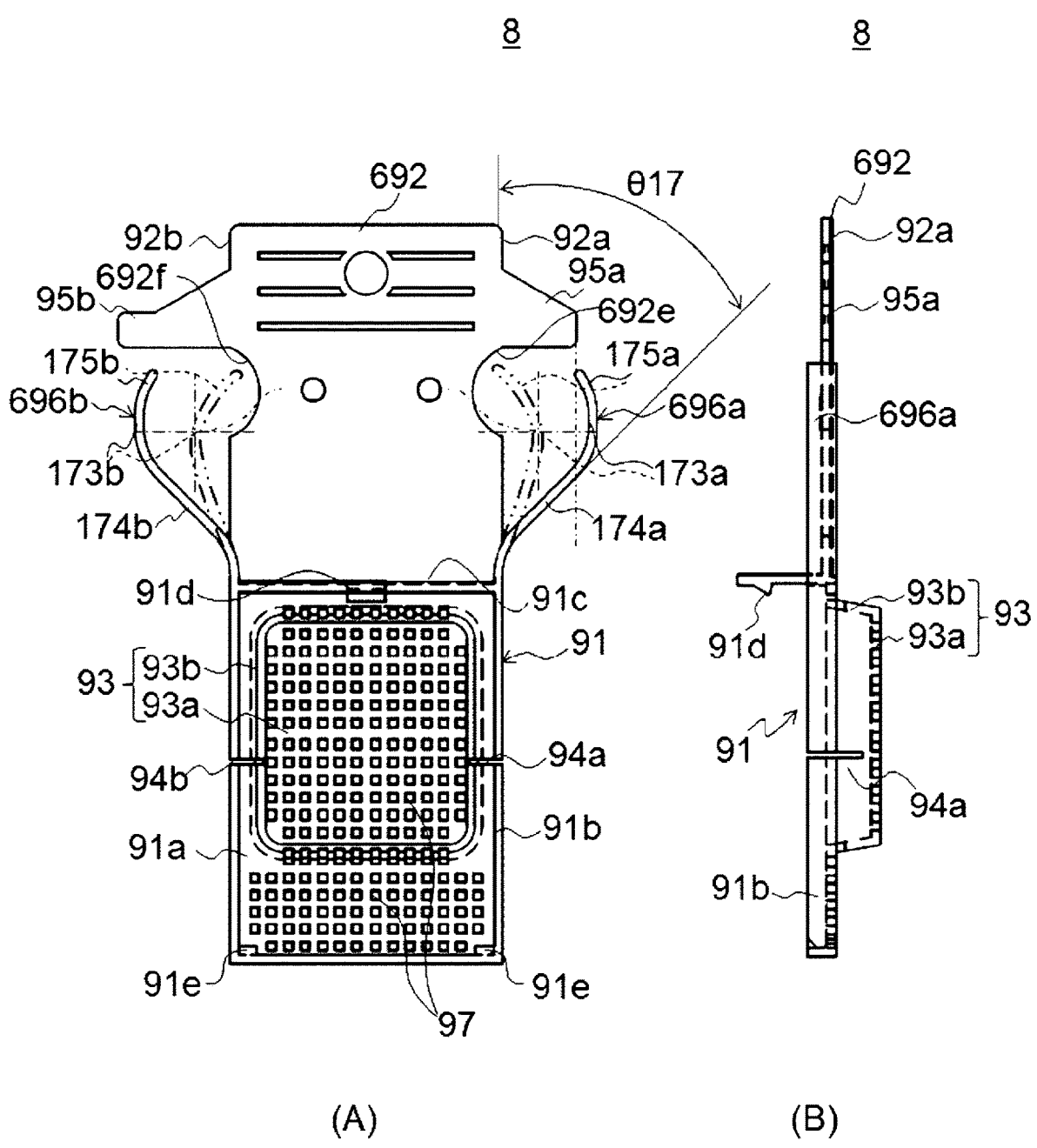
FIG. 35 is a diagram illustrating an example of a schematic configuration of a cassette holder 8, with (A) being a plan view and (B) being a side view.

FIG. 35 is a diagram illustrating an example of a schematic configuration of a cassette holder 8 according to a seventh embodiment of the present invention, with (A) being a plan view and (B) being a side view. Note that the same components as those in the first to sixth embodiments are denoted by the same reference numerals, and descriptions thereof will be omitted.

The cassette holder 8 mainly includes the cassette receiving portion 91, a plate-shaped portion 692 having a substantially plate-like shape, and the protrusion 93. The plate-shaped portion 692 is provided to the side 91c and extends substantially parallel to the bottom surface 91a. The plate-shaped portion 692 includes projections 696a and 696b and recesses 692e and 692f.

The plate-shaped portion 692 is different from the plate-shaped portion 392 in the shapes of the projections 696a and 696b and the recesses 692e and 692f, and the rest is the same.

The sides 92a and 92b are provided with projections 696a and 696b, respectively. The projections 696a and 696b are a pair of projections protruding outward in plan view. The distal end of each of the projections 696a and 696b is configured to be movable in a direction substantially parallel to the side 91c. The projections 696a and 696b are provided between the cassette receiving portion 91 and the projections 95a and 95b.

The projection 696a has a higher height than the projection 95a (see dotted line in FIG. 35). The height of the projections 696a and 696b is not limited that illustrated, and the projection 696b may have a higher height than the projection 95b.

The projections 696a and 696b have an elongated plate shape, and are elastically deformable. The projections 696a and 696b respectively include arc portions 173a and 173b, arm portions 174a and 174b that connect the arc portions 173a and 173b and the sides 92a and 92b to each other, and distal end portions 175a and 175b provided on the distal end sides of the arc portions 173a and 173b. The arc portions 173a and 173b and the distal end portions 175a and 175b of the projections 696a and 696b are each configured to be movable in the width direction.

The arm portions 174a and 174b have an elongated plate shape, and are elastically deformable cantilevered members whose base end sides are provided in the vicinity of the cassette receiving portion 91. The distal end portions 175a and 175b are provided on the distal end sides of the arc portions 173a and 173b. When the arm portions 174a and 174b elastically deform, the arc portions 173a and 173b and the distal end portions 175a and 175b move in the width direction.

The arc portions 173a and 173b have an arc shape and are provided on the distal end sides of the arm portions 174a and 174b. The center O of the arc portions 173a and 173b is located closer to the plate-shaped portion 692 than the projections 696a and 696b are. Therefore, the arc portions 173a and 173b are convex outward.

An angle θ17 formed by the arm portions 174a and 174b and the sides 92a and 92b is 25° to 45°, and is 45° in the present embodiment. Therefore, the arm portions 174a and 174b are long, and the arc portions 173a and 173b are movable with a small amount of force. Further, since the arm portions 123a and 123b are long, the arc portions 173a and 173b is moved by a large amount. However, the angle θ17 is not limited to 25° to 45°.

The distal end portions 175a and 175b are provided on the ends of the projections 696a and 696b not provided to the plate-shaped portion 692. The distal end portions 175a and 175b are inclined to have a portion closer to the projections 95a and 95b being closer to the plate-shaped portion 692.

The sides 92a and 92b are provided with recesses 692e and 692f, respectively. When the projections 696a and 696b are elastically deformed, the distal end portions 175a and 175b are inserted into the recesses 692e and 692f.

When an attempt is made to insert the cassette holder 8 into the bottle body 71A (see FIGS. 23 and 27), first, the projections 696a and 696b are elastically deformed so as to approach the plate-shaped portion 692. In a state where the cassette holder 8 is inserted in the bottle body 71A, the projections 696a and 696b are largely elastically deformed as indicated by two-dot chain line in FIG. 35. In the present embodiment, the projections 696a and 696b have a higher height than the projections 95a and 95b, and the projections 696a and 696b are long. Still, since the recesses 692e and 692f are deep, the projections 696a and 696b are elastically deformable to result in the projections 696a and 696b being lower than the height of the projections 95a and 95b, and the cassette holder 8 can be fixed to the bottle body 71A.

The distal end portions 175a and 175b are inclined to have portions closer to the projections 95a and 95b being closer to the plate-shaped portion 292. Thus, the cassette holder 8 can be smoothly inserted in and taken out from the bottle body 71A without the projections 696a and 696b getting caught by the projection 71f (see FIGS. 23 and 27).

According to the present embodiment, even if the projections 696a and 696b are formed to have a higher height than the projection 95a, the cassette holder 8 can be inserted into the bottle body 71A. Since the projections 696a and 696b are long, the projections 696a and 696b can be elastically deformed with a small amount of force.

Eighth Embodiment

Figure 36:
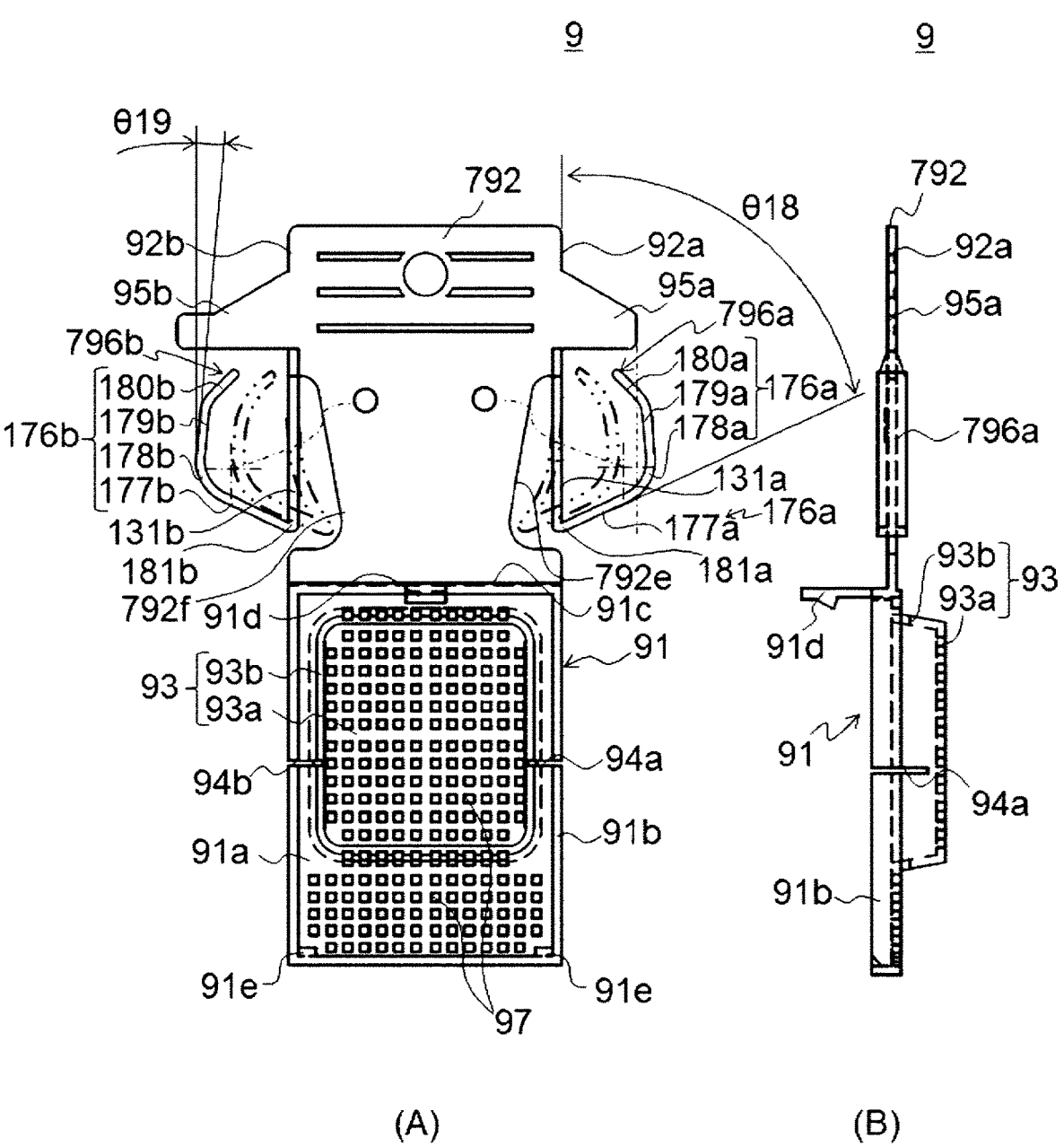
FIG. 36 is a diagram illustrating an overview of a cassette holder 9, with (A) being a plan view and (B) being a side view.

FIG. 36 is a diagram illustrating an overview of a cassette holder 9 according to an eighth embodiment of the present invention, with (A) being a plan view and (B) being a side view. Note that the same components as those in the first to seventh embodiments are denoted by the same reference numerals, and descriptions thereof will be omitted.

The cassette holder 9 mainly includes the cassette receiving portion 91, a plate-shaped portion 792 having a substantially plate-like shape, and the protrusion 93. The side 91c is provided with the plate-shaped portion 792. The plate-shaped portion 792 includes projections 796a and 796b and recesses 792e and 792f. The plate-shaped portion 792 is different from the plate-shaped portion 592 in the shapes of the projections 796a and 796b and the recesses 792e and 792f, and the rest is the same.

The sides 92a and 92b are respectively provided with the projections 796a and 796b. The projections 796a and 796b are a pair of projections protruding outward in plan view. The heights of the projections 796a and 796b are lower than the heights of the projections 95a and 95b. The projections 796a and 796b are provided between the cassette receiving portion 91 and the projections 95a and 95b.

The projection 796a has a higher height than the projection 95a (see dotted line in FIG. 36). The height of the projections 796a and 796b is not limited that illustrated, and the projection 796b may have a higher height than the projection 95b.

The projections 796a and 796b have bent ends to be in a hook shape. The projections 796a and 796b respectively include arm portions 131a and 131b of a cantilever form, and protruding portions 176a and 176b of an elongated plate shape. The protruding portions 176a and 176b are provided at the distal ends of the arm portions 131a and 131b and protrude in a direction away from the plate-shaped portion 792.

The protruding portions 176a and 176b respectively include connection portions 177a and 177b having one ends provided to the arm portions 131a and 131b, arc portions 178a and 178b provided on the distal end sides of the connection portions 177a and 177b, flat surface portions 179a and 179b provided on the distal end sides of the arc portion 178*a* and 178*b*, and distal end portions 180*a* and 180*b* provided on the distal end sides of the flat surface portions 179*a* and 179*b*.

The arm portions 131*a* and 131*b* are respectively connected to the connection portions 177*a* and 177*b* at top portions 181*a* and 181*b*. The connection portions 177*a* and 177*b* have a cantilever form with the top portions 181*a* and 181*b* fixed.

An angle θ18 formed by the arm portions 131*a* and 131*b* and the connection portions 177*a* and 177*b* is 25° to 65°, and is 65° in the present embodiment. Thus, the arc portions 178*a* and 178*b*, the flat surface portions 179*a* and 179*b*, and the distal end portions 180*a* and 180*b* move in the width direction, mainly through the elastic deformation of the arm portions 131*a* and 131*b*, with almost no elastic deformation of the connection portions 177*a* and 177*b*.

The arc portions 178*a* and 178*b* are provided on the sides of the connection portions 177*a* and 177*b* opposite to the arm portions 131*a* and 131*b*. The arc portions 178*a* and 178*b* have an arc shape centered on the point O. The arc portions 178*a* and 178*b* have the center O located closer to the plate-shaped portion 592 than the connection portions 177*a* and 177*b* are. Therefore, the arc portions 178*a* and 178*b* are convex outward.

The flat surface portions 179*a* and 179*b* are each inclined with respect to the sides 92*a* and 92*b*, and are each substantially orthogonal to a plane including the plate-shaped portion 92. The flat surface portions 179*a* and 179*b* are inclined with respect to the sides 92*a* and 92*b* to have a portion closer to the projections 95*a* and 95*b* being closer to the sides 92*a* and 92*b*. An angle θ19 thereof is 3.5° to 5°, and is 5° in the present embodiment.

The distal end portions 180*a* and 180*b* are provided on the ends of the projections 796*a* and 796*b* not provided to the plate-shaped portion 792. The distal end portions 180*a* and 180*b* are inclined to have a portion closer to the projections 95*a* and 95*b* being closer to the plate-shaped portion 792.

The sides 92*a* and 92*b* are provided with recesses 792*e* and 792*f*, respectively. When the projections 796*a* and 796*b* are elastically deformed, the top portions 181*a* and 181*b* are inserted into the recesses 792*e* and 792*f*.

When an attempt is made to insert the cassette holder 9 into the bottle body 71A (see FIGS. 23 and 27), first, the projections 796*a* and 796*b* are elastically deformed so as to approach the plate-shaped portion 692.

In a state where the cassette holder 8 is inserted in the bottle body 71A, the projections 796*a* and 796*b* are largely elastically deformed as indicated by two-dot chain line in FIG. 36. In the present embodiment, the projections 796*a* and 796*b* have a higher height than the projections 95*a* and 95*b*. Still, since the recesses 792*e* and 792*f* are deep, the projections 796*a* and 796*b* are elastically deformable to result in the projections 796*a* and 796*b* being lower than the height of the projections 95*a* and 95*b*, and the cassette holder 9 can be fixed to the bottle body 71A.

The distal end portions 180*a* and 180*b* are inclined to have portions closer to the projections 95*a* and 95*b* being closer to the plate-shaped portion 792. Thus, the cassette holder 9 can be smoothly inserted in and taken out from the bottle body 71A without the projections 796*a* and 796*b* getting caught by the projection 71*f* (see FIGS. 23 and 27).

According to the present embodiment, even if the projections 796*a* and 796*b* are formed to have a higher height than the projections 95*a* and 95*b*, the cassette holder 9 can be inserted into the bottle body 71A.

Ninth Embodiment

Figure 37:
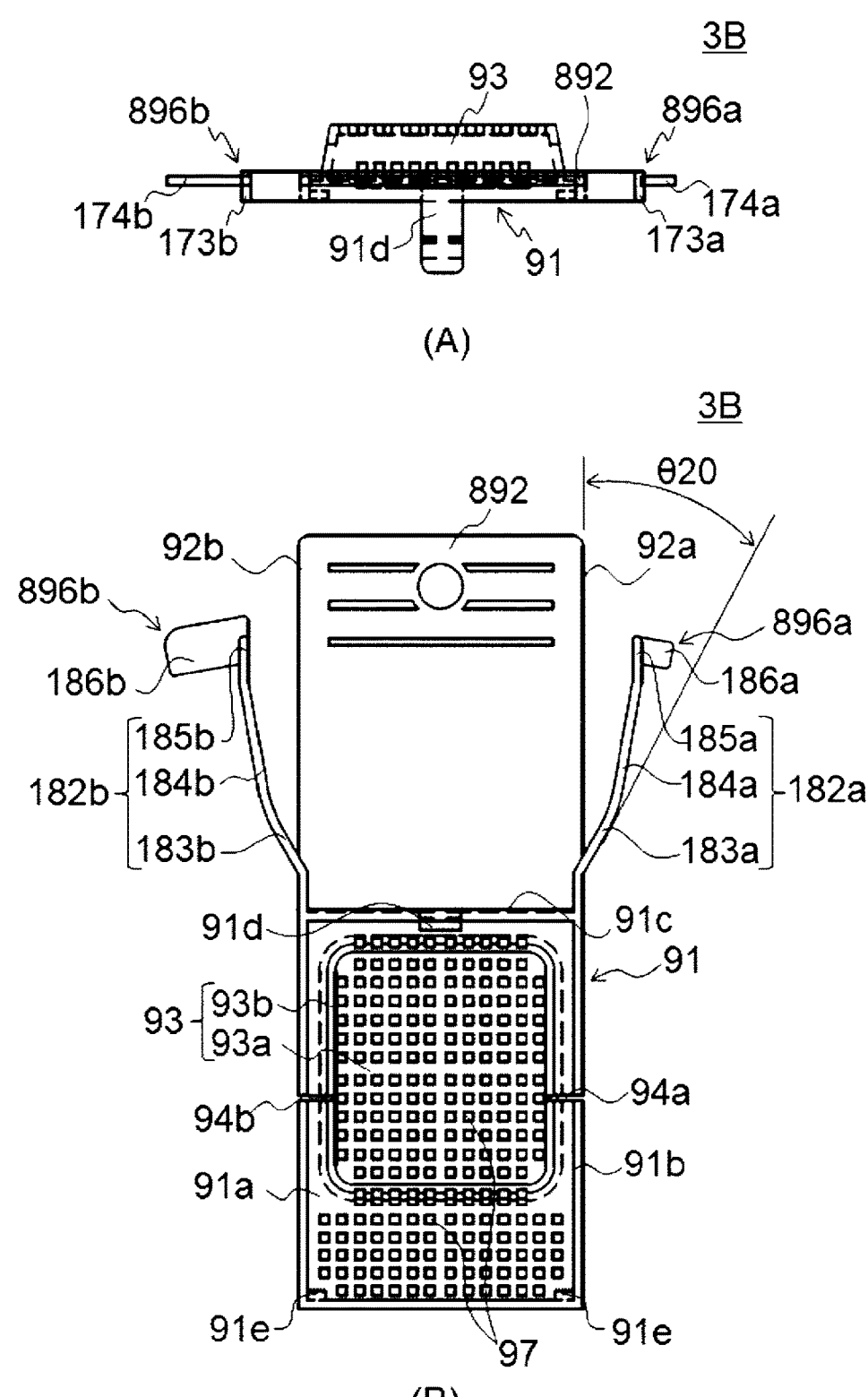
FIG. 37 is a diagram illustrating an example of a schematic configuration of a cassette holder 3B, with (A) being an upper view and (B) being a plan view.

FIG. 37 is a diagram illustrating an example of a schematic configuration of a cassette holder 3B according to a seventh embodiment of the present invention, with (A) being an upper view and (B) being a plan view. Note that the same components as those in the first and the second embodiments are denoted by the same reference numerals, and descriptions thereof will be omitted.

The cassette holder 3B mainly includes the cassette receiving portion 191, a plate-shaped portion 892 having a substantially plate-like shape, and the protrusion 193. The plate-shaped portion 892 is provided to the side 91*c* and extends substantially parallel to the bottom surface 91*a*. The plate-shaped portion 892 includes projections 896*a* and 896*b*. The plate-shaped portion 892 is only different from the plate-shaped portion 392 in the projections 896*a* and 896*b*, and the rest is the same.

The sides 92*a* and 92*b* are provided with projections 896*a* and 896*b*, respectively. The projections 896*a* and 896*b* are a pair of projections protruding outward in plan view. The distal end of each of the projections 896*a* and 896*b* is configured to be movable in a direction substantially parallel to the side 91*c*.

The projections 896*a* and 896*b* respectively include arm portions 182*a* and 182*b* and plate-shaped portions 186*a* and 186*b* provided at the distal ends of the arm portions 182*a* and 182*b*. The arm portions 182*a* and 182*b* have an elongated plate shape, and are cantilevered members whose base end sides are provided in the vicinity of the cassette receiving portion 91. The arm portions 182*a* and 182*b* can be elastically deformed.

The arm portions 182*a* and 182*b* respectively include base end portions 183*a* and 183*b*, center portions 184*a* and 184*b*, and distal end portions 185*a* and 185*b*. The base end portions 183*a* and 183*b*, the center portions 184*a* and 184*b*, and the distal end portions 185*a* and 185*b* all have an elongated plate shape, but are different from each other in an angle of inclination with respect to the sides 92*a* and 92*b*. The base end portions 183*a* and 183*b* have the largest angle of inclination with respect to the sides 92*a* and 92*b*, and the distal end portions 185*a* and 185*b* have the smallest angle of inclination with respect to the sides 92*a* and 92*b*. With the arm portions 182*a* and 182*b* thus configured, a large angle can be formed by the base end portions 183*a* and 183*b* and the sides 92*a* and 92*b*.

An angle θ20 formed by the base end portions 183*a* and 183*b* and the sides 92*a* and 92*b* is 25° to 45°. Thus, the plate-shaped portions 186*a* and 186*b* can easily move in the width direction of the cassette holder 8. However, the angle θ20 is not limited to 25° to 45°.

The plate-shaped portions 186*a* and 186*b* have a plate shape and are provided to be substantially parallel to the plate-shaped portion 892. The plate-shaped portion 186*a* and the plate-shaped portion 186*b* have different sizes. In the present embodiment, the plate-shaped portion 186*b* is larger than the plate-shaped portion 186*a*, and is particularly long in the widthwise direction.

When the cassette holder 3B is inserted into the bottle body 71 (see FIG. 7) or 71A (see FIGS. 23 and 27), the arm portions 182*a* and 182*b* are elastically deformed, the distal end portions 185*a* and 185*b* come into contact with the inner circumference surface of the tubular portion 71*c* (see FIGS. 7, 23 and 27), and the distal end portions 185*a* and 185*b* press the inner circumference surface of the tubular portion 71*c*. The plate-shaped portions 186*a* and 186*b* are caught on the opening portion 71*e* (see FIGS. 7, 23, and 27), and thus the cassette holder 3B is positioned in the height direction so as not to fall into the bottle body 71, 71A. As a result, the cassette holder 3B is fixed to the bottle body 71, 71A with the cassette holder 3B inserted in the bottle body 71, 71A prevented from rotating.

According to the present embodiment, the projections 896*a* and 896*b* can have a simple shape. The plate-shaped portions 186*a* and 186*b* have different sizes, and thus can correspond to the tubular portion 71*c* and the opening portion 71*e* of various sizes.

The embodiments of the invention are described above in detail with reference to the drawings. However, specific configurations are not limited to the embodiments and also include changes in design or the like without departing from the gist of the invention.

Additionally, in the present invention, "substantially" is a concept not only including the case of being strictly the same, but also including an error and deformation to the extent that a loss of identity does not occur. For example, a term "substantially parallel" and a term "substantially orthogonal" are not limited to "strictly parallel" and "strictly orthogonal." In addition, for example, terms such as "parallel," "orthogonal," and the like include "substantially parallel," "substantially orthogonal," and the like, respectively. To put it differently, those terms are not strictly limited to the parallel state, orthogonal state, or the like, respectively.

REFERENCE SIGNS LIST

1: Paraffin-embedded block preparation device
2, 3, 3A, 3B, 4, 4A, 4B, 5, 5A, 5B, 6, 7, 7A, 7B, 8: Cassette holder
10: Head
10*ax*: Axis
11: Cassette holder gripping unit
11*a*, 11*b*: Claw
12: Lid gripping unit
12*a*, 12*b*: Claw
12*ax*: Axis
13: Body portion
20: Conveying unit
21, 22, 23, 24: Rail
25: Driving unit
30, 30*a*, 30*b*, 30*c*, 30*d*: Holding portion
31: Frame
31*a*, 31*b*: Plate-shaped portion
31*c*, 31*d*: Slit
32, 33: Sensor
40, 40*a*, 40*b*, 40*c*, 40*d*: Chemical liquid bottle holding portion
41: Plate-shaped portion
41*a*: Hole
42: Plate-shaped portion
45: Temporary placement portion
45*a*: Lid placement portion
45*b*: Tentative lid placement portion
50, 50*a*, 50*b*, 50*c*, 50*d*: Paraffin-filled bottle holding portion
51: Plate-shaped portion
51*a*: Hole
52: Plate-shaped portion
53: Heating portion
60: Paraffin fixing unit
61: Placement portion
61*a*, 61*b*, 61*c*, 61*d*: Hole
62: Paraffin discharge unit
62*a*: Housing
62*b*: Tank

62*c*: Pipe
62*d*: Nozzle
63: Cooling unit
63*a*: Flat surface portion
63*b*: Cooling mechanism
66, 67: Conveying unit
68: Vibration table
70, 70*h*, 70*i*, 70*j*, 70*k*, 70*l*, 70*m*, 70*n*: Chemical liquid bottle
70*a*, 70*b*, 70*c*, 70*d*: Chemical liquid bottle group
71: bottle body
71*a*: Bottom surface
71*b*: Side surface
71*c*: Tubular portion
71*d*: Thread
71*e*: Opening portion
72: Lid
73: Tentative lid
75, 75*h*, 75*i*, 75*j*: Paraffin-filled bottle
75*a*, 75*b*, 75*c*, 75*d*: Paraffin-filled bottle group
91, 191: Cassette receiving portion
91*a*, 191*a*: Bottom surface
91*b*, 191*b*, 191*f*, 191g: Rib
91*c*, 191*c*: Side
91*d*, 191*d*: Cassette pressing claw
91*e*, 191*e*: Projection
92, 192, 292, 292A, 292B, 392, 392A, 392B, 492, 592, 592A, 592B, 692, 792,
892: Plate-shaped portion
92*a*, 92*b*, 192*a*, 192*b*: Side
92*e*, 92*f*, 692*e*, 692*f*, 792*e*, 792*f*: Recess
93, 193: Protrusion
93*a*, 193*a*: Bottom surface
93*b*, 193*b*: Side surface
94*a*, 94*b*, 194*a*, 194*b*: Slit
95*a*, 95*b*, 96*a*, 96*b*, 195*a*, 195*b*, 196*a*, 196*b*, 198*a*, 198*b*, 199*b*, 296*a*, 296*b*, 296*a*-1, 296*b*-1, 296*a*-2, 296*b*-2, 396*a*, 396*b*, 396*a*-1, 396*b*-1, 396*a*-2, 396*b*-2, 496*a*, 496*b*, 596*a*, 596*b*, 596*a*-1, 596*b*-1, 596*a*-2, 596*b*-2, 696*a*, 696*b*, 796*a*, 796*b*, 896*a*, 896*b*: Projection
97, 197: Through hole
97*a*, 97*b*: Flat surface portion
98*a*, 98*b*: Arm portion
101: Cassette
101*a*: Front end
101*b*: Rear end
102: Paraffin receiver
102*a*: Plate-shaped portion
102*b*: Protrusion
102*c*: Rib
110: Control unit
112: Communication unit
114: Storage unit
120*a*, 120*b*, 123*a*, 123*b*, 126*a*, 126*b*, 129*a*, 129*b*, 131*a*, 131*b*, 174*a*, 174*b*: Arm portion
121*a*, 121*b*, 124*a*, 124*b*, 127*a*, 127*b*, 130*a*, 130*b*, 134*a*, 134*b*, 141*a*, 141*b*, 147*a*, 147*b*, 153*a*, 153*b*, 159*a*, 159*b*, 165*a*, 165*b*, 171*a*, 171*b*: Distal end portion 122*a*, 122*b*, 125*a*, 125*b*, 128*a*, 128*b*, 140*a*, 140*b*, 146*a*, 146*b*, 152*a*, 152*b*, 158*a*, 158*b*, 164*a*, 164*b*, 170*a*, 170*b*: Flat surface portion
132*a*, 132*b*, 139*a*, 139*b*, 145*a*, 145*b*, 151*a*, 151*b*, 157*a*, 157*b*, 163*a*, 163*b*, 169*a*, 169*b*, 173*a*, 173*b*, 178*a*, 178*b*: Arc portion
133*a*, 133*b*, 138*a*, 138*b*, 144*a*, 144*b*, 150*a*, 150*b*, 156*a*, 156*b*, 162*a*, 162*b*, 168*a*, 168*b*, 177*a*, 177*b*: Connection portion 135a, 135b, 137a, 137b, 143a, 143b, 149a, 149b, 155a, 155b, 161a, 161b, 167a, 167b, 176a, 176b: Protruding portion 136a, 136b, 142a, 142b, 148a, 148b, 154a, 154b, 160a, 160b, 166a, 166b, 172a, 172b, 181a, 181b: Top portion 183a, 183b: Base end portion 184a, 184b: Center portion 186a, 186b: Plate-shaped portion

The invention claimed is:

1. A cassette holder configured to hold a cassette for medical use, the cassette holder comprising:
   a cassette receiving portion in a state that a cassette is inserted and positioned in the cassette receiving portion;
   a plate-shaped portion that extends from a side wall of the cassette receiving portion; and
   a protrusion having a plate shape and a hollow interior, the protrusion being configured to project downward from a bottom surface of the cassette receiving portion,
   wherein the bottom surface and the protrusion are provided with a plurality of through holes,
   the cassette receiving portion is provided with a first slit and a second slit,
   the first slit and the second slit are collinearly aligned on the bottom surface of the cassette receiving portion, and
   the cassette receiving portion is foldable along the first slit and a second slit in an intermediate section of the cassette receiving portion.

2. The cassette holder according to claim 1, wherein the cassette receiving portion has a rectangular shape aligned along a direction in which the first and second slits are collinearly aligned,
   the plate-shaped portion is provided to one of two short sides of the cassette receiving portions, and
   the first slit and the second slit are parallel to the short side to which the plate-shaped portion is provided.

3. The cassette holder according to claim 1, wherein the first slit and the second slit are provided in the cassette receiving portion and the protrusion,
   the cassette receiving portion includes a rib that protrudes upward from the bottom surface of the cassette receiving portion, and comes into contact with a peripheral edge of the cassette in a state that the cassette is inserted and positioned in the cassette receiving portion, and
   a height of the first slit and the second slit is equal to or more than half of a vertical distance between a distal end of the rib and a distal end of the protrusion.

4. The cassette holder according to claim 1, wherein the cassette receiving portion has a rectangular shape aligned along a direction in which the first and second slits are collinearly aligned,
   the plate-shaped portion is provided to one of two short sides of the cassette receiving portion,
   the plate-shaped portion includes a first side and a second side along a first direction that is parallel to a long side of the cassette receiving portion,
   the first side and the second side are respectively provided with a first projection and a second projection that are a pair of projections protruding outward along a direction in which the first and second slits are collinearly aligned, and
   a distal end of each of the first projection and the second projection is configured to be movable in a second direction orthogonal to the first direction.

5. The cassette holder according to claim 4, wherein the first projection and the second projection each include an arm portion that has an elongated plate shape and has a base end side provided in vicinity of the cassette receiving portion to be in a cantilever form, and
   the arm portion is elastically deformable.

6. The cassette holder according to claim 1, wherein the cassette receiving portion has a rectangular shape aligned along a direction in which the first and second slits are collinearly aligned,
   the plate-shaped portion is provided to one of two short sides of the cassette receiving portion,
   the plate-shaped portion includes a first side and a second side along a first direction that is parallel to a long side of the cassette receiving portion, and
   the first side and the second side are respectively provided with a first projection and a second projection that are a pair of projections protruding outward along a direction in which the first and second slits are collinearly aligned.

7. The cassette holder according to claim 6, wherein the first side and the second side are respectively provided with a third projection and a fourth projection that are a pair of projections protruding outward along a direction in which the first and second slits are collinearly aligned,
   a distal end of each of the third projection and the fourth projection is configured to be movable in a second direction orthogonal to the first direction, and
   the third projection and the fourth projection are provided between the cassette receiving portion and the first projection and the second projection.

8. The cassette holder according to claim 7, wherein the third projection and the fourth projection each include an arm portion that has an elongated plate shape and has a base end side provided in vicinity of the cassette receiving portion to be in a cantilever form, and
   the arm portion is elastically deformable.

9. The cassette holder according to claim 7, wherein the third projection and the fourth projection each have a hook shape, and each include
   an arm portion of a cantilever form that protrudes toward the cassette receiving portion from a corresponding one of the first projection and the second projection and has an elongated plate shape extending parallel to the first side and the second side, and
   a protruding portion that has an elongated plate shape, is provided at a distal end of the arm portion, and protrudes in a direction away from the plate-shaped portion, and
   the protruding portion includes
   a connection portion having one end provided to the arm portion, and
   an arc portion that has an arc shape and is provided on side of the connection portion opposite to the arm portion, and has center located closer to the plate-shaped portion than the protruding portion is.

10. The cassette holder according to claim 8, wherein the third projection and the fourth projection have distal end portions provided on ends not provided to the plate-shaped portion, and
   the distal end portions are inclined to have portions closer to the first projection and the second projection being closer to the plate-shaped portion.

11. The cassette holder according to claim 9, wherein the protruding portion has a flat surface portion orthogonal to a plane including the plate-shaped portion, and

the flat surface portion is provided to an end of the arc
portion on side opposite to the connection portion, and
is inclined with respect to the first side and the second
side along a direction in which the first and second slits
are collinearly aligned.

12. The cassette holder according to claim 11, wherein the flat surface portion of the third projection is inclined
with respect to the first side to have a portion closer to
the first projection being closer to the first side, and the flat surface portion of the fourth projection is inclined
with respect to the second side to have a portion closer
to the second projection being closer to the second side.

* * * * *